US 6,601,908 B2

(12) United States Patent
Votruba et al.

(10) Patent No.: US 6,601,908 B2
(45) Date of Patent: Aug. 5, 2003

(54) TRAILER

(75) Inventors: Edward J. Votruba, Chandler, AZ (US); Patrick W. Breslin, Peoria, CA (US); Michael H. Dilgard, Tempe, AZ (US); David L. Simpson, Higley, AZ (US); Thomas F. Bone, Mesa, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 0 days.

(21) Appl. No.: 10/340,383

(22) Filed: Jan. 8, 2003

(65) Prior Publication Data

US 2003/0107239 A1 Jun. 12, 2003

Related U.S. Application Data

(62) Division of application No. 09/901,375, filed on Jul. 9, 2001, which is a continuation of application No. 09/884,706, filed on Jun. 19, 2001.

(51) Int. Cl.⁷ .................................................. B60J 7/00
(52) U.S. Cl. ...................... 296/181; 296/39.1; 296/39.2
(58) Field of Search ............................... 296/181, 39.1, 296/39.2, 182; 293/127; 280/850, 79.2

(56) References Cited

U.S. PATENT DOCUMENTS

| | | | | |
|---|---|---|---|---|
| 712,736 A | * | 11/1902 | Smith .......................... 296/39.1 |
| 1,112,738 A | | 10/1914 | Voigt ............................ 292/104 |
| 1,754,112 A | * | 4/1930 | Lusse ........................... 293/127 |
| 2,159,671 A | * | 5/1939 | Owen ............................ 296/181 |
| 2,339,537 A | | 1/1944 | Wise ............................. 292/110 |
| D152,322 S | | 1/1949 | Chaplin ......................... 37/338 |
| 2,595,450 A | | 3/1952 | Coffing ......................... 294/83 |
| 2,727,774 A | | 12/1955 | Marple et al. ............... 292/216 |
| 2,728,971 A | | 1/1956 | Harter .......................... 292/17 |
| 2,931,205 A | | 4/1960 | Schmitz ........................ 292/229 |
| 3,418,005 A | * | 12/1968 | Allina .......................... 296/39.1 |
| 3,425,727 A | | 2/1969 | Swanson ...................... 292/129 |
| 3,776,400 A | | 12/1973 | Schwartz ...................... 296/181 |
| 3,893,722 A | | 7/1975 | Galbreath et al. ........... 292/100 |
| 3,977,720 A | | 8/1976 | Schreilberg .................. 296/181 |
| 4,014,572 A | | 3/1977 | Binns ........................... 292/108 |
| 4,239,253 A | | 12/1980 | Golze ........................... 296/181 |
| 4,502,725 A | * | 3/1985 | Wiant ........................... 296/181 |

(List continued on next page.)

FOREIGN PATENT DOCUMENTS

| | | |
|---|---|---|
| DE | 3209646 A1 | 2/1983 |
| DE | 3446490 A1 | 9/1985 |
| EP | 0448490 A1 | 3/1991 |
| GB | 2101537 A | 7/1981 |

*Primary Examiner*—Kiran Patel
(74) *Attorney, Agent, or Firm*—Jeffer, Mangels, Butler & Marmaro LLP

(57) ABSTRACT

A trailer including an inner frame that is made of metal, an outer shell that is made of a non-metal and that at least partially surrounds the inner frame, and at least one wheel rotatably secured to the inner frame. In a preferred embodiment, the outer shell is made of a plastic. The inner frame includes a lower frame portion with which the at least one wheel is rotatably secured, and an upper frame portion that supports at least a portion of the weight of the outer shell. Preferably, the upper frame portion includes a middle support member that extends upwardly from the lower frame portion, and a first bar assembly that is hingedly connected to the middle support member. In another embodiment, a second bar assembly is hingedly connected to the middle support member.

7 Claims, 53 Drawing Sheets

U.S. PATENT DOCUMENTS

| | | | |
|---|---|---|---|
| 4,537,441 A | | 8/1985 | McCleary ............... 296/181 |
| 4,579,382 A | | 4/1986 | Lake ..................... 296/181 |
| 4,709,950 A | | 12/1987 | Zortman ................. 292/92 |
| 4,944,612 A | * | 7/1990 | Abstetar et al. ......... 296/39.2 |
| 4,982,971 A | | 1/1991 | Marin .................... 296/181 |
| 5,020,846 A | * | 6/1991 | Bonnett ................. 296/39.1 |
| 5,058,946 A | | 10/1991 | Faber ................. 296/100.07 |
| 5,108,129 A | * | 4/1992 | Olsen .................... 280/850 |
| 5,154,359 A | * | 10/1992 | Junta et al. ............ 280/79.2 |
| 5,174,617 A | | 12/1992 | Huber et al. ........... 292/108 |
| 5,181,760 A | * | 1/1993 | Muno ..................... 296/181 |
| 5,269,586 A | | 12/1993 | Hahn et al. ............ 292/224 |
| 5,273,325 A | | 12/1993 | Zimmermann ......... 292/216 |
| 5,314,200 A | | 5/1994 | Phillips ................. 296/181 |
| 5,383,703 A | | 1/1995 | Irvine, III ............. 296/181 |
| 5,522,626 A | | 6/1996 | Dominique ............ 292/198 |
| 5,632,515 A | | 5/1997 | Dowling ................ 292/216 |
| 5,653,494 A | * | 8/1997 | Cleall et al. ............ 296/182 |
| 5,681,074 A | | 10/1997 | Christensen ........... 296/181 |
| 5,713,691 A | | 2/1998 | Solberg ................. 280/504 |
| 5,769,478 A | * | 6/1998 | Vernese ................. 296/181 |
| 5,820,170 A | | 10/1998 | Clancy .................... 292/26 |
| 5,906,470 A | | 5/1999 | Desjardins ............. 296/181 |
| 5,938,274 A | | 8/1999 | Ehrlich ................. 296/181 |
| 5,979,972 A | * | 11/1999 | Gehman ................ 296/181 |
| 6,042,175 A | | 3/2000 | Williams ............... 296/181 |
| 6,089,650 A | * | 7/2000 | Edgeller et al. ........ 296/181 |
| 6,186,580 B1 | | 2/2001 | Nothem et al. ........ 296/181 |
| 6,199,909 B1 | * | 3/2001 | Kass et al. ............. 296/181 |
| 6,213,539 B1 | | 4/2001 | Williams et al. ....... 296/181 |
| 6,249,948 B1 | | 6/2001 | Casso .................... 296/181 |
| 6,283,537 B1 | * | 9/2001 | DeVore, III ........... 296/181 |
| 6,367,866 B1 | * | 4/2002 | Moore ................... 296/181 |
| 6,378,904 B1 | | 4/2002 | Niehoff ................. 296/181 |
| 6,398,290 B1 | * | 6/2002 | Williams et al. ....... 296/181 |
| 6,422,641 B1 | * | 7/2002 | Coryell ................. 296/181 |
| 6,499,783 B1 | * | 12/2002 | Husted .................. 296/181 |
| 6,502,894 B1 | * | 1/2003 | Ingram et al. ......... 296/181 |
| 6,537,014 B1 | * | 3/2003 | Ridgdill ................ 296/181 |
| 2002/0008398 A1 | * | 1/2002 | Long ..................... 296/39.2 |
| 2002/0117873 A1 | * | 8/2002 | Lorenzo et al. ........ 296/39.2 |

\* cited by examiner

Fig. 17
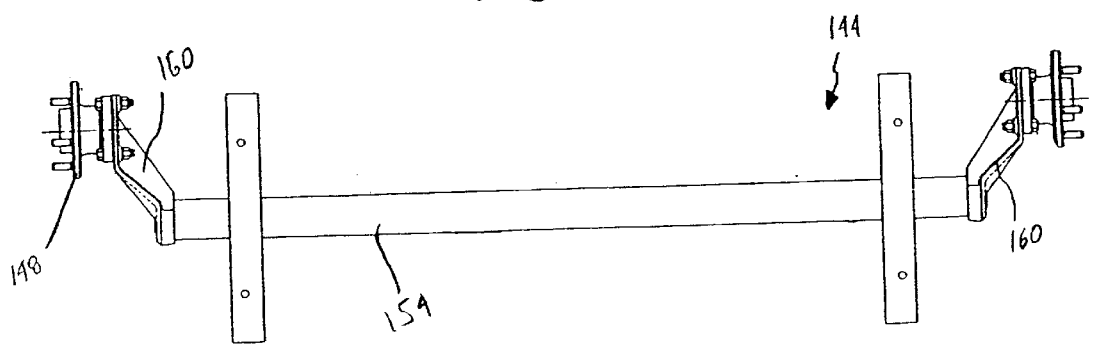
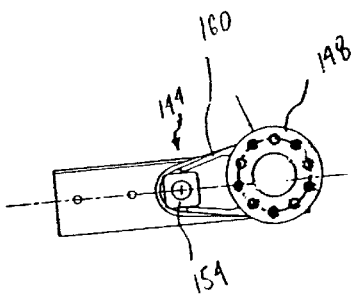
Fig. 18

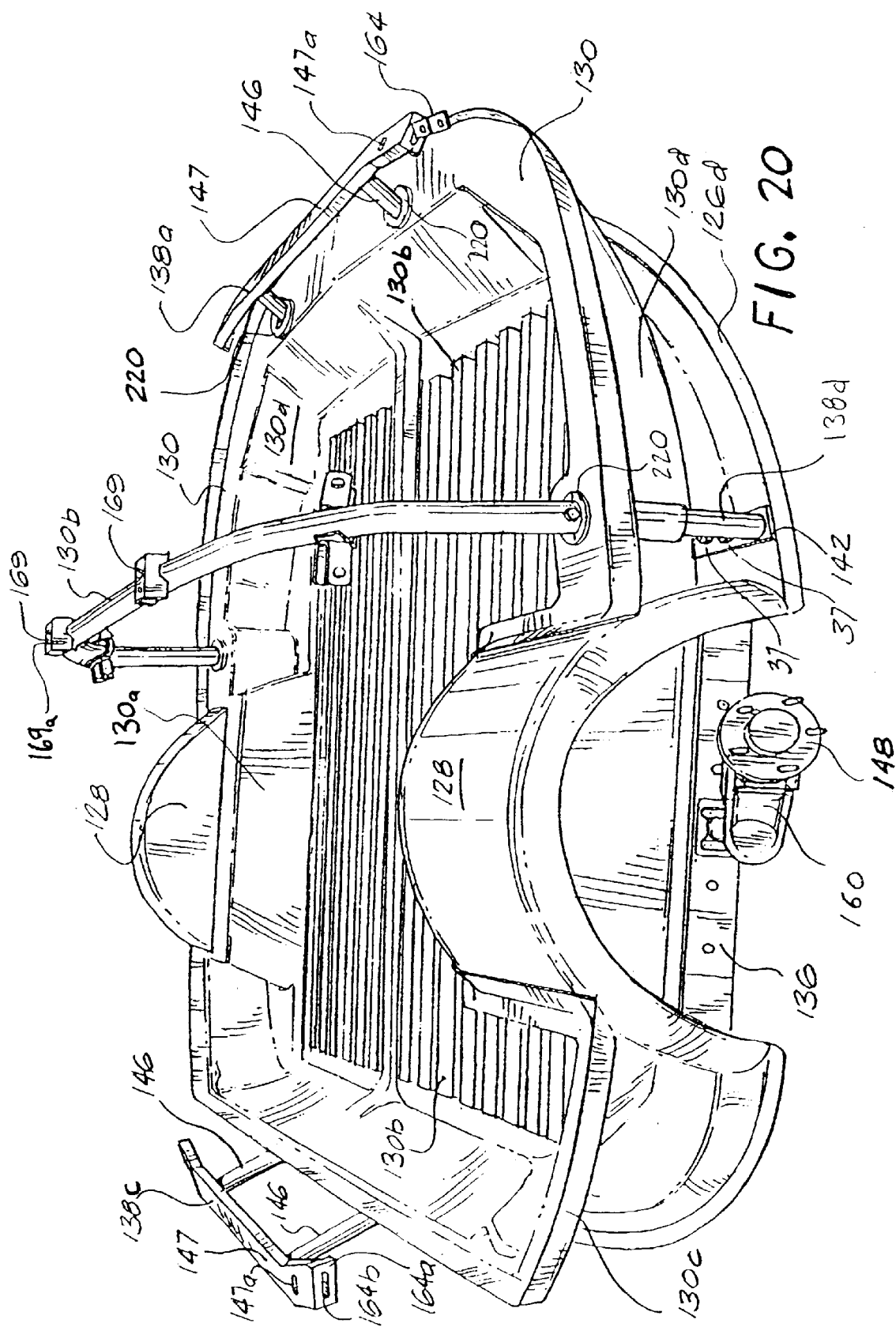

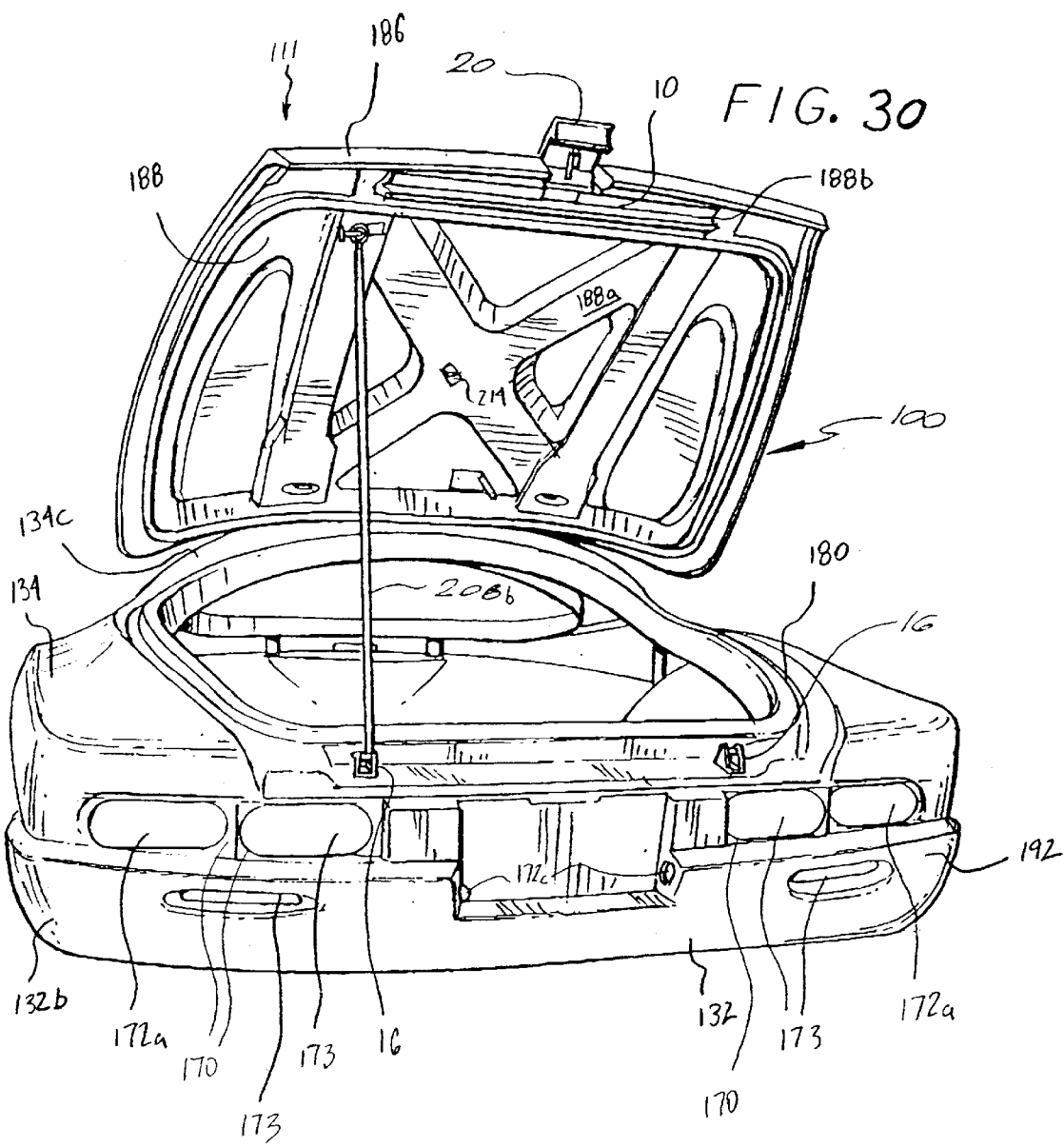

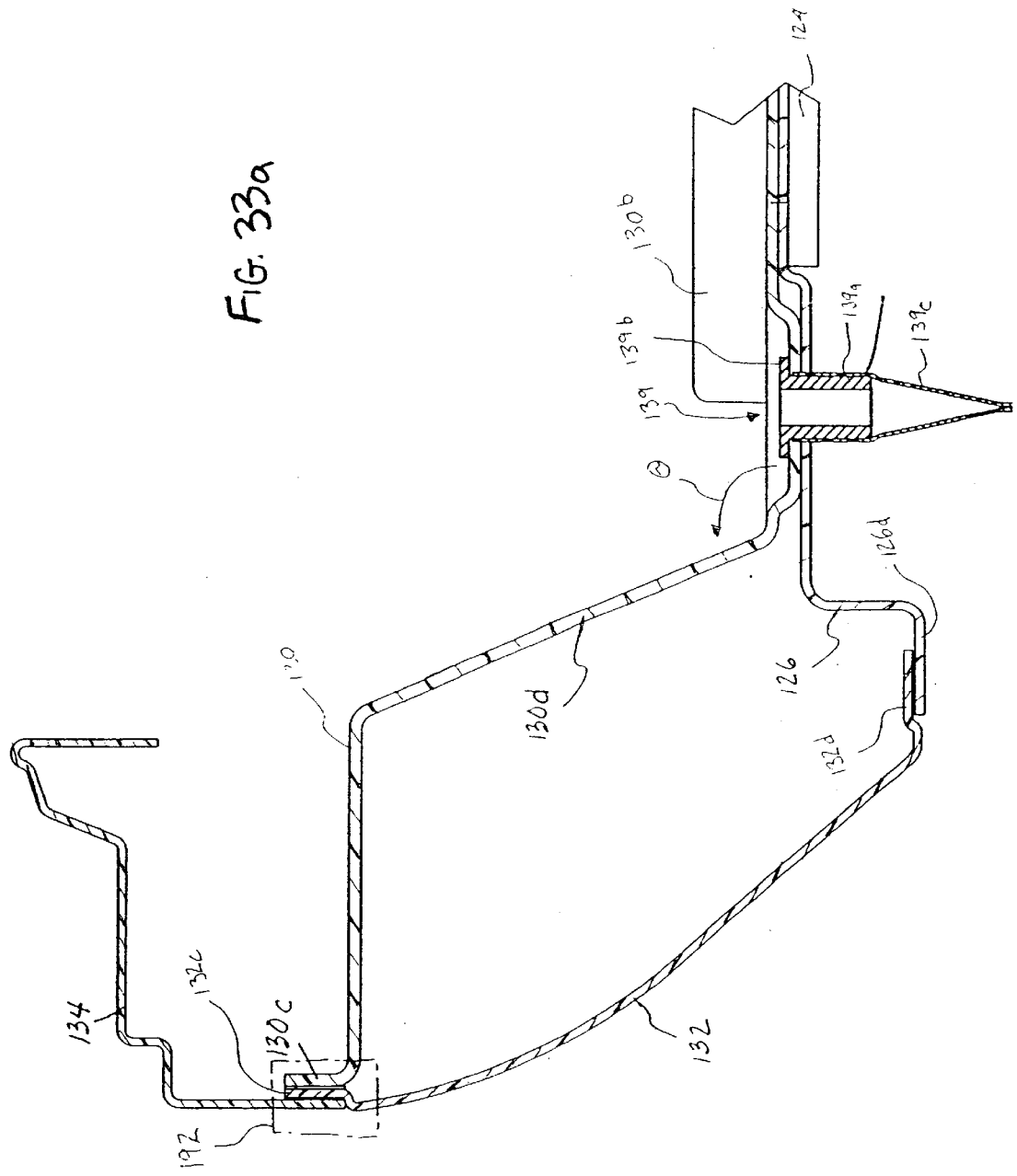

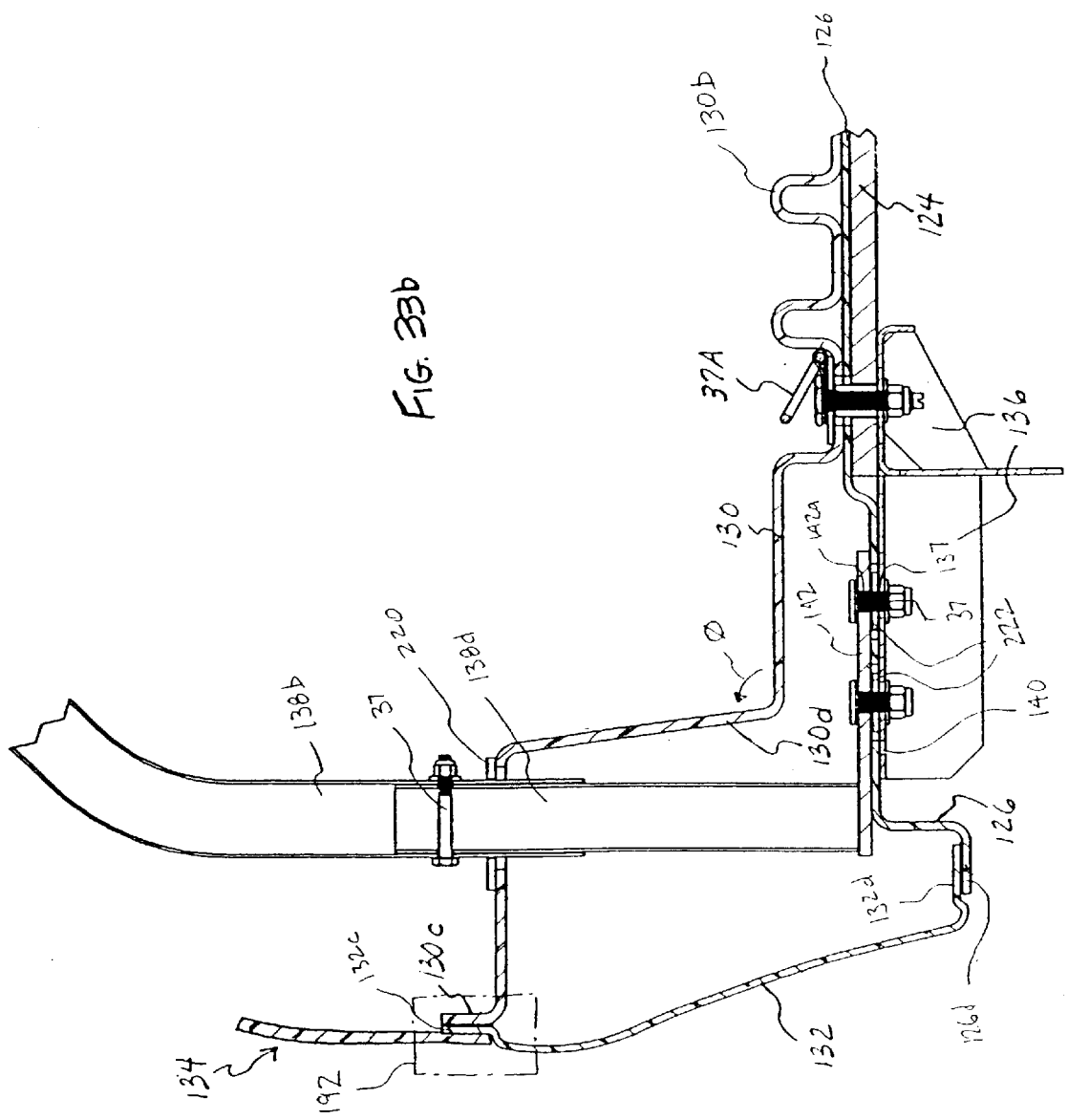

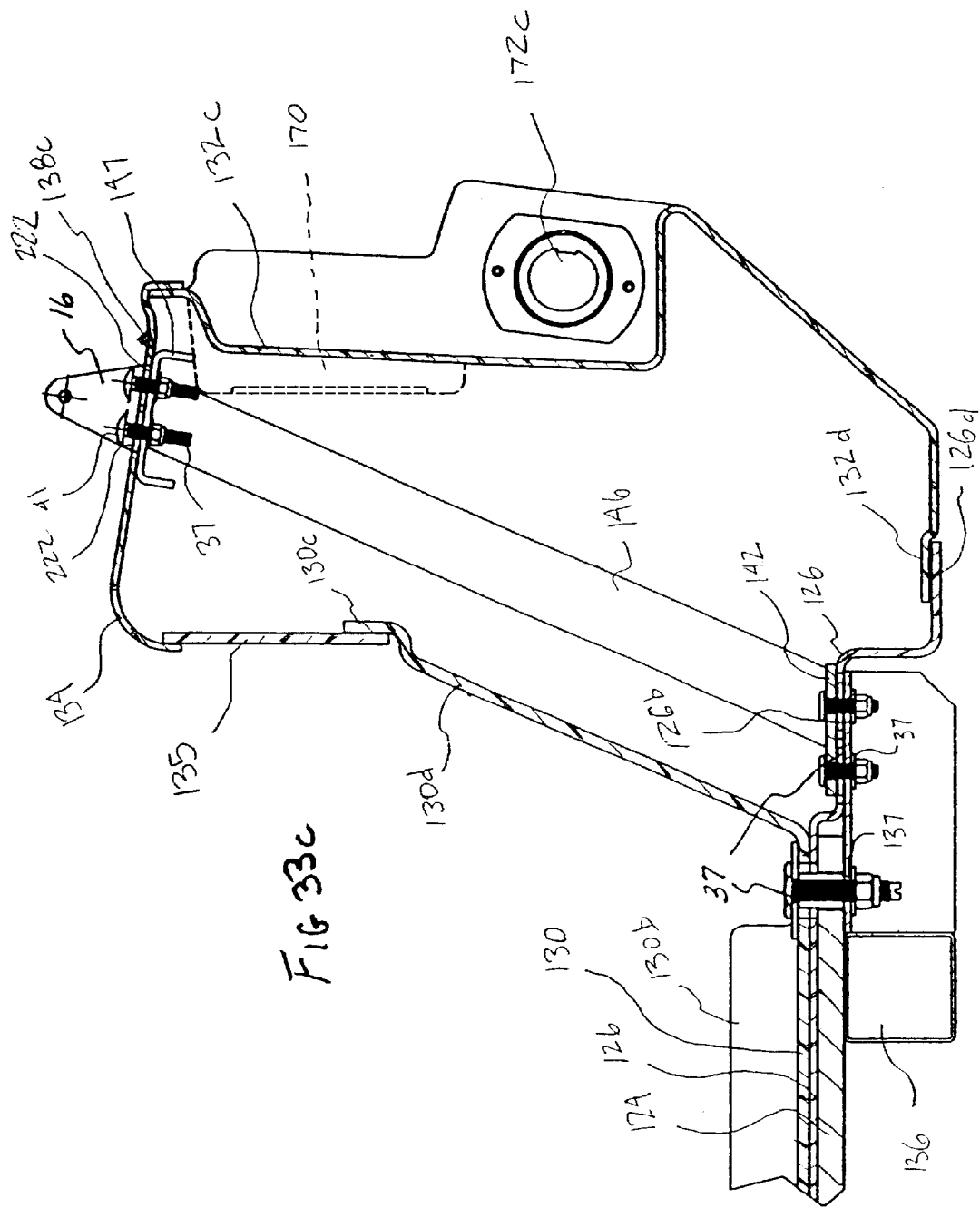

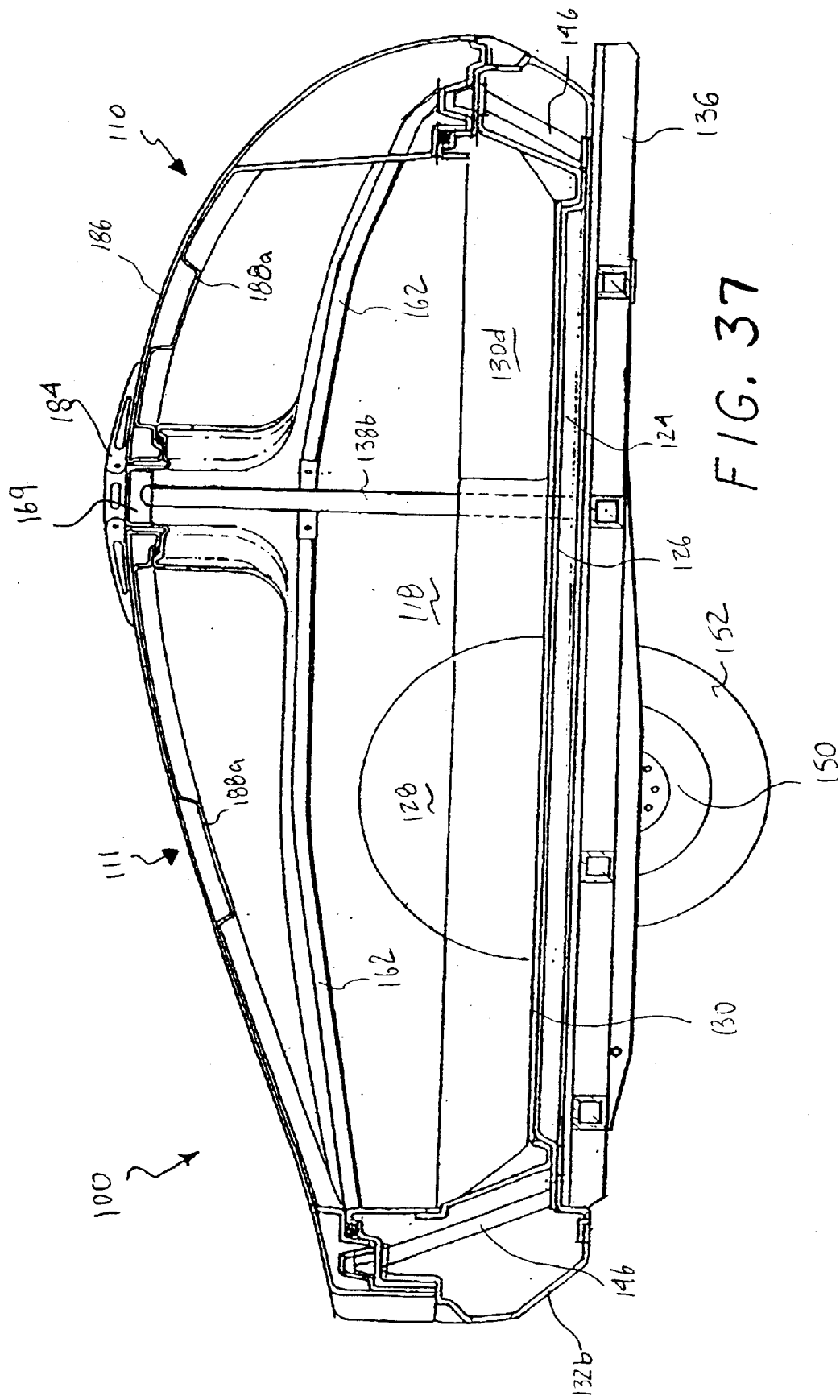

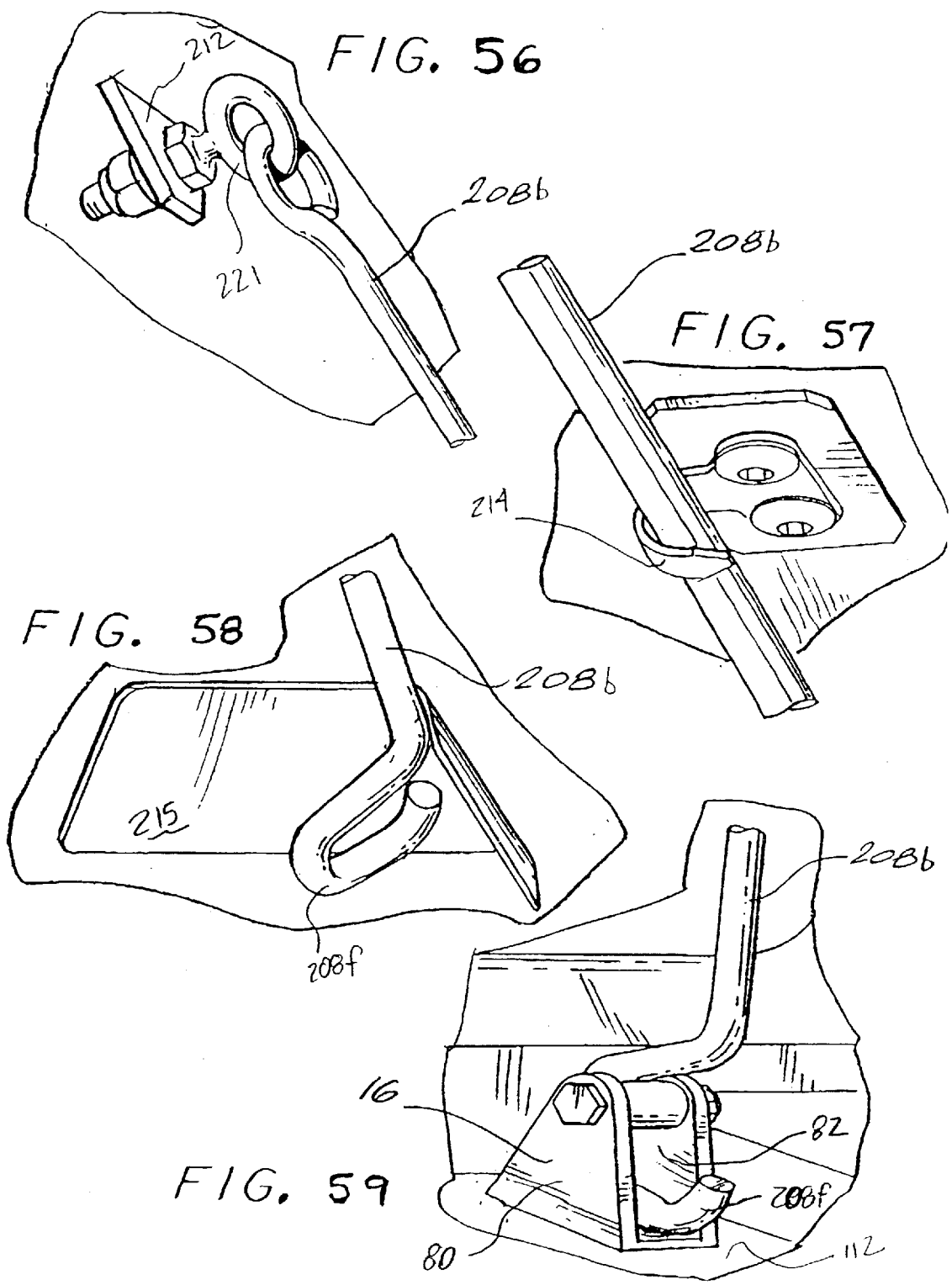

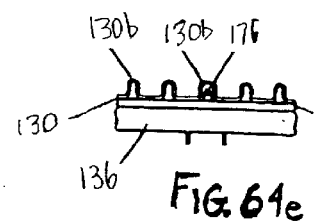
FIG. 64e
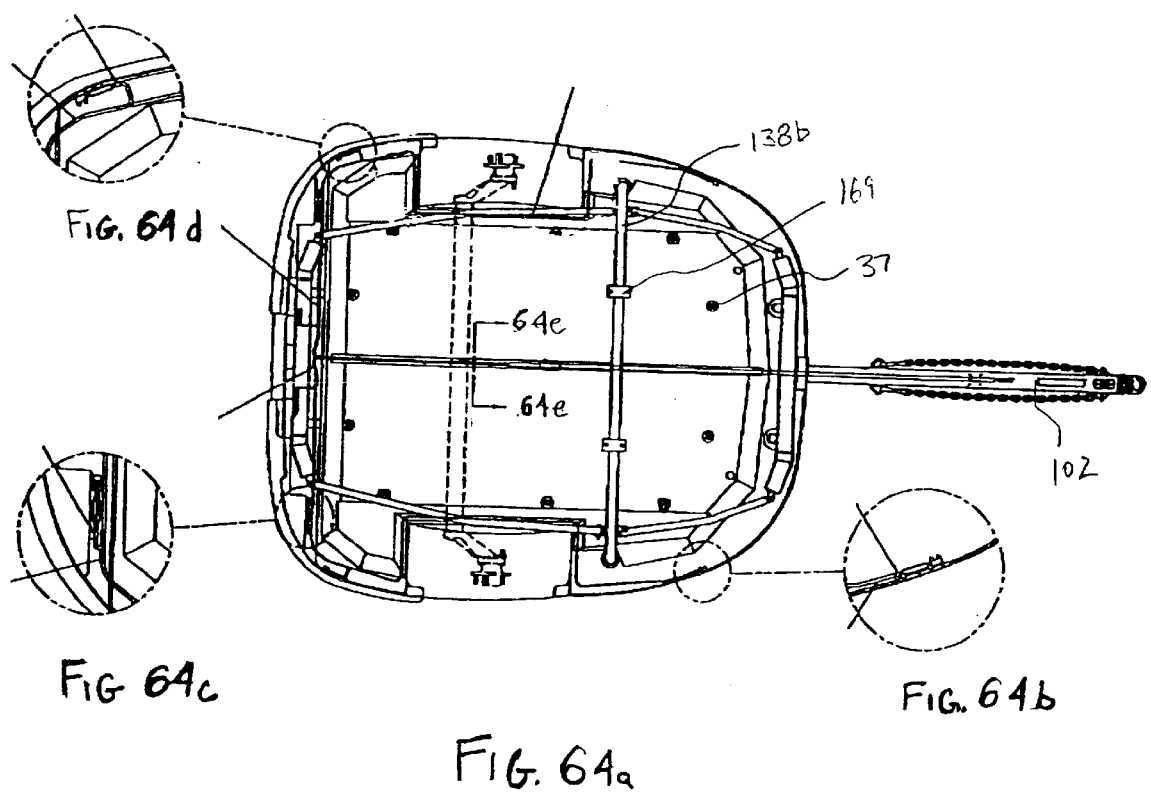
FIG. 64d
FIG. 64c
FIG. 64b
FIG. 64a

TRAILER

This is a divisional of appliidation Ser. No. 09/901,375 filed on Jul. 9, 2001 which is a continuation appliication of Ser. No. 09/884,706 filed on Jun. 19, 2001, all of which are incorporated by reference in their cntireties therein.

FIELD OF THE INVENTION

The present invention relates to a trailer, and more particularly to a trailer having an improved infrastructure and hatch latches.

BACKGROUND OF THE INVENTION

When going on a trip, such as a weekend trip, travelers often need more space than is available in their car or truck. Trailers that are towed by a towing vehicle, such as a car or a truck, serve the purpose of providing extra space. However, trailers have several drawbacks. First of all, trailers are typically heavy and only capable of being towed by larger vehicles. Trailers are also bulky and not very aerodynamic.

Accordingly, a long felt need exists for a trailer that is light, aerodynamic and versatile.

SUMMARY OF THE PREFERRED EMBODIMENTS

In accordance with a first aspect of the present invention there is provided a trailer including an inner frame that is made of metal, an outer shell that is made of a non-metal and that at least partially surrounds the inner frame, and at least one wheel rotatably mounted to the inner frame. In a preferred embodiment, the outer shell is made of a plastic. Preferably, the inner frame includes a lower frame portion with which the at least one wheel is rotatably mounted, and an upper frame portion that supports at least a portion of the weight of the outer shell. Preferably, the upper frame portion includes a middle support member that extends upwardly from the lower frame portion, and a first bar assembly that is hingedly connected to the middle support member. In another embodiment, a second bar assembly is hingedly connected to the middle support member.

In a preferred embodiment, the upper frame portion further includes front and rear support members that are connected to the middle support member by elongated members and that support at least a portion of the weight of said upper body portion. The outer shell includes an upper body portion and a lower body portion that includes front and rear lower sections. Preferably, the outer shell includes a first cover that includes an outer skin and an inner skin, and that has a first bar assembly disposed between the inner skin and the outer skin. In one embodiment, the first bar assembly is made of a metal and the inner and outer skins are made of a non-metal, such as a plastic. The outer shell can also include a second cover. In a preferred embodiment, the first and second covers are pivotally connected to the outer shell by at least one hinge that is connected to the first and second bar assemblies through the outer skin of the covers.

In a preferred embodiment, the trailer includes an inner liner that has a bottom and a wall extending upwardly from the bottom at an angle θ. Preferably the wall terminates in a lip that is affixed to the outer shell.

In accordance with another aspect of the present invention there is provided a hinge that includes a middle portion having first and second opposite ends, a front hinge portion and a rear hinge portion. The middle portion has at least one end member extending outwardly from its first end and at least one end member extending outwardly from its second end. Each end member has an opening defined therethrough. The front and rear hinge portions each have at least one end member with an opening defined therethrough extending outwardly from an end thereof. The opening in the end member of the first end of the middle portion cooperates with the opening in the end member of the front hinge portion to receive a first hinge pin. The opening in the end member of the second end of the middle portion cooperates with the opening in the end member of the rear hinge portion to receive a second hinge pin. In a much preferred embodiment, the middle portion and/or the front and rear hinge portions have openings defined laterally therethrough. The openings may be used for attaching racks or the like to the hinge.

In accordance with another aspect of the present invention there is provided a hinge including a middle portion and a cover portion. The middle portion has an opening defined laterally therethrough and at least one end member having an opening defined therethrough extending outwardly from an end thereof. The hinge portion has at least one end member having an opening defined therethrough extending outwardly from an end thereof. The opening in the at least one end member of the middle portion cooperates with the opening in the at least one end member of the hinge portion to receive a hinge pin. In a much preferred embodiment, the middle portion and hinge portion are made using an extrusion process.

In accordance with another aspect of the present invention there is provided a trailer including a main body portion, at least one wheel rotatably secured to the main body portion, and a cover hingedly connected to the main body portion. The cover includes an inner skin, an outer skin, and a bar assembly disposed between the inner and outer skins. In a preferred embodiment, the cover is hingedly secured to the main body portion and the bar assembly includes mounting brackets to which the hinge is secured to mount the cover.

In accordance with yet another aspect of the present invention there is provided a trailer including an inner frame having lower and upper frame portions and an outer shell and at least one wheel rotatably secured to the lower frame portion of the inner frame. The outer shell at least partially surrounds the inner frame and includes an upper body portion and lower body portion that are bonded together. The upper body portion rests on the inner frame and the lower body portion. The lower frame portion includes an axle that has a pair of wheels rotatably secured at opposite ends thereof. Most preferably, the axle is a torsion axle. In a preferred embodiment, the upper body portion has first and second covers associated with first and second openings defined in the upper body portion. The upper body portion also includes an arch portion extending between and partially defining the first and second openings. The arch portion rests on the upper frame portion. A hinge pivotally connects the first and second covers to the outer shell and is secured to the upper frame portion through the arch portion.

In a preferred embodiment, the inner skin of the first and second covers each include a latch depression for receiving a latching system therein. The latching system preferably includes at least one connector that is adapted to engage a keeper on the front and rear support members when the first and second covers are closed. Preferably, the lower body portion includes a lip defined around a top edge thereof and the upper body portion includes a lower edge that is adapted to cooperate with the lip, thereby forming the outer shell. The upper and lower body portions can be secured to one another using, for example, an adhesive tape.

In accordance with another aspect of the present invention there is provided a method of propping open a cover. The method includes the steps of unlatching a hook associated with the cover from a keeper, raising the cover unlatching a prop rod from the cover, pivoting the prop rod downwardly, and engaging the prop rod with the keeper.

In accordance with another aspect of the present invention there is provided a trailer that includes a trailer body, a first cover hingedly connected to the trailer body, and a first prop rod secured to the first cover. The prop rod is adapted to be pivoted downwardly and engage the trailer body, thereby propping the cover open. In another embodiment, the trailer can include a second cover and a second prop rod.

In accordance with yet another aspect of the present invention there is provided a prop rod for propping open a cover that includes an elongated rod having first and second opposite ends, a hook at the first end, and a loop secured to an eye hook at the second end. Preferably the inner surface of the hook has at least one notch defined therein.

In accordance with a further aspect of the present invention there is provided a trailer including a lower frame portion, a lower body portion supported on the lower frame portion, an upper frame portion extending upwardly from the lower frame portion, and an upper body portion supported on the upper frame portion and affixed to the lower body portion. The lower frame portion includes at least one axle having wheels at its opposite ends. In a preferred embodiment, the lower body portion has a lip extending inwardly from a bottom edge thereof. A floor panel is disposed between the lower frame portion and the lower body portion. The floor panel has a lip extending around at least a portion of the perimeter thereof that is affixed to the lip of the lower body portion. A preferably wooden deck is disposed between the lower frame portion and the floor panel.

In a preferred embodiment, the floor panel has at least two wheel cavities defined therein and the floor panel has at least two wheel housings secured thereto. The wheel cavities and the wheel housings cooperate to partially surround the wheels. The lower frame portion preferably includes a plurality of frame horns affixed thereto. The upper frame portion extends upwardly from the frame horns.

In accordance with yet another aspect of the present invention there is provided an inner frame for a trailer that includes a lower frame portion, front, middle and rear support members extending upwardly from the lower frame, a first bar assembly hingedly connected to the middle support member, and a second bar assembly hingedly connected to the middle support member.

In accordance with still another aspect of the present invention there is provided a trailer including a lower frame portion, a tub-shaped inner liner supported on the lower frame portion, a lower body portion at least partially surrounding the inner liner and supported on the lower frame portion, and an upper body portion secured to the lower body portion. The inner liner has a lip running around a top edge thereof that is secured to an inside surface of the upper body portion.

In accordance with another aspect of the present invention there is provided an inner liner including a bottom having an outer edge and a plurality of ribs defined therein, a wall extending upwardly from the outer edge of the bottom, and a lip extending from the top edge of the wall. The wall has at top edge and at least two opposing wheel cavities defined therein.

In another preferred embodiment of the invention, there is provided a drain including a cylindrical extension portion having a top and a bottom, wherein the extension portion has an opening defined therethrough, and a cylindrical shaped upper portion having a top and a bottom. The upper portion has a flange extending radially outwardly from the top thereof. The upper portion is received in the opening of the extension portion. The flange is located above the top of the extension portion, and the bottom of the extension portion is located below the bottom of the upper portion. Preferably the extension portion is tapered such that the opening is wide at the top and is narrow at the bottom thereof.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which

FIG. 17 is a top plan view of the axle removed from the lower frame portion.

FIG. 18 is a side elevational view of the axle of FIG. 17.

FIG. 20 is a side perspective view of the inner frame (with the elongated members removed), and the floor panel with the inner liner thereon.

FIG. 30 is a perspective view of the rear of the trailer of FIG. 1 with the rear cover open.

FIG. 33a is a partial side sectional view of the trailer of FIG. 1 showing the drain and how the front of the inner liner and upper and lower body portions are secured together.

FIG. 33b is a partial front sectional view of the trailer of FIG. 1 showing the middle support portion and how the inner liner and upper and lower body portions are secured together.

FIG. 33c is a partial side sectional view of the trailer of FIG. 1 showing the rear support member and how the rear of the inner liner and upper and lower body portions are secured together.

FIG. 37 is a cross-sectional side elevational view of the trailer of FIG. 1 taken along line 37—37 of FIG. 1.

FIG. 56 is a detailed perspective view of the ball joint of the rear prop rod pivotally connected to the mounting bracket (of the bar assembly) on the underside of the rear cover.

FIG. 57 is a detailed perspective view of a rod securing hook securing the elongated rod of rear prop rod to the underside of the rear cover.

FIG. 58 is a detailed perspective of the hook of the front prop rod secured against a skid plate on the underside of the rear cover.

FIG. 59 is a detailed perspective showing the hook of the rear prop rod engaged with a keeper in accordance with a preferred embodiment of the present invention.

FIG. 64a is a top plan view of the trailer of FIG. 1 with the upper body portion and inner liner removed to show the path of the lighting wires.

FIG. 64b is a detailed top plan view of the front right side marker light.

FIG. 64c is a detailed top plan view of the rear right brake light/taillight/turnlight.

FIG. 64d is a detailed top plan view of the rear left side marker light.

FIG. 64e is a sectional elevational view of a portion of the inner liner and lower frame portion showing the raised ribs of the inner liner and a light wire running through one of the raised ribs.

Like numerals refer to like parts throughout the several views of the drawings.

DETAILED DESCRIPTION OF THE PREFERRED EMBODIMENTS

Described herein are preferred embodiments of a trailer that includes a plurality of novel components, including, without limitation, a latching device for latching shut the free end of a trailer or vehicle cover, e.g., a trunk, cover, door or the like; a hinge; a prop rod system and a method of making the trailer. It will be understood that the use of the various components of the trailer, such as the latching device, the hinge, the prop rods, etc. is not limited to use on a trailer or vehicle. Other uses of these components will be readily apparent to those skilled in the relevant art, and such uses are within the scope of the present invention. The description of these components herein as used with a trailer/vehicle is only exemplary and not limiting.

Figure 1:
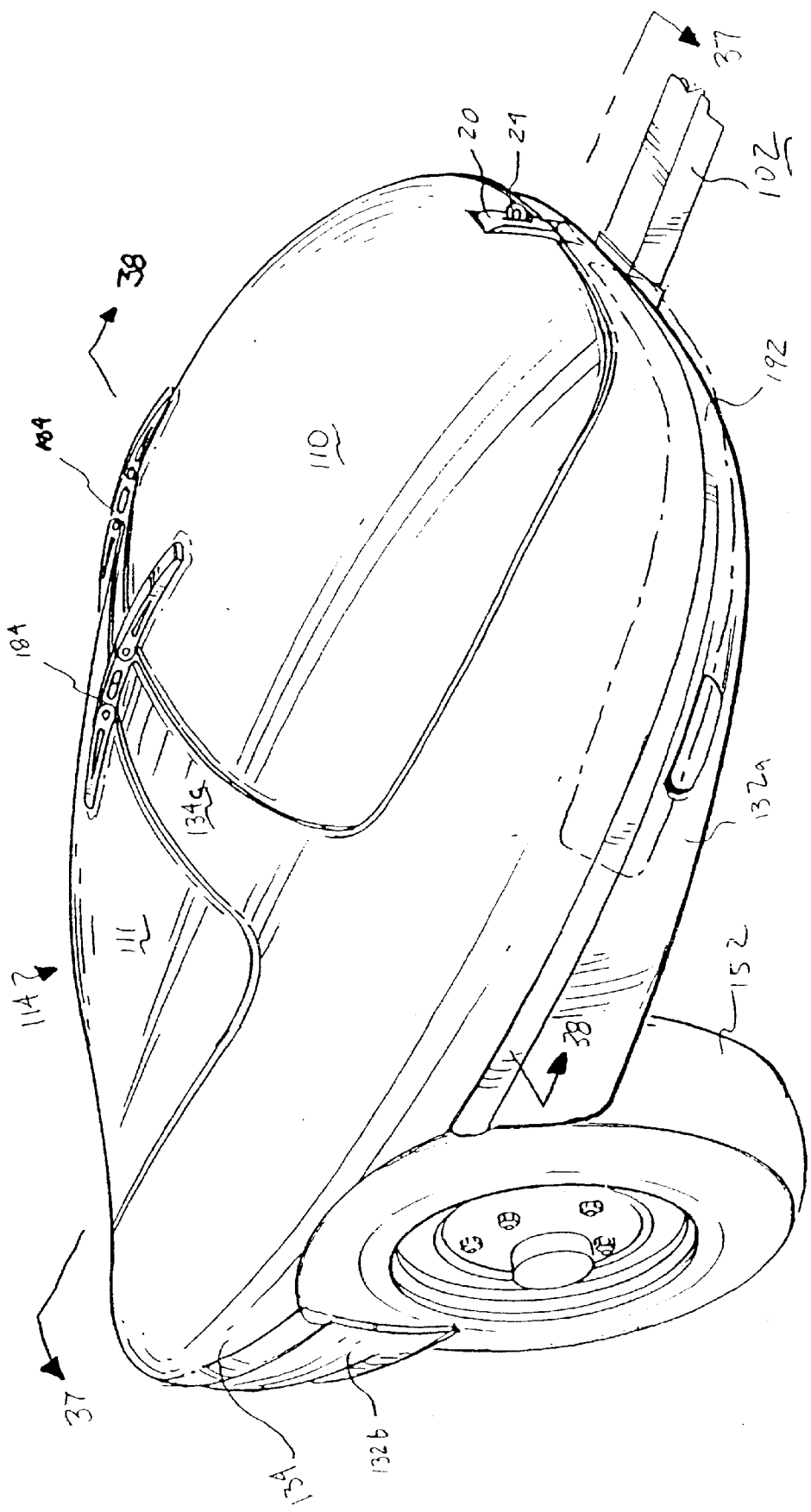
FIG. 1 is a perspective view of a trailer with the front and rear covers closed in accordance with a preferred embodiment of the present invention.

It will be appreciated that terms such as "upper," "inner," "outer," "vertical," "horizontal," "bottom," "below," "top," "side," "inwardly," "outwardly," "downwardly" and "lower" and other positionally descriptive terms used hereinbelow are used merely for ease of description and refer to the orientation of the components as shown in the Figures. It should be understood that any orientation of components of the trailer described herein is within the scope of the present invention. As illustrated in FIG. 1, to aid in the description and understanding of the invention, the trailer defines a "longitudinal axis" that extends in a direction parallel to that which the trailer travels; a "lateral axis" that is perpendicular to the longitudinal axis and extends in a direction from one side of the trailer to the other; and a "transverse axis" that is perpendicular to the longitudinal axis and extends in an up and down direction.

Figure 39:
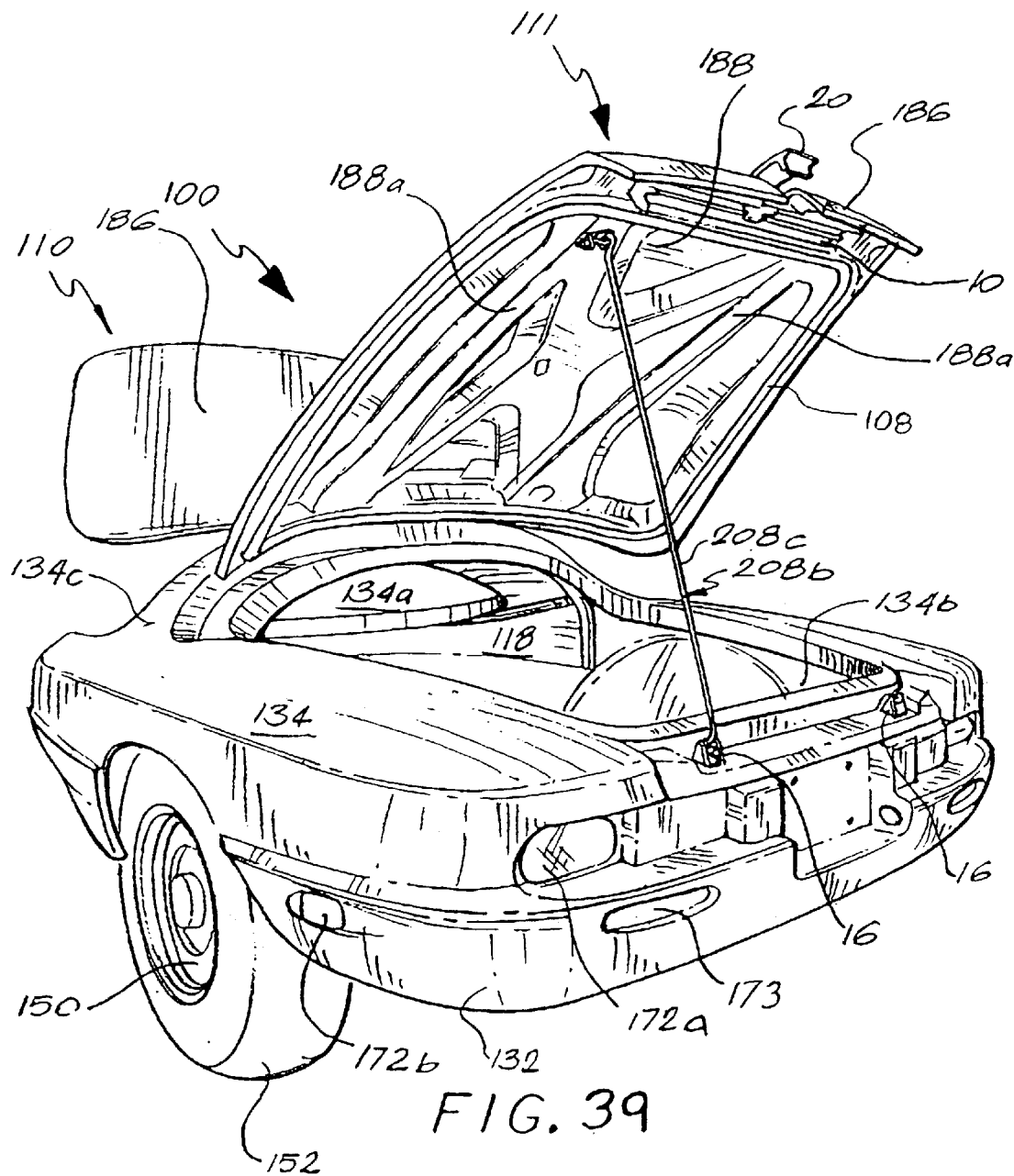
FIG. 39 is a rear angle perspective view of the trailer of FIG. 1 with the front and rear covers propped open.

As shown in FIG. 1 and 39, the trailer 100 of the present invention generally includes front and rear covers or doors 110, 111, a main body portion 114, a tongue 102 and a pair of wheels 150. Each door 110, 111 includes a latching system 10 for securing the door to the main body of the trailer 100.

Figure 2:
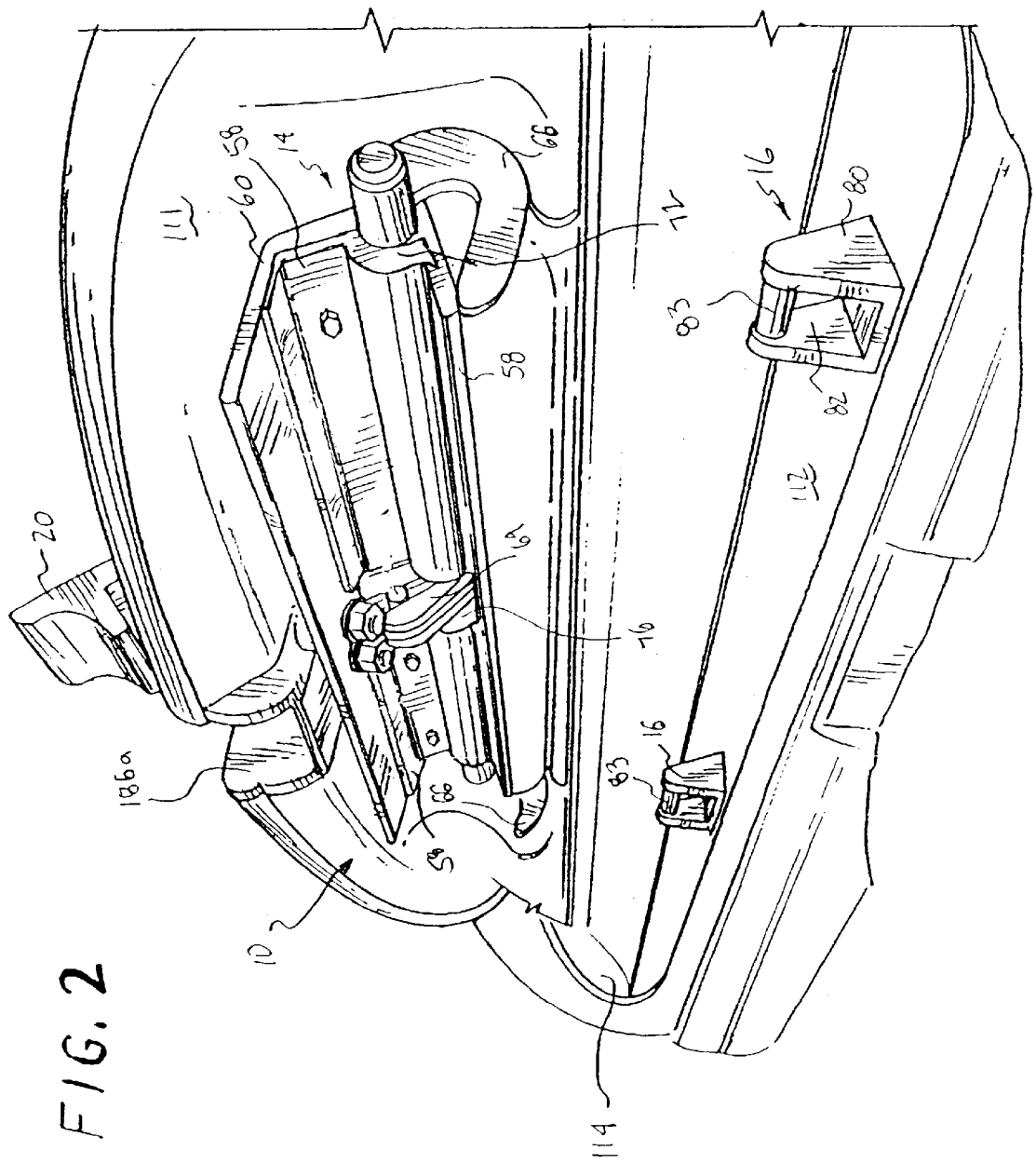
FIG. 2 is a perspective view of the open cover of the trailer of FIG. 1 showing a latch system in accordance with a preferred embodiment of the present invention.
Figure 3:
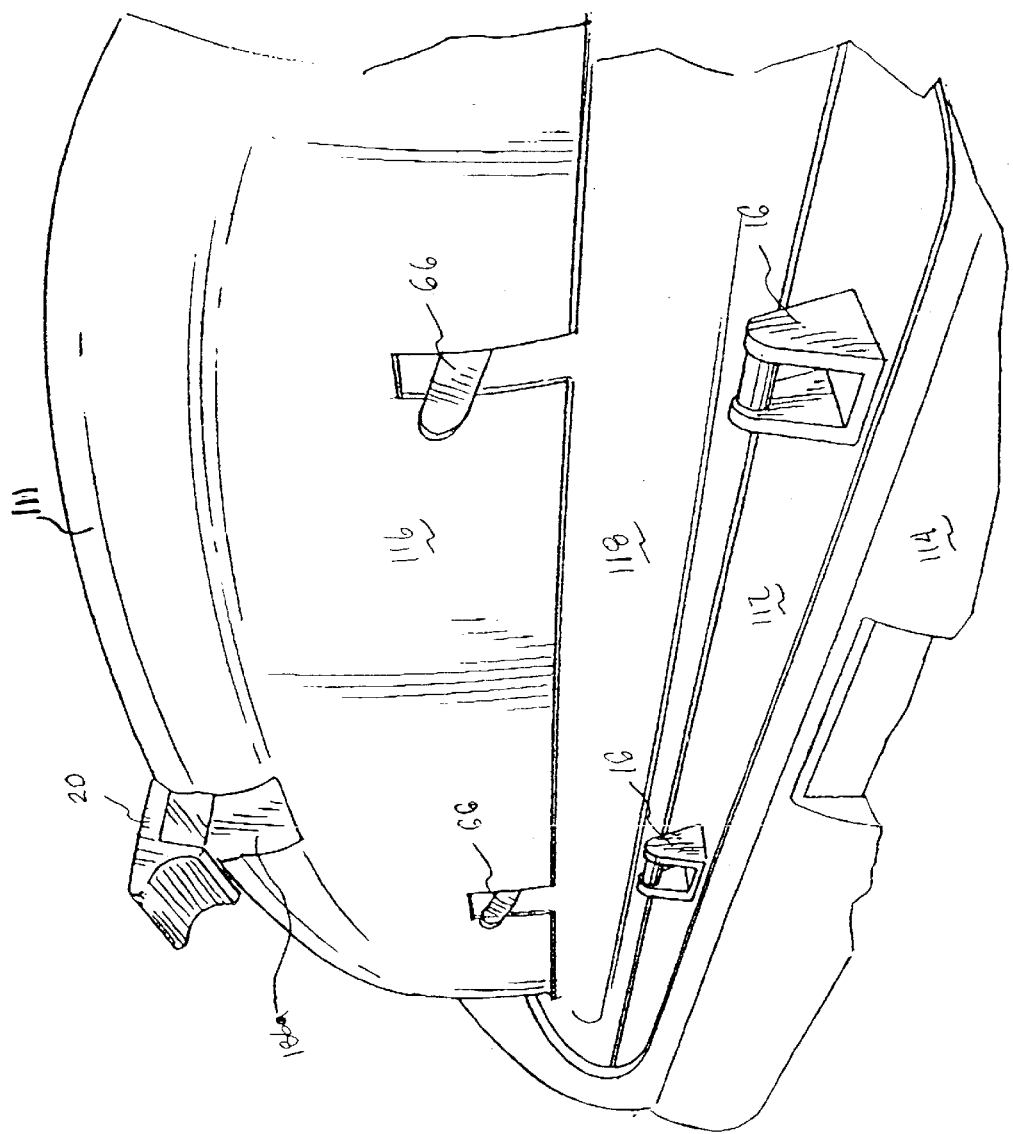
FIG. 3 is a perspective view of the open cover of a trailer showing the latch system of FIG. 2 with a cover member, in accordance with another preferred embodiment of the present invention.

Referring to FIGS. 2–3, a preferred embodiment of the door latching system 10 is shown. The latching system 10 generally includes a hinged latch plate assembly 12 secured to a shaft assembly 14 a portion of which is in rotational cooperation with the hinged latch plate assembly 12, and a pair of keepers 16 affixed to the sill 112 of the main body portion 114.

Figure 4:
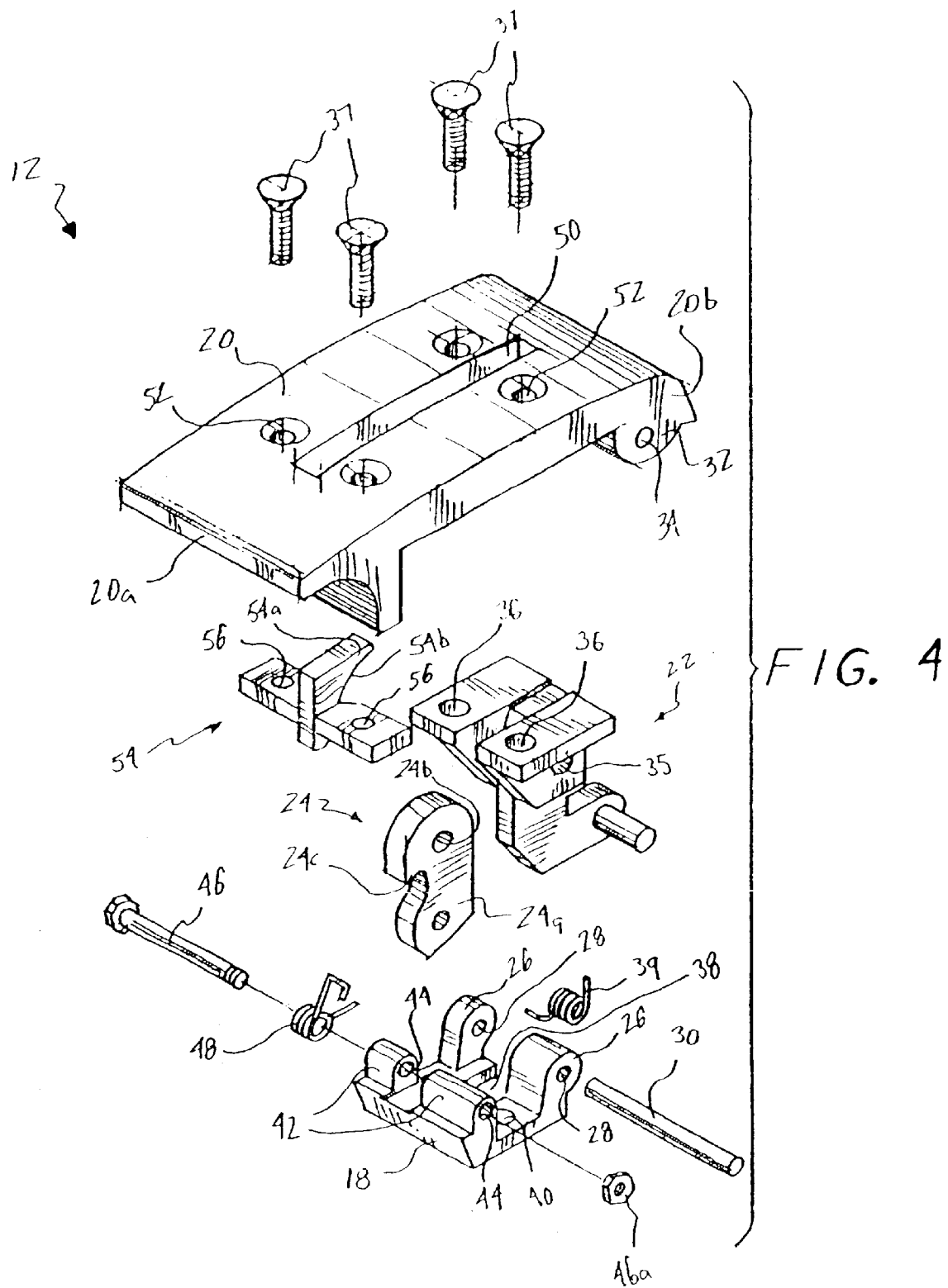
FIG. 4 is an exploded perspective of the latch plate assembly of FIG. 2.

Referring to FIG. 4, the latch plate assembly 12 generally includes a base plate 18, handle 20, latch lever 22 and beak member 24. The base plate 18 includes a first set of opposed members 26 having openings 28 defined therein for receiving a handle pivot pin 30. The handle 20 also includes opposed members 32 having openings 34 defined therein. The latch lever 22 has an opening 35 defined therethrough for receiving the handle pivot pin 30 and a pair of openings 36 defined therethrough for receiving threaded fasteners 37 for securing the latch lever 22 to the handle 20.

In assembling the latch plate assembly 12, the handle pivot pin 30 extends through openings 34 in the handle 20, openings 28 in the base plate 18 and opening 35 in the latch lever 22. The handle pivot pin 30 can be secured in place in a number of different ways. For example, the handle pivot pin may be a bolt secured in place by a nut or it may include a keyway defined therein and be secured in place via a set screw or the like. As shown in FIG. 4, base plate 18 has a recess 38 that receives a portion of the latch lever 22, and allows the latch lever 22 to rotate relative to base 18.

Preferably, the handle pivot pin 30 has a torsion spring 39 thereon to hold the handle 20 (when in the open position) at an angle (preferably approximately a 45° angle) to prevent unintentional engagement of the beak member 24 if the cover 110/111 should accidentally drop shut.

Base plate 18 also includes a plurality of apertures 40 defined therethrough for receiving a plurality of threaded fasteners 41 or the like for securing the base plate 18 to the shaft assembly 14. It will be understood that any method for securing the base plate 18 to the shaft assembly 14 is within the scope of the present invention. For example, the base plate 18 can be secured to the shaft assembly 14 by rivets, welding, gluing or the like.

Base plate 18 includes a second set of opposed members 42 having openings 44 defined therethrough for receiving a beak pivot pin 46. Preferably, the second set of opposed members 42 are located at an end of base plate 18 opposite that of the first set of opposed members 26. In a preferred embodiment, the beak pivot pin 46 is an elongated bolt having a nut 46a for securing the elongated bolt in place. The beak member 24 includes a main body portion 24a through which an opening 24b extends and a beak 24c. The beak pivot pin 46 extends through openings 44 in the base plate 18 and opening 24b in the beak member 24. The beak pivot pin 46 includes a torsion spring 48 or the like thereon for urging the beak member 24 into latched engagement with a striker plate 54, which is secured to handle 20 (as described more fully hereinbelow).

Handle 20 includes a handhold end 20a and a hinge end 20b. The handhold end 20a preferably has serrations thereon for ease of gripping. Defined preferably in a central portion of the handle 20 is an elongated opening 50 having two pairs of apertures 52 defined on opposite sides thereof. The elongated opening 50 is adapted to receive the beak member 24. Apertures 52 receive threaded fasteners 41 or the like for securing the beak striker plate 54 (via apertures 56) to the handle 20. The beak striker plate 54 includes a striker portion 54a that protrudes through elongated opening 50 and is oriented to be engaged by the beak member 24 when the latch plate assembly 12 is in a closed/latched position. The striker portion 54a includes a cam surface 54b that is engaged by the top of the beak member 24 when the latch plate assembly 12 is being closed. The curved shape of the cam surface 54b causes the beak member 24 to be urged inwardly during closing, thereby loading spring 48. As the beak member 24 reaches the end of the cam surface 54b, the spring 48 is at least partially unloaded, and the beak 24c engages the striker portion 54a. The latch plate assembly 12 is now in the latched/closed position. As shown in FIG. 4, the apertures 56 of the beak striker plate 54 correspond to one of the pairs of apertures 52 in the handle 20. Accordingly, threaded fasteners 37 are received therein for securing the beak striker plate 54 to the handle 20.

In a preferred embodiment, the beak is made of aluminum and provides a breakaway feature so that if a vandal attempts to break the into the trailer by prying against handle 20, the beak 24 will break without causing harm to any of the other components. Therefore, the beak 24 can be replaced without having to replace any other parts.

Figure 5:
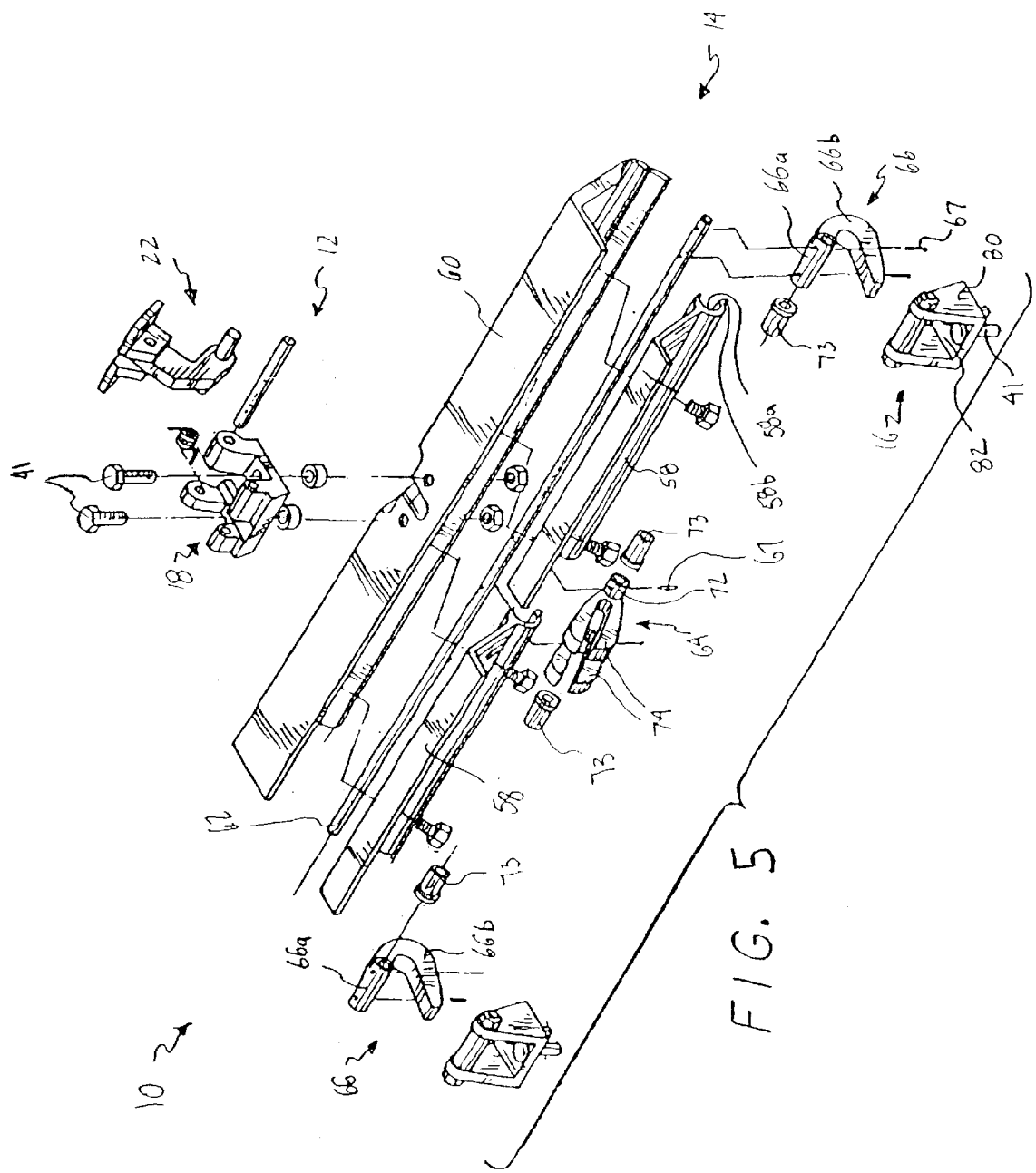
FIG. 5 is an exploded perspective view of the shaft assembly, latch plate assembly and keepers of the latch system of FIG. 2.

Referring to FIG. 5, the shaft assembly 14 generally includes inner shield members 58, an outer shield member 60, an elongated member or shaft 62 having a rotator clevis 64 thereon and a pair of hooks 66 preferably disposed at the ends of the elongated shaft 62. It will be appreciated by those skilled in the art that a number of different components can be substituted for the elongated member 62. For example, without limitation, the elongated member 62 can be a shaft, rod, tube, channeled member, etc. Throughout the specification and figures, an elongated shaft is shown. However, this is not a limitation on the present invention. It will also be appreciated by those skilled in the art that a number of different components can be substituted for the connectors 66. For example, without limitation, the connectors 66 can be hooks, clamps, clasps, magnets, buttons, snaps, latches, pins, etc. Throughout the specification and figures, hooks are shown. However, this is not a limitation on the present invention.

The outer shield member 60 is adapted to be affixed to the underside (and preferably in the latch depression 188b of the inner skin 188) of the front or rear cover 110, 111 (the front cover 110 is used herein for exemplary purposes). It will be understood that the outer shield member 60 provides an anchor for attaching the shaft assembly 14 to the front cover 110. Any method for attaching the shaft assembly 14 to the front cover 110 is within the scope of the present invention.

The inner shield members 58 are secured to the outer shield member 60 in spaced relation to one another. Preferably, the inner shield members 58 are secured to the outer shield member 60 via threaded fasteners 41 (either within tapped holes in outer shield member 60 or using nuts). This allows the shaft assembly 14 to be disassembled for maintenance. However, any method of securing the inner shield members 58 to the outer shield member 60 (i.e., welding, gluing, etc.) is within the scope of the present invention. The gap formed between the inner shield members is to accommodate the rotator clevis 64 as described below. The inner shield members 58 have a semi-tubular portion 58a formed therein and the outer shield member 60 has a semi-tubular portion 60a formed therein. When the inner shield members 58 are secured to the outer shield member 60 the semi-tubular portions 58a and 60a cooperate to form a tube through which the elongated shaft 62 extends. In another embodiment, the elongated shaft 62 can extend through a tube or a pair of tubes that are welded or otherwise secured to the outer shield member 60.

Figure 6:
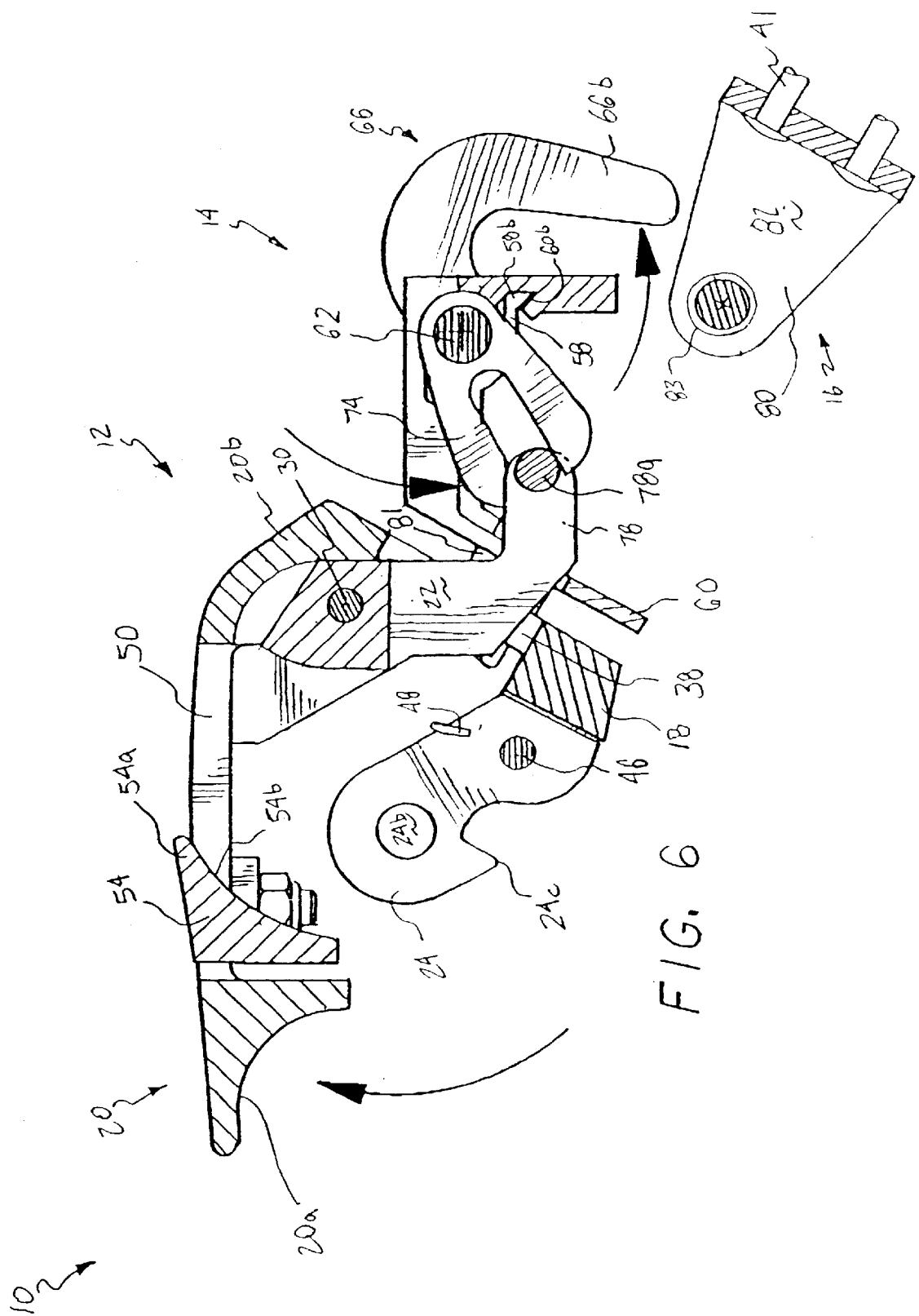
FIG. 6 is a sectional side elevation of the shaft assembly and the latch plate assembly of FIG. 2 in a retracted/unlatched position.

In a preferred embodiment, as best shown in FIG. 6, the inner shield members 58 include a tab portion 58b that is adapted to be received in a corresponding tab receiving portion 60b defined in the outer shield member 60. When the inner shield members 58 are secured to the outer shield member 60, the tab portion 58b is received in the tab receiving portion 60b, thereby helping to align the semi-tubular portions 58a and 60a and helping secure the inner shield members 58 to the outer shield member 60.

Referring again to FIG. 5, the rotator clevis 64 is comprised of a tube 72 having a pair of spaced forks 74 extending therefrom. The hooks 66 are comprised of a tube 66a having a hook member 66b extending therefrom and preferably are disposed at or adjacent to opposite ends of the elongated shaft 62. In a preferred embodiment, the hooks 66 are secured to the elongated shaft 62 by roll pins 67. The hooks can also be secured via a set screw(s) or the like. The hooks 66 may also be welded to the elongated shaft 62 or the hooks 66 and elongated shaft 62 may be formed as a unit.

As described above, the elongated shaft 62 extends through the tube (referred to herein as 72) formed by cooperating semi-tubular portions 58a and 60a. In a preferred embodiment, the tube 72 includes a plurality of bushings 73 therein for supporting the elongated shaft 62 (see the Figures for the preferred placement of bushings 73). The rotator clevis 64 is preferably secured to the elongated shaft 62 by a set screw 67 or a roll pin. The elongated shaft 62 includes apertures or indentations for receiving the set screws 67. In another embodiment, the elongated shaft 62 and the rotator clevis 64 can be formed as a unit or can be welded or otherwise adhered together.

As shown in FIG. 2, the inner shield members 58, 60 are spaced apart to form an opening 76 for receiving the rotator clevis 64 therein. As described below, in operation, the elongated shaft 62 rotates within tube 72, relative to the inner and outer shield members 58 and 60. The opening 76 allows the rotator clevis 64 to rotate as necessary.

Figure 7:
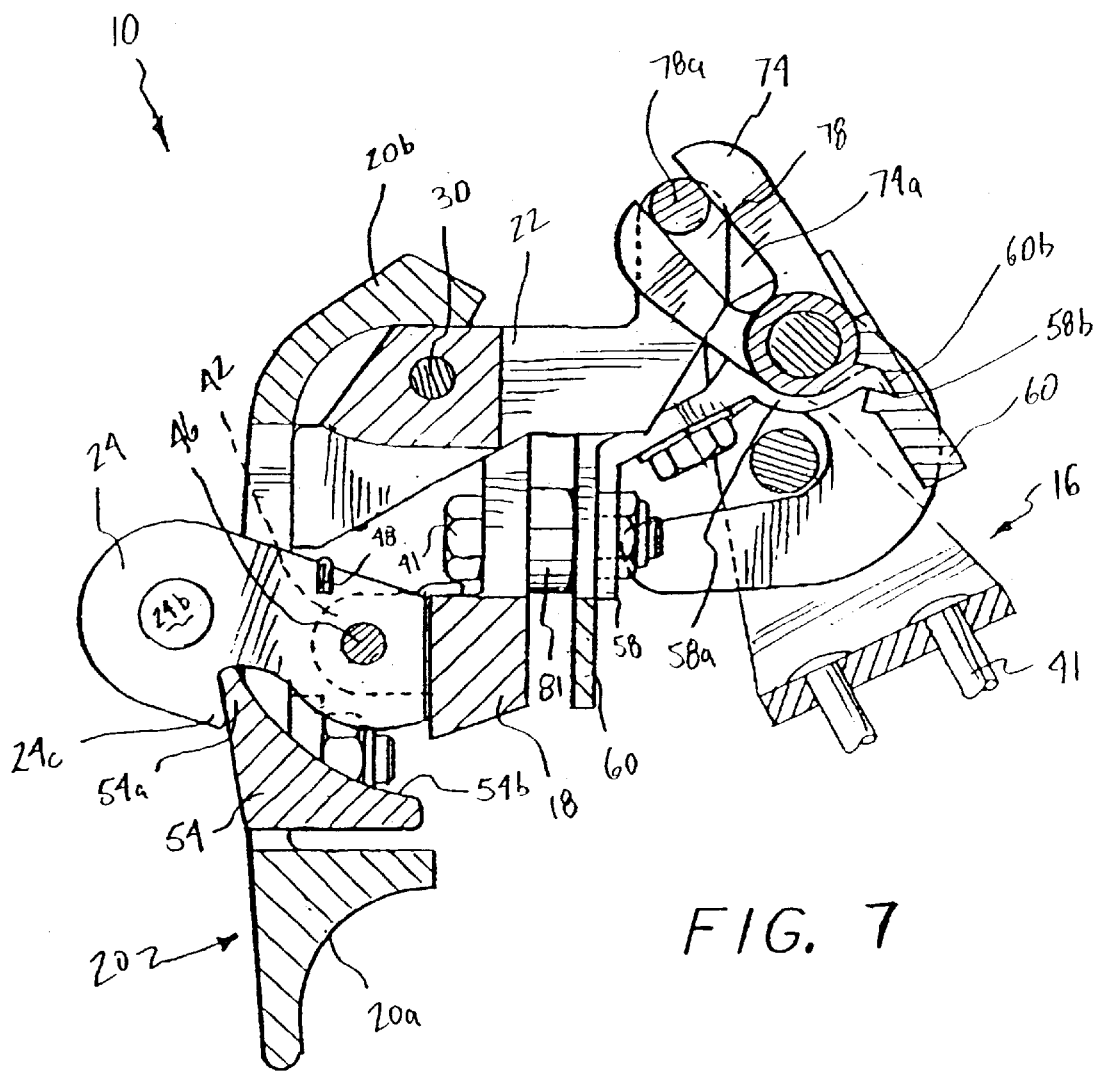
FIG. 7 is a sectional side elevation of the shaft assembly and the latch plate assembly of FIG. 2 in a latched/closed position.
Figure 8:
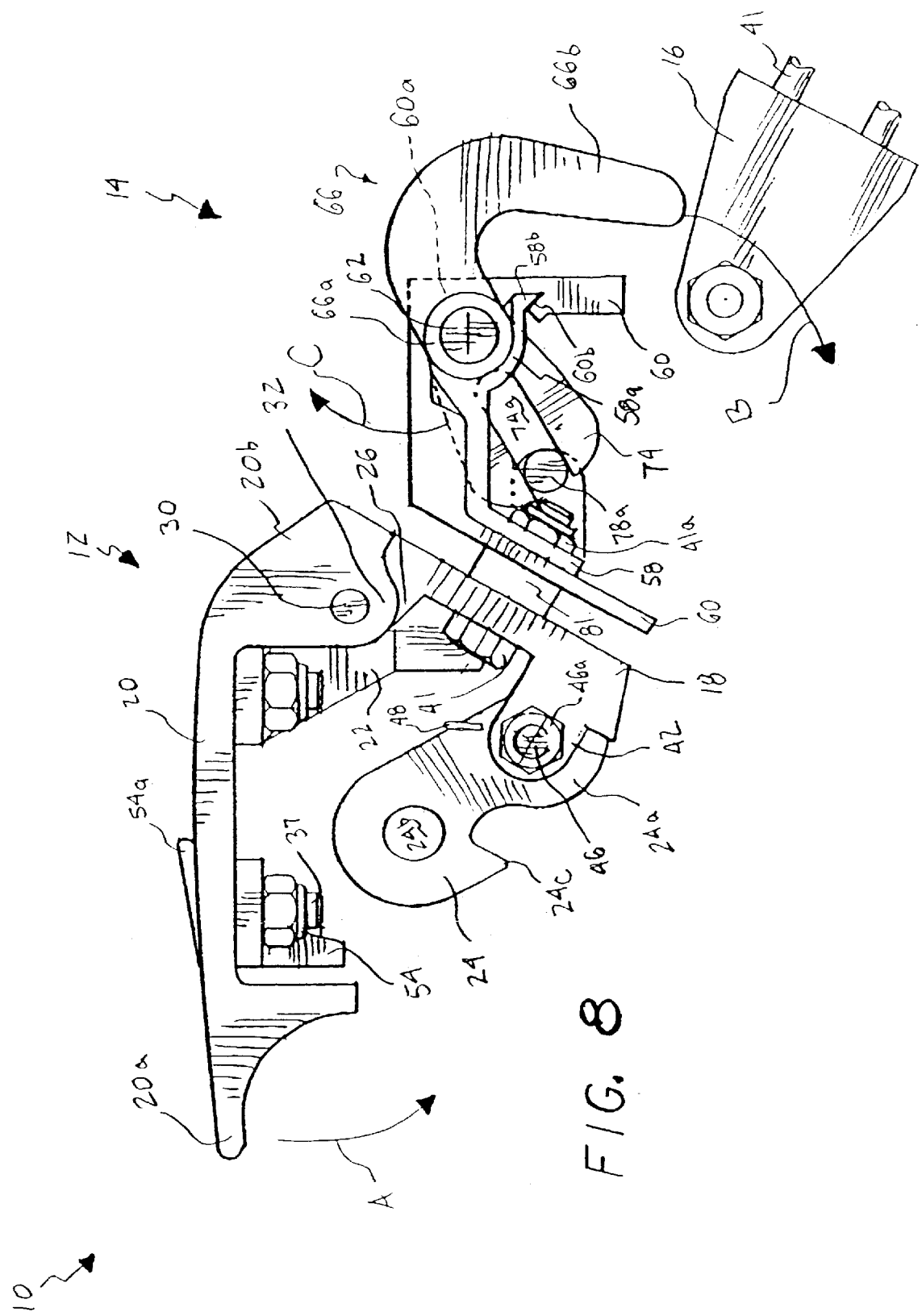
FIG. 8 is a side elevation of the latch system of FIG. 2 in a retracted/unlatched position.
Figure 9:
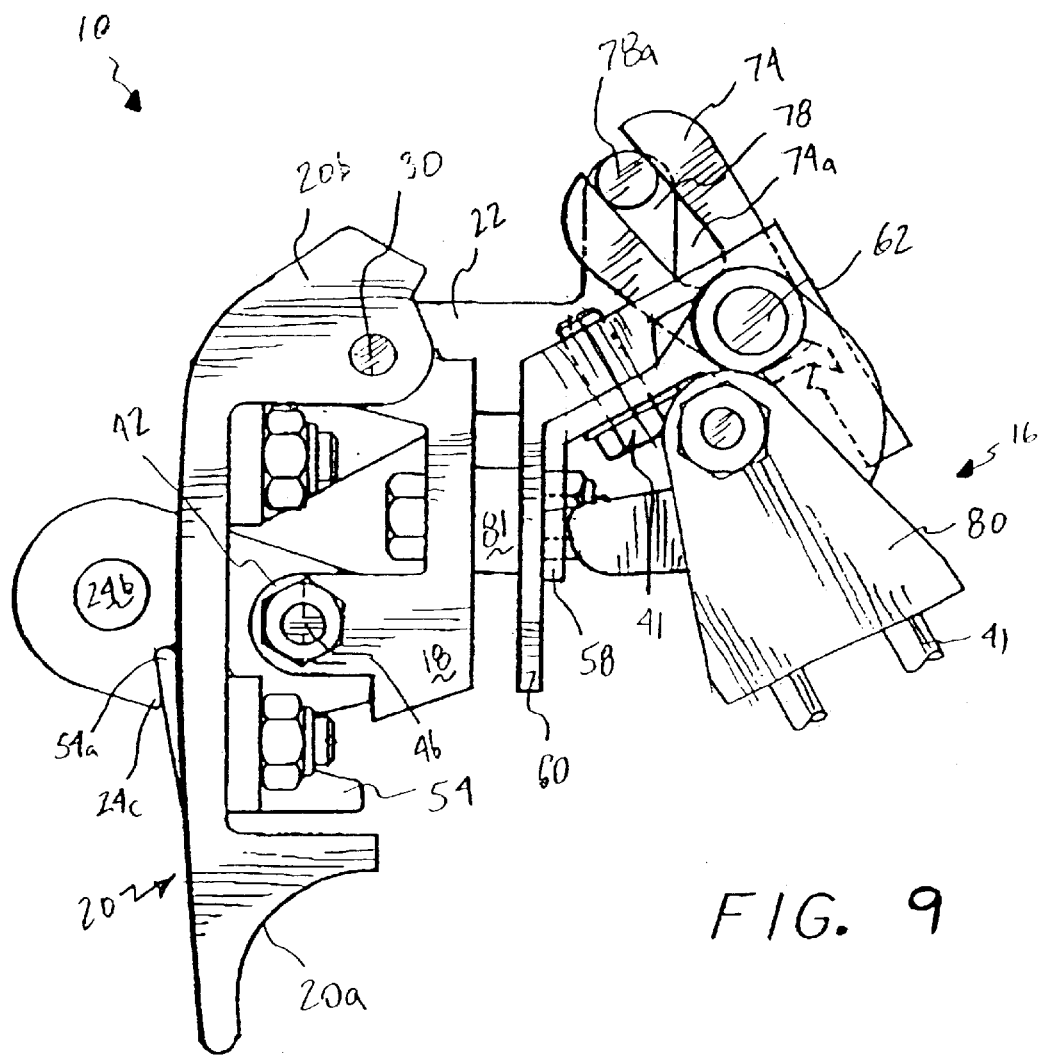
FIG. 9 is a side elevation of the latch system of FIG. 2 in a latched/closed position.
Figure 10:
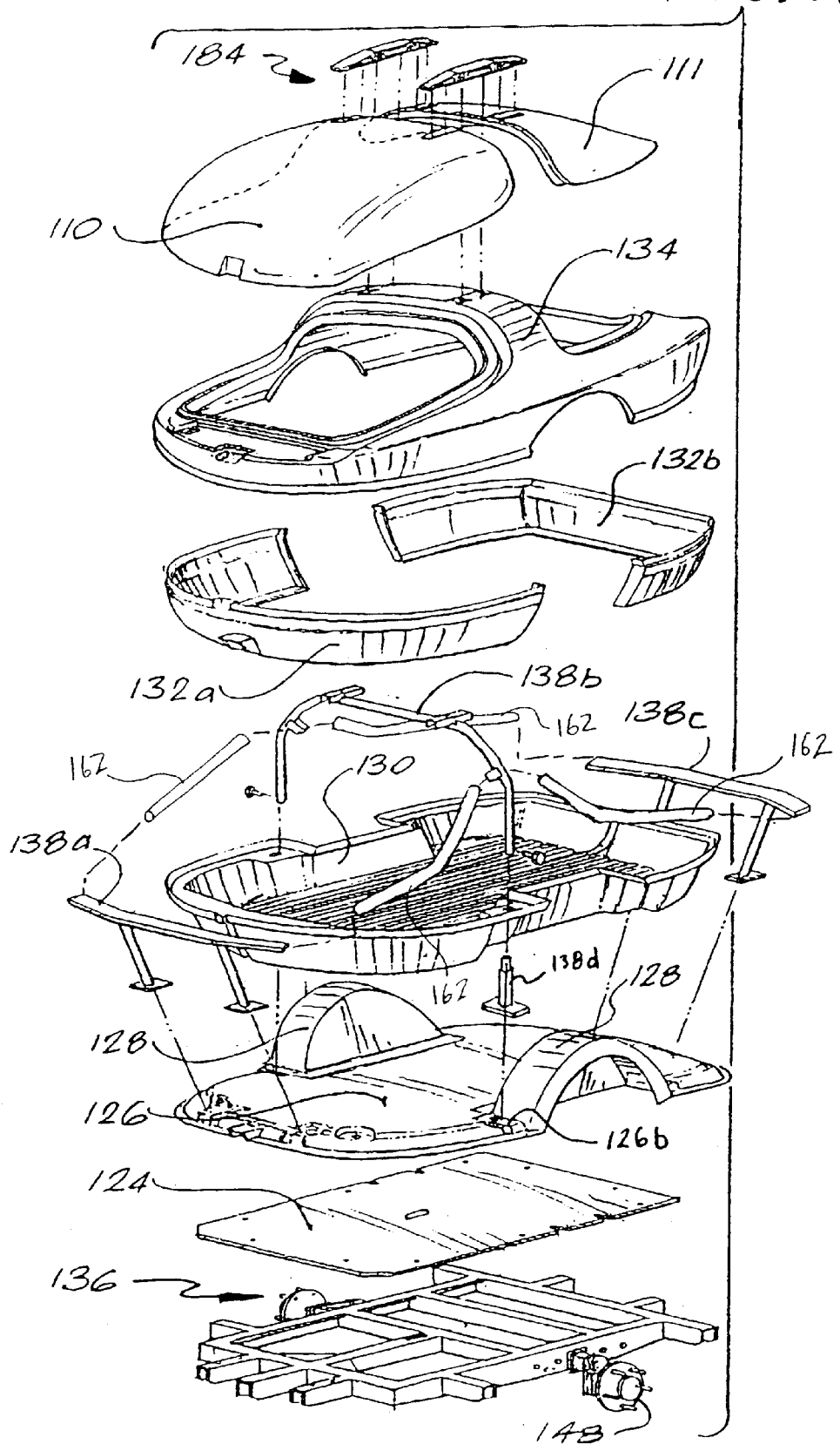
FIG. 10 is an exploded perspective of the components of the trailer of FIG. 1, including the inner frame, deck, floor panel, inner liner, lower and upper body portions, front and rear covers, and hinges.

Referring to FIGS. 7–9, the latch lever 22 includes an engagement member 78 that extends through opening 76 and engages the rotator clevis 64. The engagement member 78 preferably includes a pair of opposed knobs 78a extending laterally therefrom. The opposed knobs 78a are each received in the opening 74a defined within each of the forks 74.

The outer shield member 60 also has a plurality of apertures 79 (as shown in FIG. 5) for receiving the plurality of threaded fasteners 41 or the like for securing the base plate 18 to the shaft assembly 14 as described above. A spacer 81 can be placed on threaded fastener 41 to space the outer shield portion 60 from the base plate 18. In one embodiment of the invention, the front cover 110 can include a protection member 116 (see FIG. 3) that substantially encloses the shaft assembly 14, but has openings defined therein for allowing the hooks 66 to extend therethrough for engagement with the keepers 16.

Referring again to FIGS. 2 and 5, the keepers 16 generally include a main body portion 80, a tubular portion 83 and a hook receiving opening 82. The keepers are secured to the sill 112 of the main body portion 114 by threaded fasteners 41. Any securing method is within the scope of the invention. The keepers 16 are positioned on the sill 112 so that they correspond to the hooks 66 when the front cover 110 is closed.

Preferably, the components of the latching system are made of a rigid material such as a metal. However, the type of material used is not a limitation on the present invention. In a preferred embodiment, many of the components of the latching system (the handle, the inner and outer shield members, the base plate) are made using an extrusion process instead of a casting process (however casting can be used if desired) for efficiency and limitation of manufacturing costs.

The operation of the latching system 10 will now be described. It will be understood that the front cover 110 has an open position where the cover 110 is spaced above the main body portion 114 and a compartment 118 defined within the main body portion 114, and a closed position where the cover 110 engages the main body portion 114. It will be further understood that the latching system 10 has a retracted/unlatched position and a closed/latched position. In general, hinged operation of the handle 20 causes movement of the latch lever 22 which in turn drives rotational movement of the hooks 66 via rotation of the rotator clevis 64 and elongated shaft 62.

The front cover 110 preferably defines a cavity 186a therein for receiving the handle 20. When the handle is in the closed/latched position, the handle is substantially flush with the top surface of the front cover 110. FIG. 2 shows the latch system 10 in the retracted unlatched position and the front cover 110 in the open position with the protection member 116 removed (FIG. 3 shows the protection member 116 in place, in accordance with another preferred embodiment). To latch the latching system 10, the front cover 110 is closed, such that the hooks 66 and keepers 16 are in close proximity. The handle 20 is then hinged or pivoted inwardly (see arrow A in FIG. 8), relative to the base plate 18. This movement urges the latch lever 22 generally in the same arcuate direction as the hand-hold end handle 20 pivots (see arrow A in FIG. 8). Latch lever 22 moves within opening 76 between the inner shield members 58 and recess 38 in the base plate 18. The movement of the latch lever 22, the knobs 78a of which are engaged within the forks 74 of the rotator clevis 64, causes rotational movement of the rotator clevis 64 (see arrow C in FIG. 8), the elongated shaft 62 and ultimately the horizontally spaced hooks 66 on the ends of the elongated shaft 62 (see arrow B in FIG. 8). The rotation of the hooks 66 causes the hook member 66b to be received in the hook receiving opening 82 of the keepers 16, thereby latching the front cover 110 to the main body portion 114. It will be understood that the hooks 66 rotate in an arcuate direction (see arrow B in FIG. 8) substantially opposite of arrow A. It will be understood that the arrows in FIG. 8 illustrate the rotational direction of the components when the latching system 10 is being closed, and the arrows in FIG. 6 illustrate the rotational direction of the components when the latching system 10 is being opened.

In a preferred embodiment, there is a resilient compressible material or seal 108 (see FIG. 38) provided between the main body portion 114 and the front cover 110. It will be understood that the seal 108 can be disposed on the main body portion 114 or the front cover 110 (or the rear cover 111). As the hooks 66 engage the keepers 16, the keepers 16 are oriented such that the inner surface of the hook member 66b engages a tubular portion 83 of the keeper 16. As the hook further enters the hook receiving opening 82, the force of the hook member 66b against the tubular portion 83 increases, thereby compressing the resilient material and sealing the compartment 118.

As the handle 20 is hinged toward the closed position (with enough force to overcome the urging of the torsion spring 39 and the friction between the cam surface 54b and the beak member 24), the beak member 24 is received in the elongated opening 50 of the handle 20. As the beak 24c passes through the elongated opening 50, the spring 48 urges the beak 24c into engagement with the beak striker plate 54 as described above. It will be appreciated by those skilled in the art that the elements of the latch plate assembly 12 are dimensioned such that when the handle 20 is in its closed/latched position, the beak 24c engages the beak striker plate 54 and holds the latch plate assembly in its closed/latched position. In a preferred embodiment, the beak member 24 has a lock opening 24b defined therethrough for receiving a padlock or the like and preventing unauthorized unlatching of the latching system 10 and opening of the front cover 110.

Referring to FIGS. 1 and 10–19, main body portion 114 includes a frame 122, a deck 124, a floor panel 126, wheel housings 128, an inner liner 130, a lower body portion 132 (having a front and a rear section 132a, 132b) and an upper body portion 134.

Figure 11:
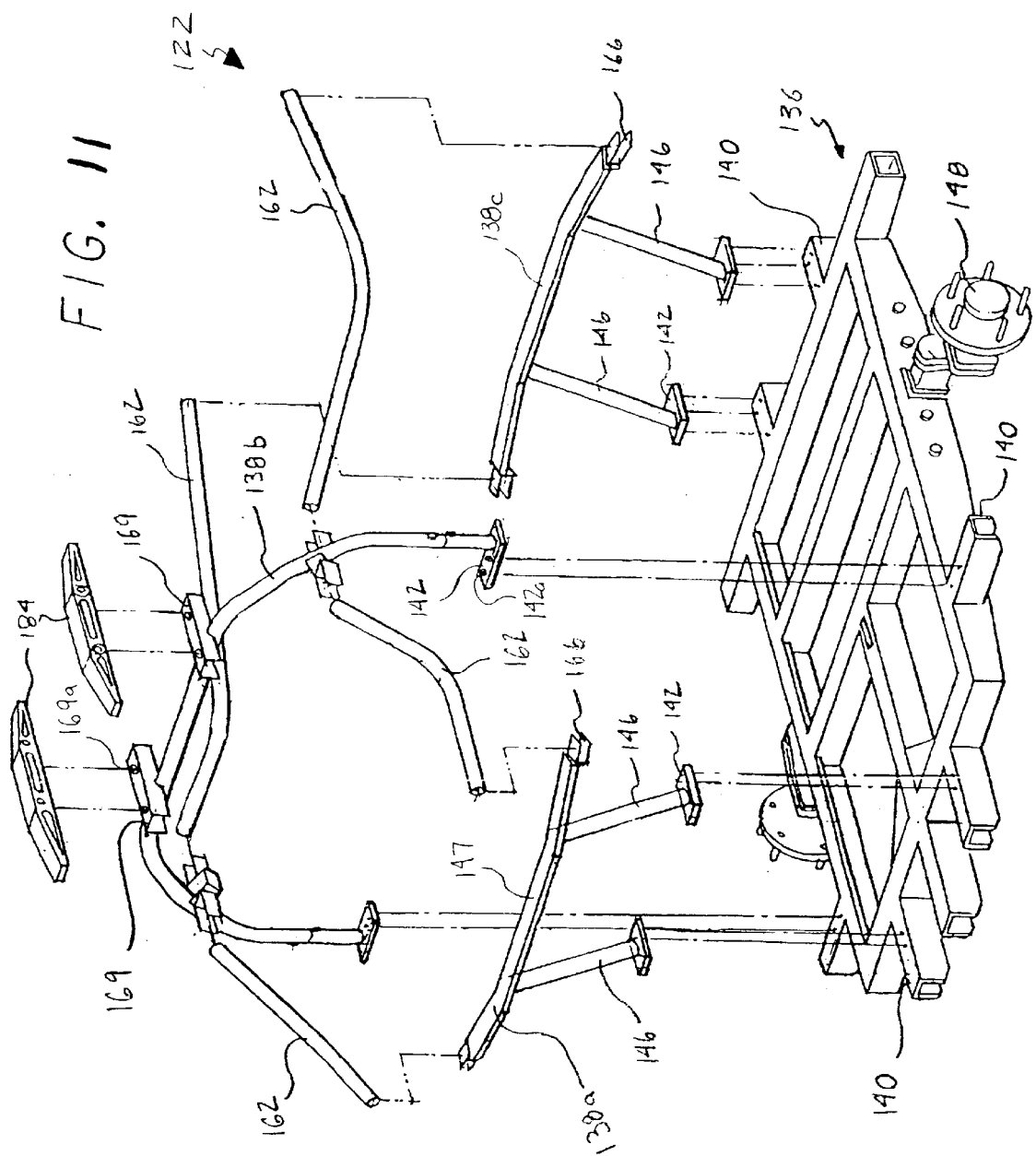
FIG. 11 is an exploded perspective of the inner frame of the trailer of FIG. 1.

As shown in FIG. 11, the frame 122 includes lower frame portion 136 and a plurality of support members 138. The lower frame portion 136 supports a substantial amount of the weight of the overall trailer 100. Lower frame portion 136 preferably has a plurality of frame horns 140 extending therefrom. The frame horns 140 provide mount/support points for the support members 138. In a preferred embodiment, the support members 138 include attachment plates 142 at the ends thereof that have openings 142a defined therein through which threaded fasteners 37 extend. The threaded fasteners 37 also extend through corresponding openings 126a in the floor panel 126 and are received in corresponding openings 140a in the frame horns 140 and are secured therein with nuts, thereby securing the support members 138 to the lower frame portion 136. It will be understood that any method for connecting the support members 138 to the frame horns 140 or the lower frame portion 136 is within the scope of the present invention.

Figure 12:
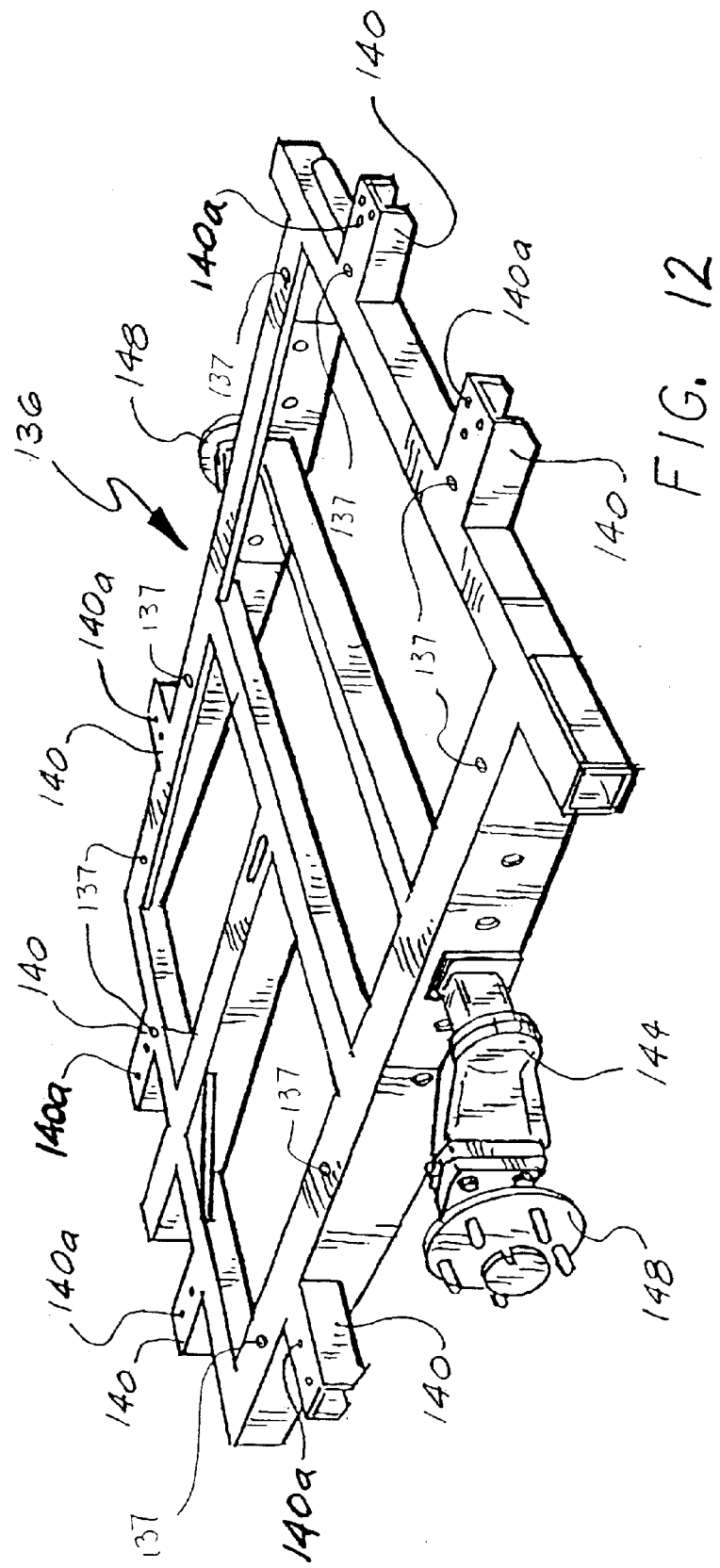
FIG. 12 is a perspective view of the lower frame portion of the trailer of FIG. 1.
Figure 14:
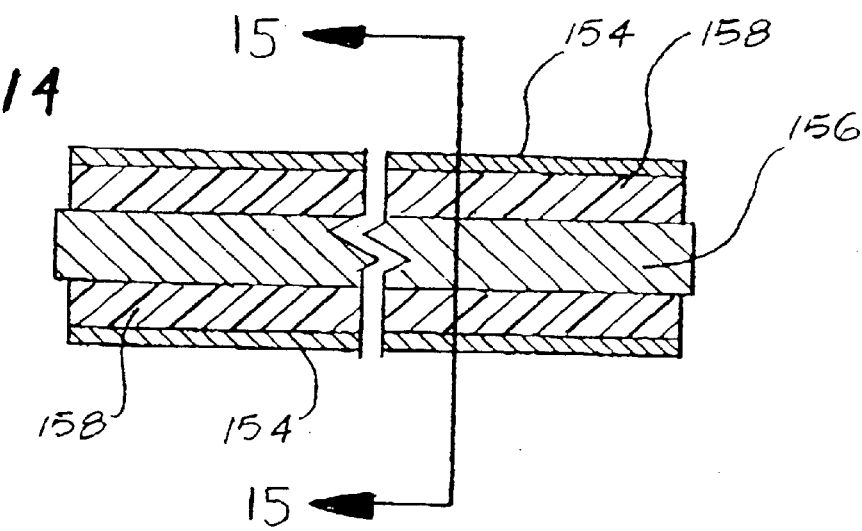
FIG. 14 is a cross-sectional view of a portion of the torsion axle taken along line 14—14 of FIG. 13.
Figure 13:
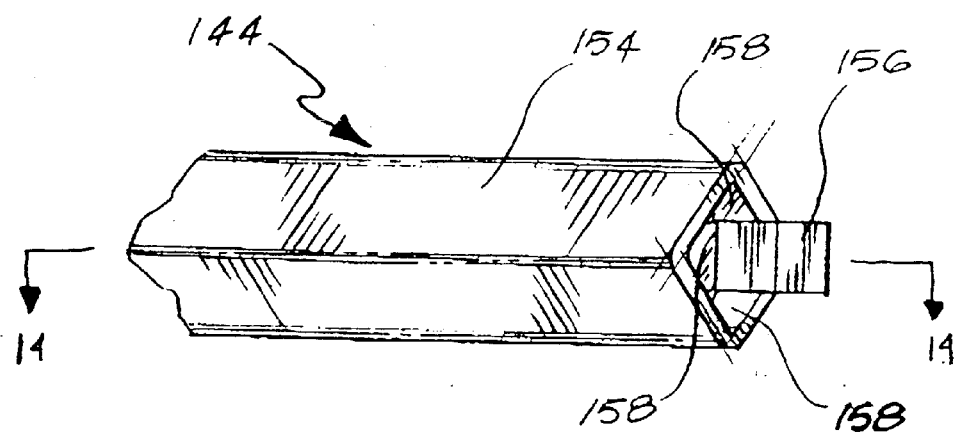
FIG. 13 is a perspective view of a the tubular member, square shaft and elastomeric pieces of the torsion axle in accordance with a preferred embodiment of the present invention.

As shown in FIG. 12, the lower frame portion 136 also includes a plurality of perimeter holes 137 defined therein. The perimeter holes 137 align with similar perimeter holes 137 in the floor panel 126, deck 124 and the inner liner 130. Threaded fasteners 137 extend through the aligned perimeter holes 137, and are secured in place (either by a nut or a tapped perimeter hole 137), thereby securing the inner liner 130 to the floor panel 126, deck 124 and the lower frame portion 136.

Figure 15:
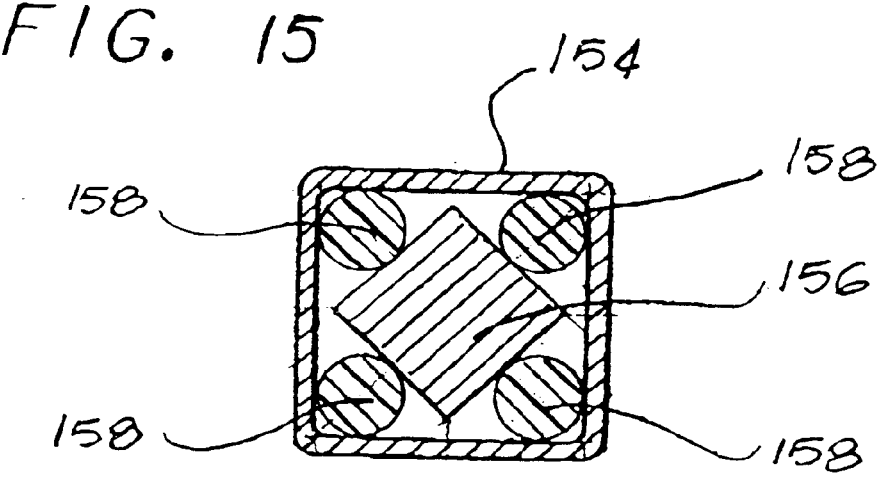
FIG. 15 is a cross-sectional view of a portion of the torsion axle taken along line 15—15 of FIG. 14, showing the square shaft at a position of rest.
Figure 16:
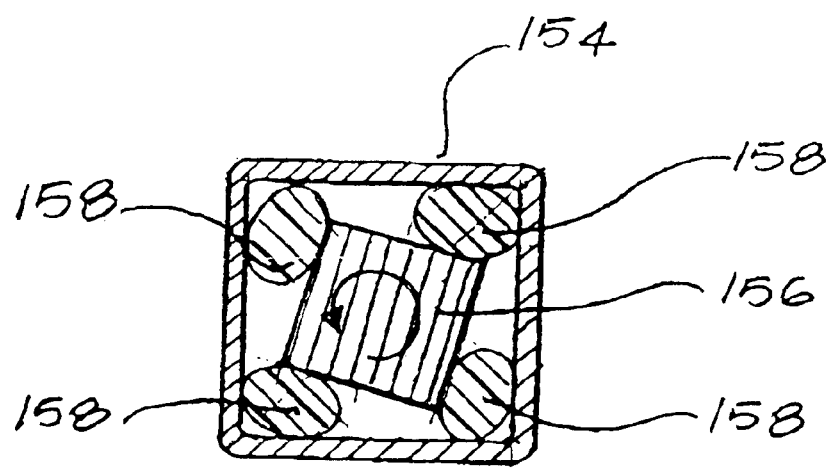
FIG. 16 is a cross-sectional view similar to FIG. 15, but showing the square shaft in a torqued position.

The lower frame portion 136 also includes an axle 144 mounted thereto (in another embodiment the lower frame portion 136 may include a plurality of axles) that spans the lower frame portion 136 in a lateral direction. The axle 144 includes hubs 148, wheels 150 and tires 152, etc. on the ends thereof, as is known in the art. Preferably the axle 144 is a torsion axle, which provides suspension to the trailer 100. In one embodiment, as shown in FIGS. 13–16, the torsion axle 144 includes a tubular member 154 having a square cross section, a square shaft 156 that extends therethrough (but that is rotated approximately 45° relative to the tubular member, as shown in FIG. 15), and four elastomeric pieces 158 inserted between the sides of the square shaft 156 and the inner surfaces of the tubular member 154. A pair of spindle arms 160, to which the hubs 148 are attached, extend from the ends of the square shaft 156. The elastomeric pieces 158 are preferably placed in a state of compression during assembly. In operation, when the trailer 100 goes over a bump and the wheels 150 go up and down, the spindle arms 160 cause the square shaft 156 to rotate (and assume a torqued position). The elastomeric pieces 158 are further compressed (as is shown in FIG. 16), thereby dampening the load and absorbing the shock caused by the bump. In another embodiment, the elastomeric pieces 158 can be bonded directly to the square shaft 156. In a preferred embodiment, the axle 144 is mounted to the lower frame portion 136 with the spindle arm extending forwardly so that upward movement of the suspension arm tends to relieve weight on the coupler 102*a*, rather than to increase it as is typical of the common rearward extending torsion axle spindle arm.

The lower frame portion 136 also includes the tongue 102 having a coupler 102*a* (such as a hitchball coupler) extending forwardly therefrom. The tongue 102 may include a jack or other similar lifting device or brakes or wires, etc. thereon.

Figure 19:
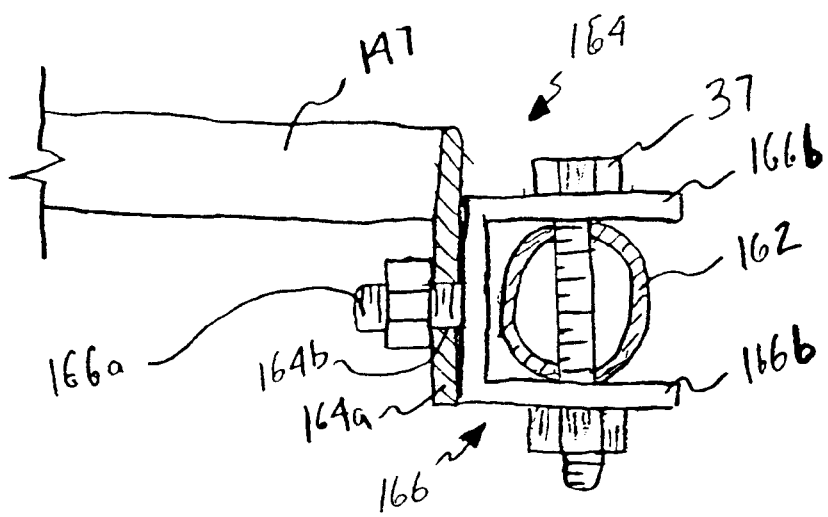
FIG. 19 is a front elevational view (partially in section) of an end of the front (or rear) support members showing a levis connection and taken along line 19 of FIG. 21.

The frame 122 preferably includes front, middle and rear support members 138*a*, 138*b* and 138*c* that are attached longitudinally by elongated members 162. As shown in FIG. 11, the elongated members 162 can.have a slight bend formed therein to extend between support members 138 in a desirable manner and within the confines of the body shape. It will be understood that the support members are referred to generically as 138, the front support member is referred to as 138*a* the middle support member is referred to as 138*b* and the rear support member is referred to as 138*c*. As shown in FIG. 11, the front support member 138*a* extends upwardly from the frontmost frame horns 140 and includes upright frame members 146 (the attachment plates 142 are attached to the ends of the upright frame members 146) and a support portion 147. Preferably, the upright frame members 146 of the front support member 138*a* extend through a pair of openings in the inner liner 130. The support portions 147 have attachment points 164 at their opposite ends for the elongated members 162. In a preferred embodiment, the attachment points 164 comprise flanges 164*a* that extend downwardly at each end. The flanges 164*a* have openings or slots 164*b* therein that receive the threaded stud 166*a* of a bifurcated attachment member 166. The opposing members 166*b* of the bifurcated attachment member 166 have openings therein through which a threaded fastener 37 extends, thereby securing the end of the elongated member 162 therebetween, as is shown in FIG. 19. This type of connection allows acts as a joint and allows the elongated member 162 to pivot about threaded fastener 137 if necessary. This type of connection is referred to herein as a bifurcated connection. As shown in FIG. 20, The support portion 147 also has at least two slots 147*a* formed therein for securing the keepers 16 thereto.

The rear support member 138*c*, which is similar to the front support member 138*a*, extends upwardly from the rearmost frame horns 140 and includes upright frame members 146 (the attachment plates 142 are attached to the ends of the upright frame members 146) and a support portion 147 that has attachment points 164 at its opposite ends for the elongated members 162. In a preferred embodiment, the attachment points 164 comprise flanges 164*a* that extend downwardly at each end. The flanges 164*a* have openings or slots 164*b* therein that receive the threaded stud 166*a* of a bifurcated attachment member 166, as best shown in FIG. 19. In a preferred embodiment, the elongated members 162 are secured to each of the support members 147 via bifurcated connections. However, it will be understood that any method for securing the elongated members 162 to the support members 147 at the attachment point 164, such as welding, gluing, etc., is within the scope of the present invention.

Referring to FIGS. 20–23, the middle support member 138*b* preferably comprises an arc-shaped member that has attachment plates 142 at its ends that engage the middle two frame horns 140. In a preferred embodiment, the middle support member 138*b* includes support legs 138*d* at its ends. The support legs 138*d* have a smaller diameter than the remainder of the middle support member 138*b* and are received therein. A threaded fastener 37 or the like is inserted through aligned openings in the middle support member 138*b* and support leg 138*d* to secure the two components to one another (see FIG. 33*b*). The attachment plates 142 are located at the end of the support legs 138*d*.

Figure 22:
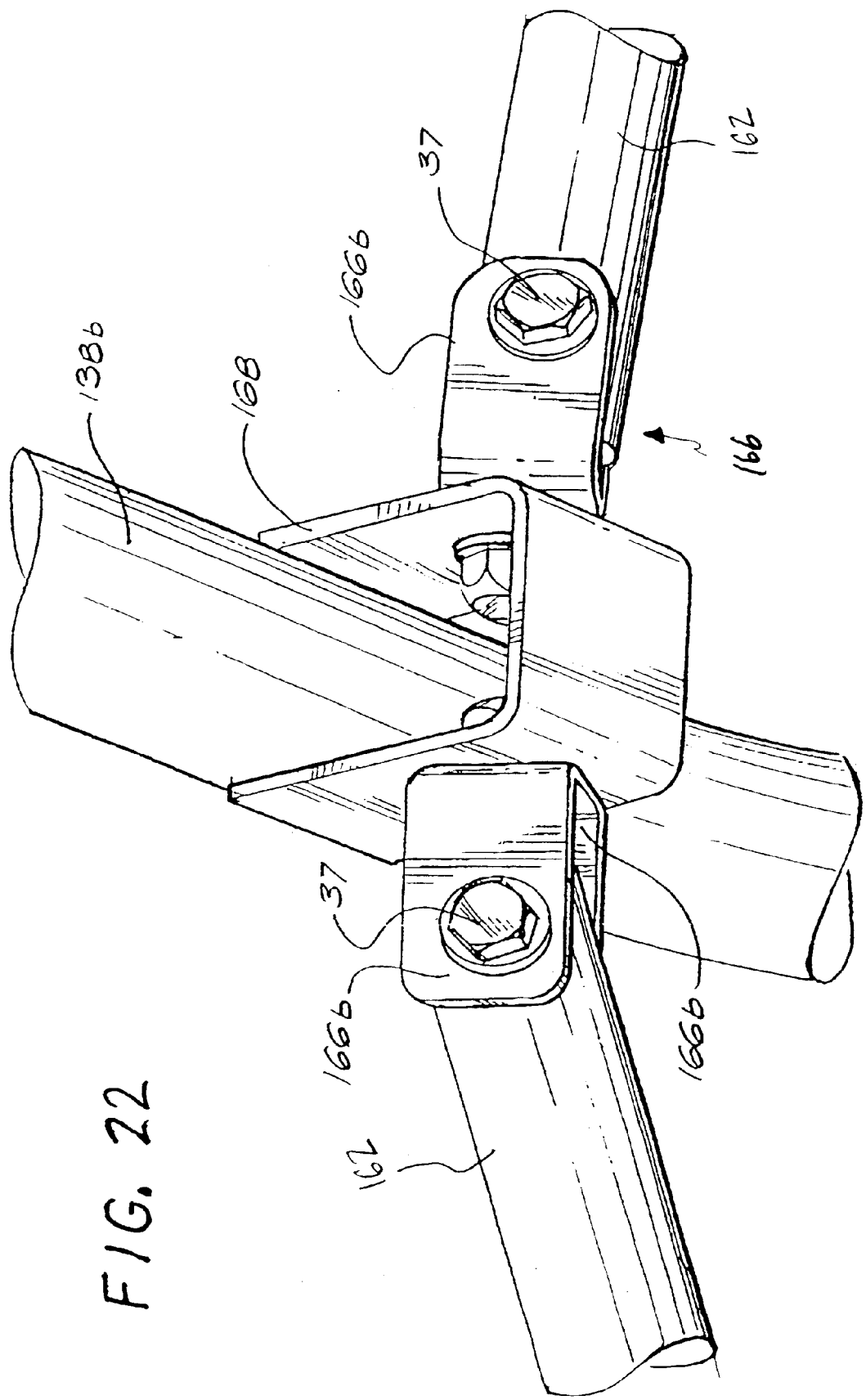
FIG. 22 is a perspective view of the dual clevis connections on the bracket located on the middle support member of the inner frame.
Figure 23:
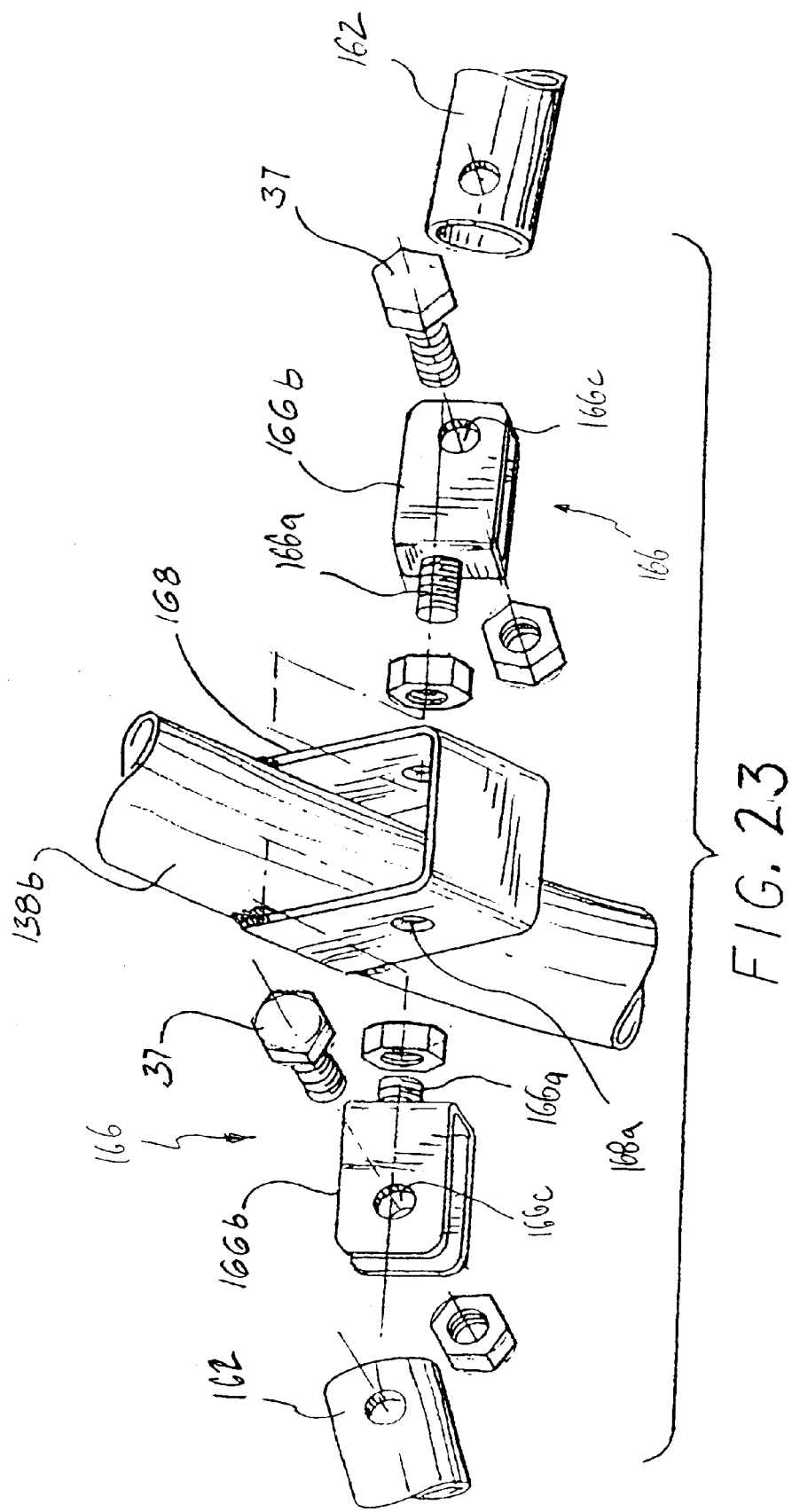
FIG. 23 is an exploded perspective of the components shown in FIG. 22.

Referring to FIGS. 22–23, the middle support member 138*b* includes, in at least two places along the longitudinal extent thereof, a clamp 168 for securing an end of an elongated member 162. The clamp 168 is preferably welded to the middle support member 138*b* and has two openings 168*a* defined therein through which the threaded stud 166*a* of a bifurcated attachment-member 166 extends (and which is secured therein using a nut), thereby providing a bifurcated connection point for the elongated members 162. In a preferred embodiment, there are two elongated members 162 extending between the middle support member 138*b* and the rear support member 138*c*, and two elongated members 162 extending between the middle support member 138*b* and the front support member 138*a*.

Referring again to FIGS. 20 and 21, the middle support member 138*b* has at least one, and preferably two, mounting brackets or mounting surfaces 169 attached to the top thereof for supporting the upper body portion 134. In a preferred embodiment, the mounting surface 169 comprises a bracket that is affixed to the top of the middle support member 138*b* and is positioned to support the weight of the upper body portion 134. Any number of support members 138 or mounting brackets 169 is within the scope of the present-invention.

Preferably, all of the components of the frame 122 (the lower frame portion 136, the support members 138, the frame horns 140, etc.) are comprised of steel or other rigid metal or material, such as aluminum. The components of the frame 122 may also be made of a composite that is at least 50% metal, and more preferably 75% metal., However, the entire frame 122 or separate components thereof can be comprised of other materials such as a rigid plastic or the like. Also, various components can be affixed to one another by welding, gluing or with threaded fasteners or other conventional attachment or connection methods. Furthermore, the entire frame 122 or components thereof can be formed as one unit. It will be understood that the material used and the method of affixing components to one another are not intended to be limitations on the present invention.

Figure 24:
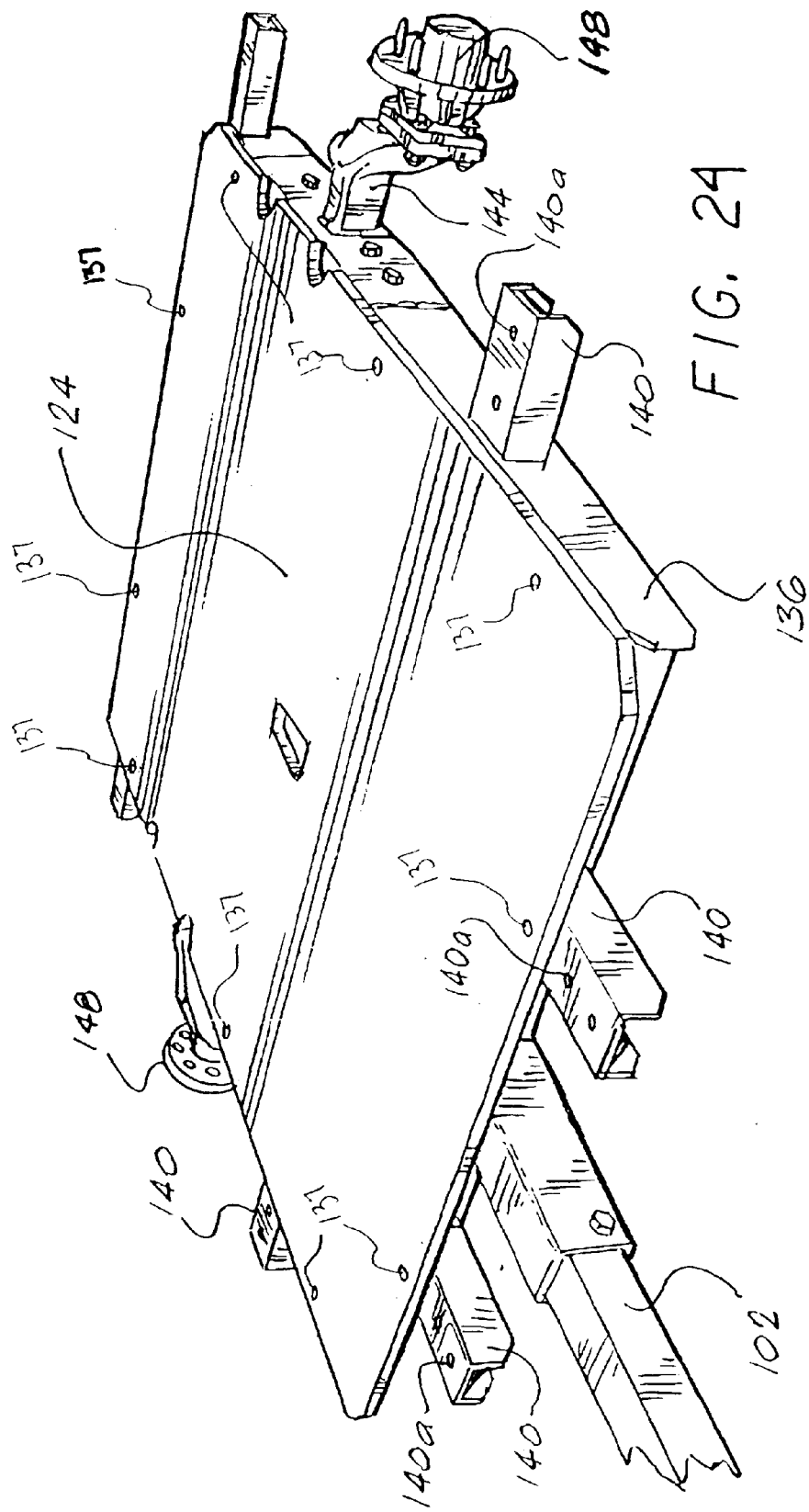
FIG. 24 is a perspective view of the lower frame with the deck thereon.
Figure 38:
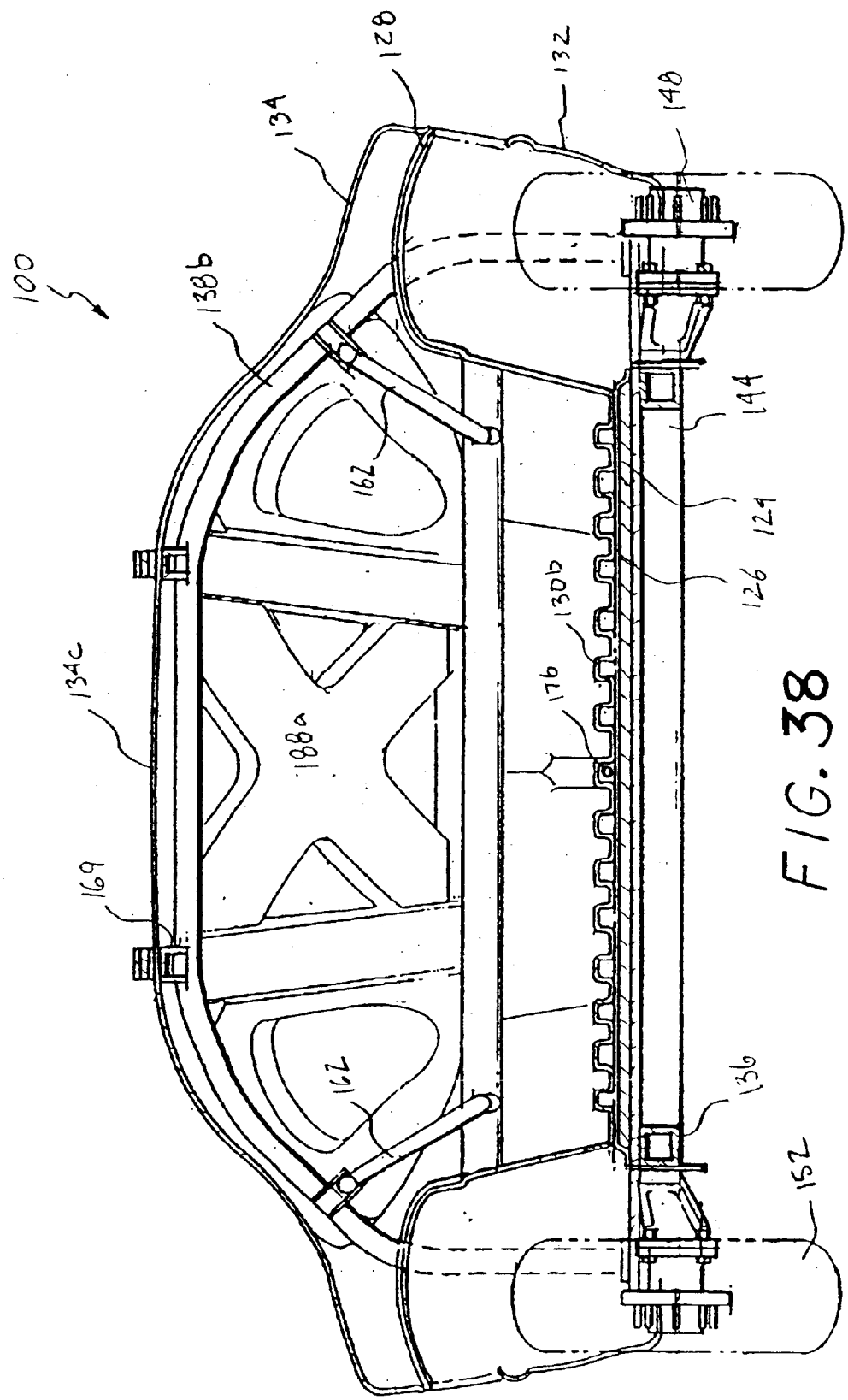
FIG. 38 is a cross-sectional side elevational view of the trailer of FIG. 1 taken along line 38—38 of FIG. 1.

Referring to FIG. 24, the deck 124 is preferably comprised of wood and is secured on top of the lower frame portion 136 by threaded fasteners 37. The deck 124 can also be comprised of a plastic or metal. The deck 124 covers the open areas of the lower frame portion 136 and provides support for the floor panel 126 and inner liner 130. The deck 124 is preferably seal-coated with a sprayable urethane or the like that blocks absorption of moisture. Perimeter openings 137 in the deck 124 accommodate threaded fasteners 37. As described below, a center hole 124*a* allows a wire harness 176 to pass through from below the lower frame 136 into the ribbed floor portion of the inner liner 130, as shown in FIG. 38.

Figure 25:
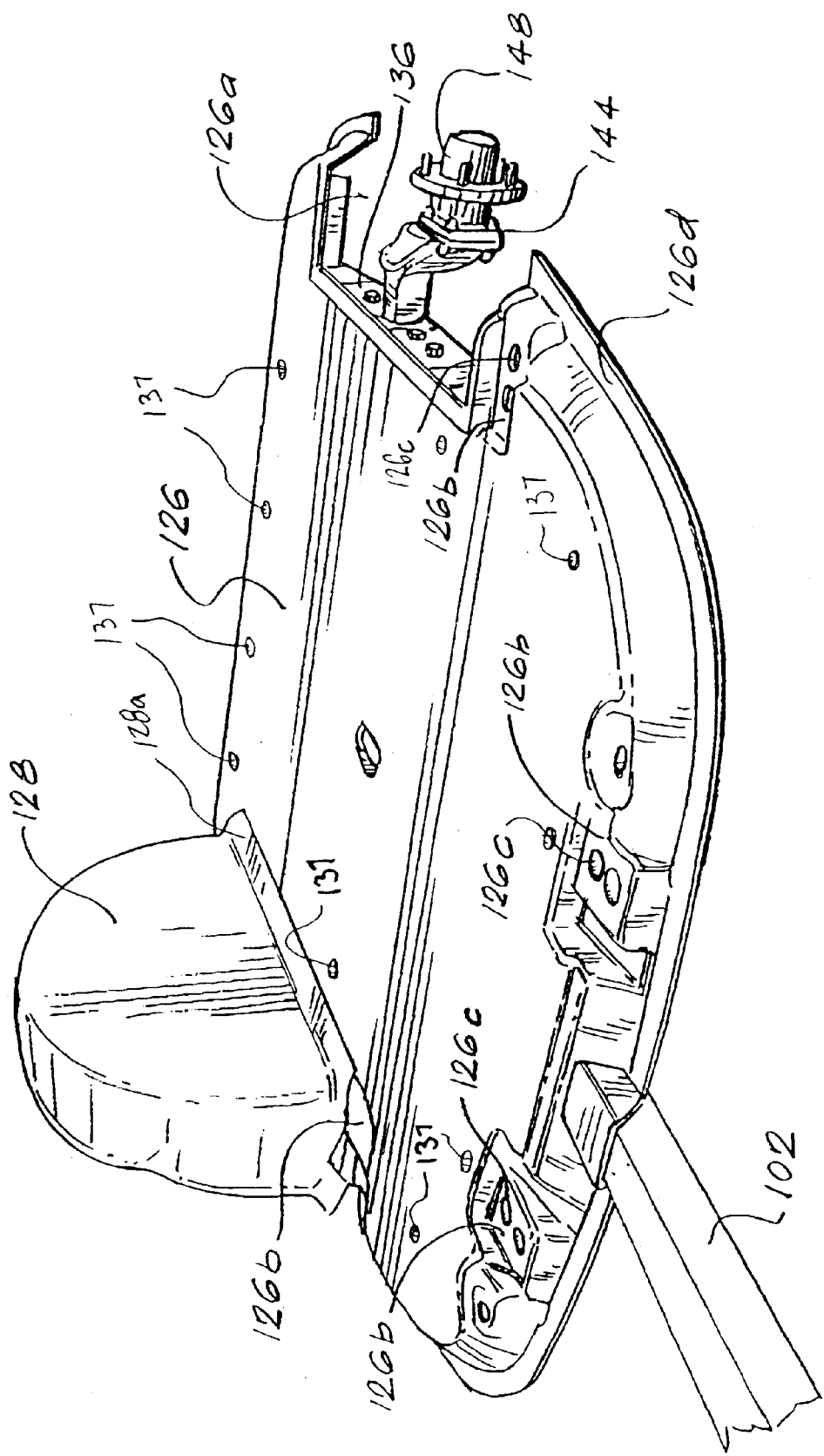
FIG. 25 is a perspective view of lower panel with one wheel housing secured thereto.
Figure 26:
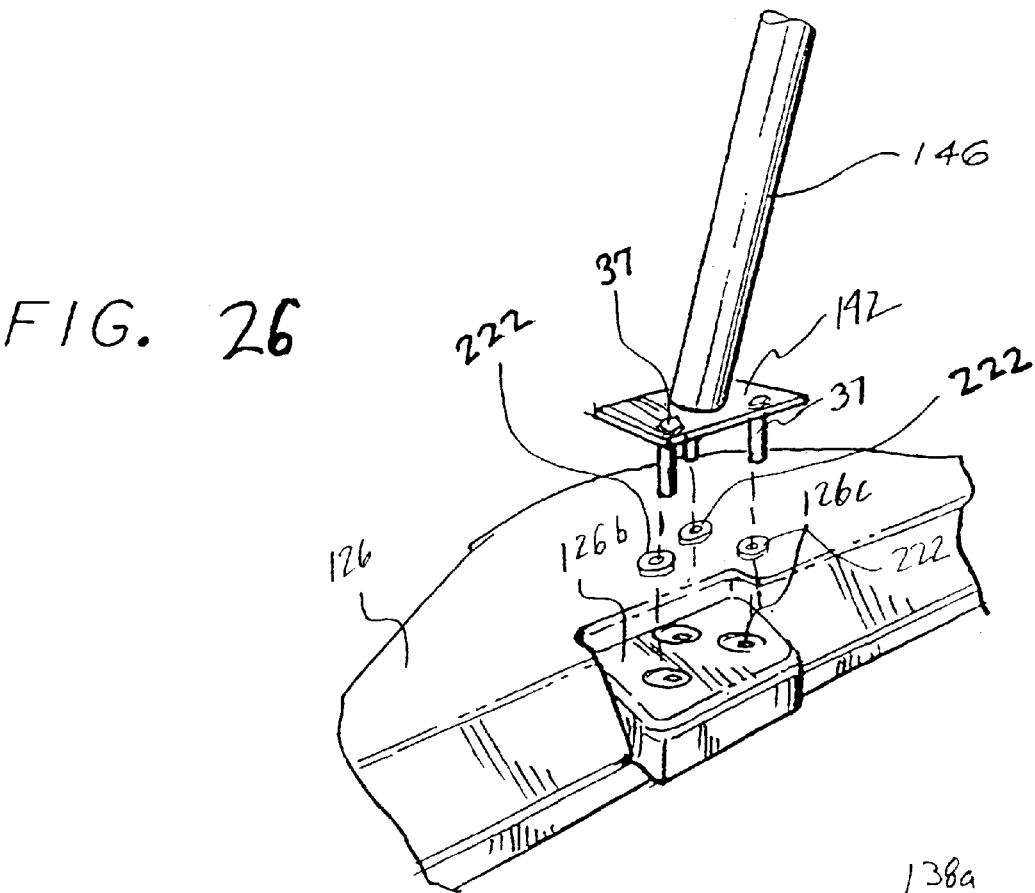
FIG. 26 is a detailed perspective view of an attachment plate of the middle support member exploded from an indented portion of the floor panel.
Figure 27:
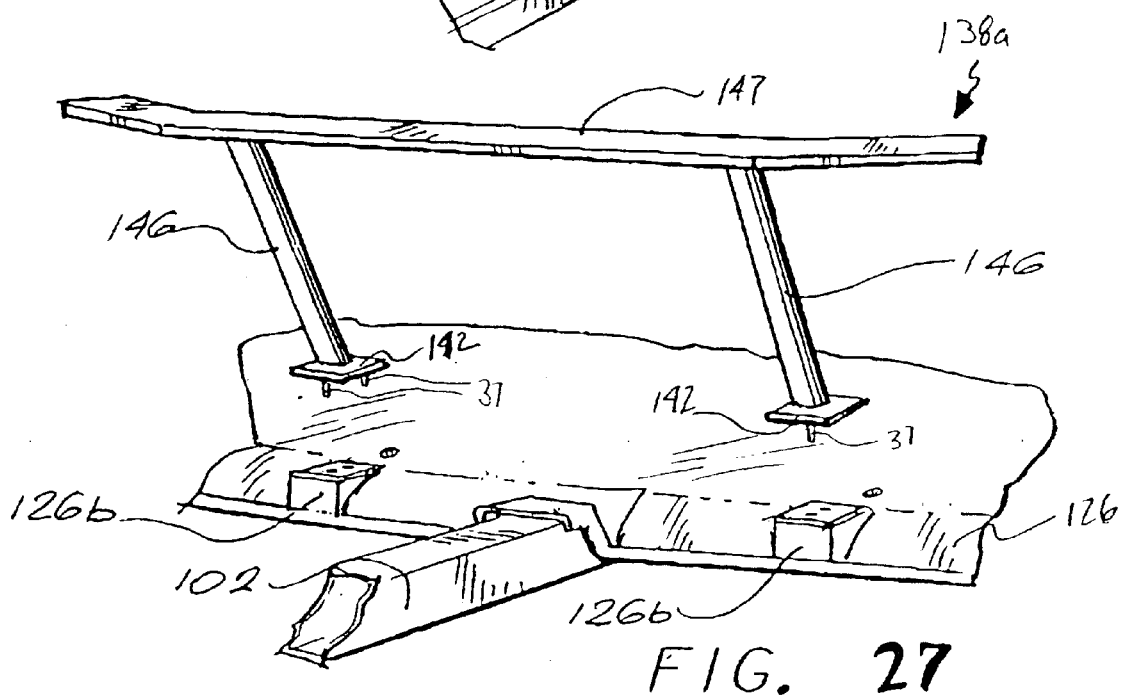
FIG. 27 is a detailed perspective view of the front support member exploded from two indented portions of the floor panel.

Referring to FIGS. 25–27 the floor panel 126 is preferably made of plastic and is formed to fit directly on top of the deck 124. The floor panel 126 has a pair of wheel cavities 126*a* defined therein. The floor panel 126 also has a plurality of indented areas 126*b* that are sized to cooperate with the attachment plates 142 of the support members 138. The indented areas 126*b* include openings 126*c* therein that are coaxial with the threaded members 37 of the attachment plates 142 and the openings 140*a* in the frame horns 140, as shown in FIG. 26.

The wheel housings 128, which are preferably made of plastic, are bonded to the floor panel 126 preferably by a double-sided adhesive tape (and are later bonded to the inner liner 130) and cooperate with the wheel cavities 126*a* therein to provide a fender area in which the tire 152 is housed when the trailer 100 is fully assembled.

Figure 21:
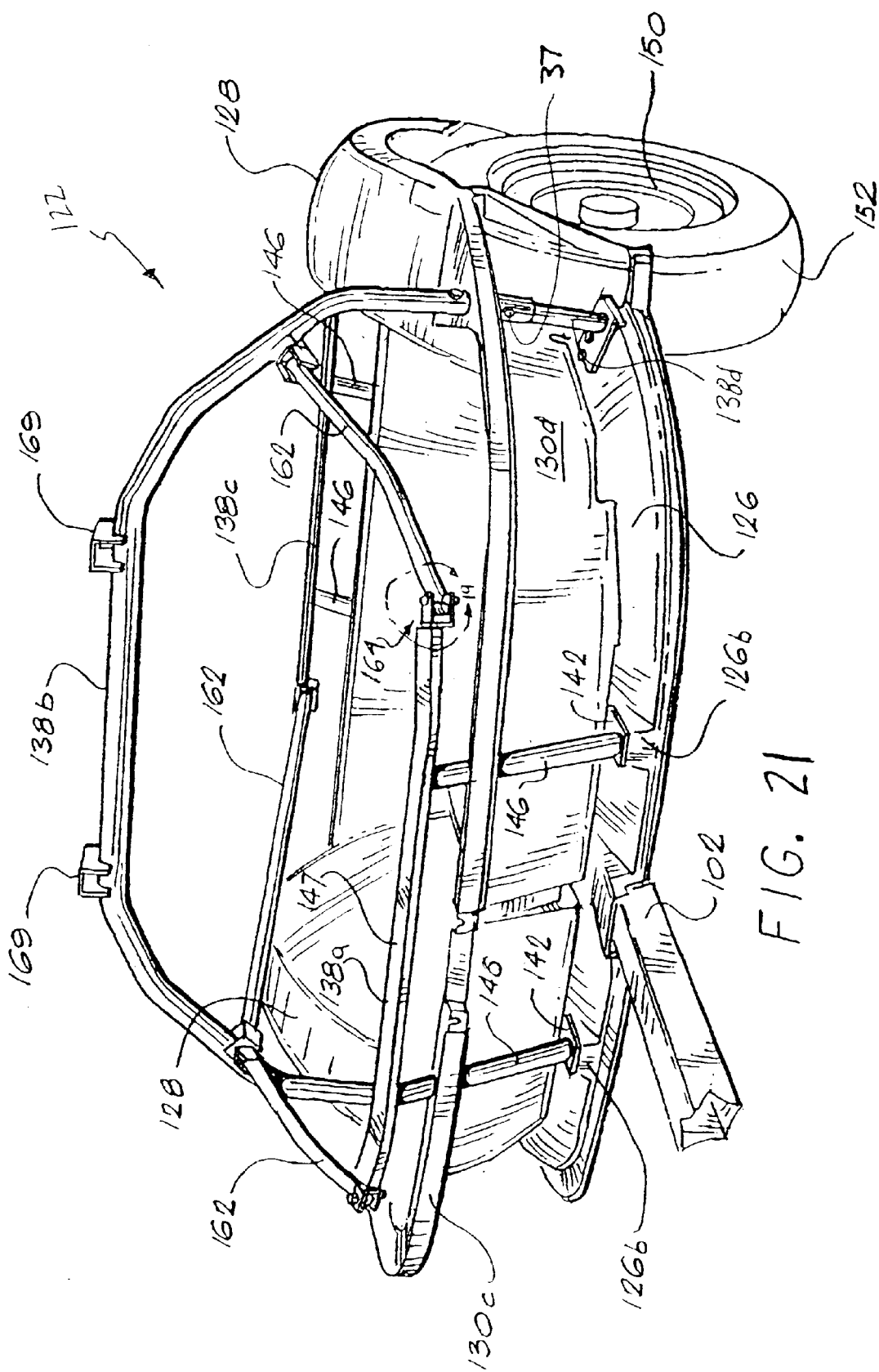
FIG. 21 is a front perspective view of the inner frame and the floor panel with the inner liner thereon.
Figure 28:
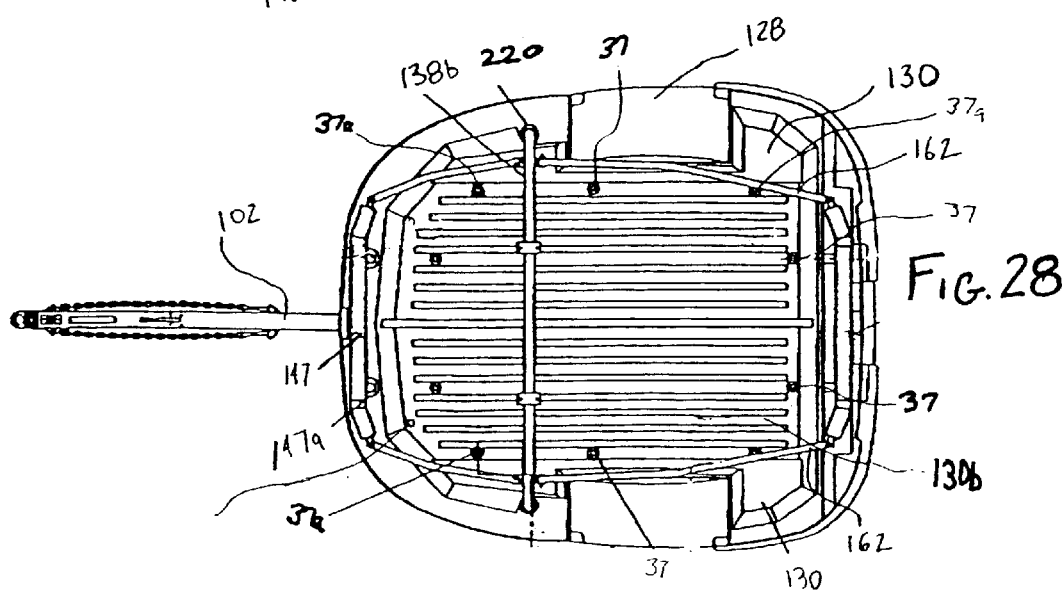
FIG. 28 is a top plan view of the trailer of FIG. 1 with the upper body portion (and covers) removed.

Referring to FIGS. 20, 21 and 28, the tub-shaped inner liner 130 is preferably made of plastic, is secured on top of the floor panel 126 and provides the foundation for the reinforced structural shape that will evolve further as other plastic body parts are bonded into the assembly. Preferably, the inner liner 130 is both glued to and bolted to the floor panel 126; however, any method of securing one to the other is within the scope of the present invention. The inner liner 130 also has wheel cavities 130*a* formed therein that correspond to the wheel cavities 126*a* of the floor panel 126. In a preferred embodiment, the inner liner 130 has raised parallel ribs 130*b* formed therein which add stiffness thereto and also support payload items in the storage compartment 118 above water or other liquids that may have entered therein. A flange or lip 130*c* extends around the top perimeter of the inner liner 130. Glue on this lip 130*c* bonds the inner liner 130 to the upper body portion 134. As will be described more fully below, the angular tub-shaped perimeter of the inner liner 130 bonds to other components to form a strong monocoque reinforcement around the trailer beltline (or bumper area, as described below), which often bears the brunt of accident impact, thereby adding structural stability to the trailer 100.

As shown in FIG. 20, the inner liner 130 includes closeout plugs 220 or grommets that are preferably made of plastic in the openings through which the middle support member 138*b* and front support member 138*a* extend. The tubing of the middle support member 138*b* and front support member 138*a* extend through the center opening of the close-out plug 220.

As shown in FIG. 28, and as described above, threaded fasteners 37 extend through the aligned perimeter holes 137 in the lower frame portion 136, deck 124, floor panel 126 and inner liner 130, and are secured in place (either by a nut or a tapped perimeter hole 137), thereby securing the inner liner 130 to the floor panel 126, deck 124 and the lower frame portion 136. Some of the threaded fasteners 37 preferably include loops 37*a* thereon (as shown in FIG. 33*b*) to allow a rope to be received therein for tying down items in the storage compartment 118. In a preferred embodiment, the loop 37*a* comprises a washer that is received on the threaded fastener 37 and has a D-loop that extends upwardly over the head of threaded fastener (see FIG. 33*b*).

As shown in FIG. 33*a*, in a preferred embodiment, the inner liner and floor panel 12 have an opening defined therein, through which extends a drain 139. Any drain is within the scope of the present invention, however, in a preferred embodiment, the drain includes a cylindrically shaped upper portion 139*a* having a flange 139*b* extending radially outwardly therefrom for supporting the upper portion 139*a* within the openings and an extension 139*c* with a flattened end that prevents flow of moisture from below while allowing drainage from the storage compartment 118. As shown in FIG. 42*a*, the upper portion 139*a* is received in the extension 139*c* and inserted into the openings in the inner liner 130 and floor panel 126, such that the flange contact the floor of the inner liner 130. Preferably the trailer includes two drains 139. However, it will be understood that any number of drains 139 are within the scope of the present invention.

Figure 31:
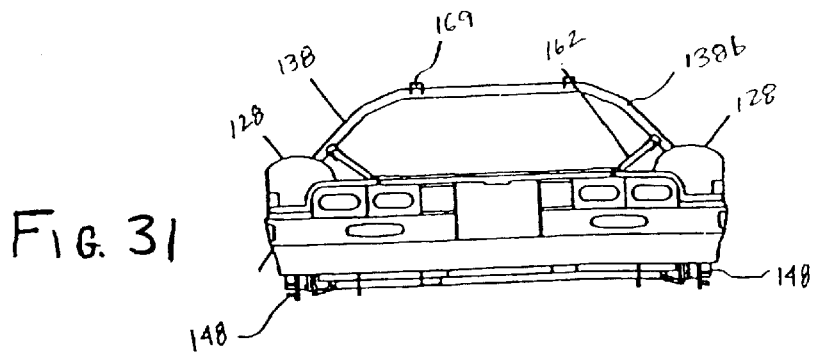
FIG. 31 is a rear elevational view of the trailer of FIG. 1 with the upper body portion removed.
Figure 32:
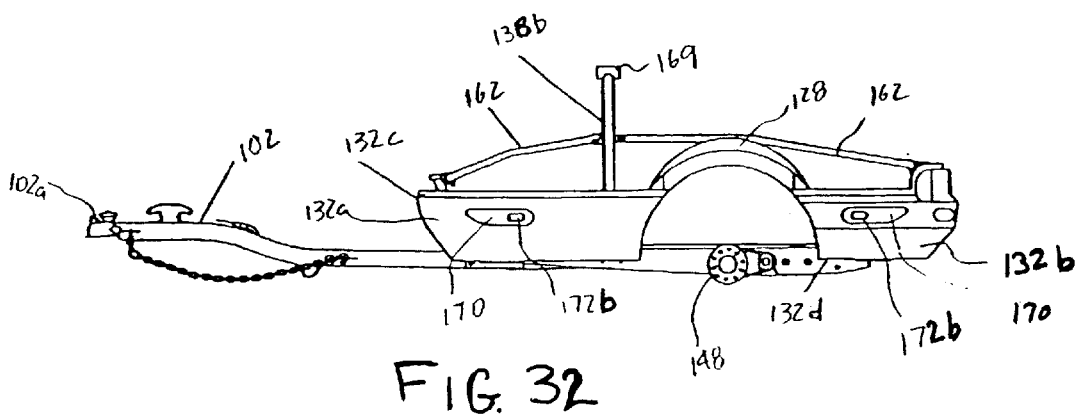
FIG. 32 is a side elevational view of the trailer of FIG. 1 with the upper body portion removed.
Figure 29:
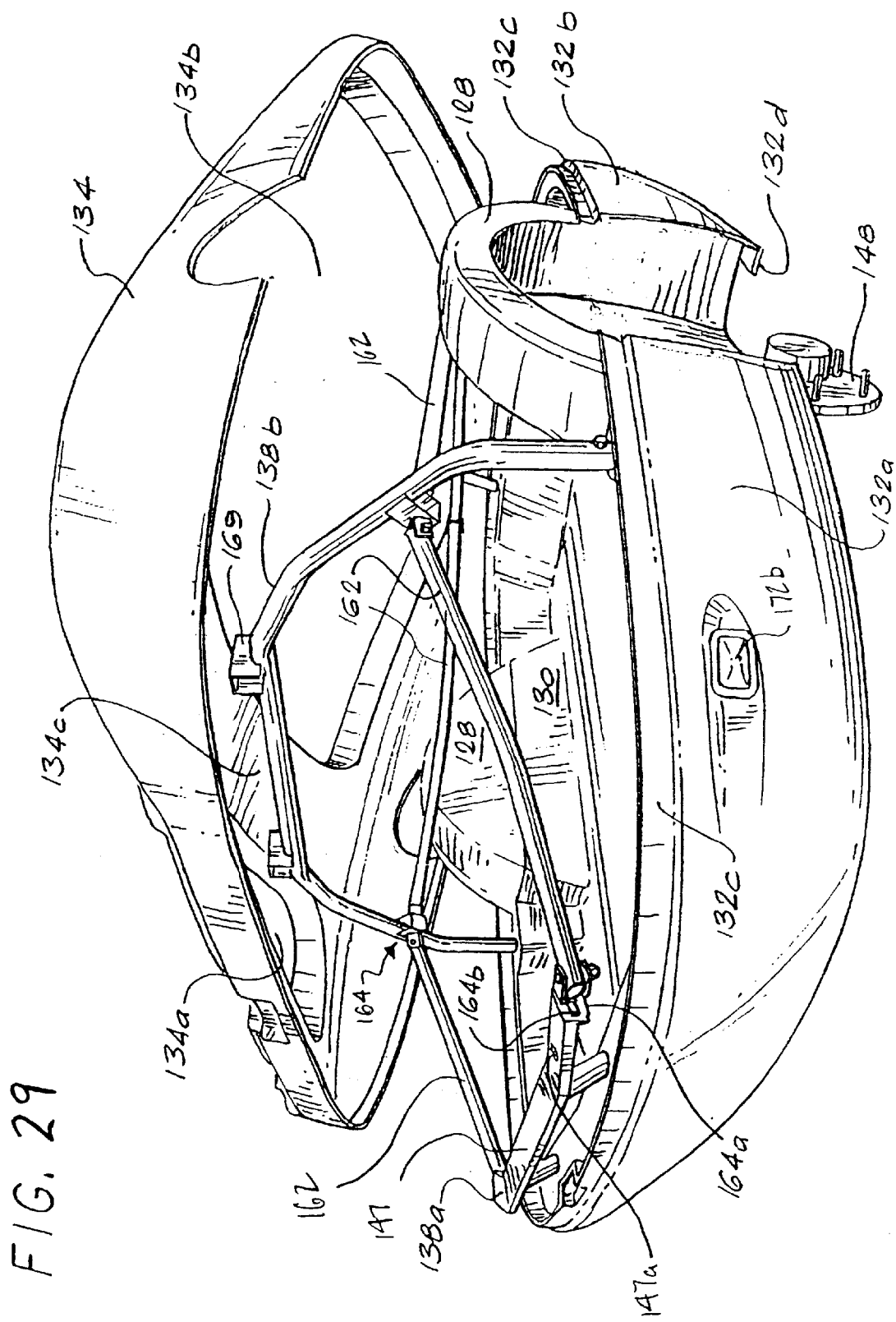
FIG. 29 is a perspective view of the trailer of FIG. 1 with the upper body portion (with the-covers removed) exploded from the lower body portion.

Referring to FIGS. 29–33*c*, the lower body portion 132 is preferably comprised of a front section 132*a* and a rear section 132*b*. Having two separate sections makes assembly more efficient. However, the lower body portion 132 can be a single unitary-piece. As shown in FIGS. 30–32, the front and rear section 132*a*, 132*b* have formed therein light depressions 170 where stop/tail/turn lights 172*a*, side marker lights 172*b*, license lights 172*c* and rear reflectors 173 can be located. The lights 172 are secured within the light depressions 170 by plastic push-in fasteners, rivets, screws, other threaded fasteners or glue. Rear reflectors 173 are self-adhesive. The light depressions 170 have an opening defined therein for receiving a portion of the light and through which the lighting wires 176 extend. It will be understood that the trailer light wiring system runs from the lights 172 through the trailer 100 via the hollow structures formed by the assembled body , for example through a raised rib 130*b*, as shown in FIG. 38, and forwardly inside the tongue 102 and is adapted to be connected to a towing vehicle 178 for energization. The preferred lighting system is more fully described below.

As is shown in FIGS. 33*a*–33*c*, the entire lower body portion 132 (both front and rear sections 132*a*, 132*b*) has an indented lip 132*c* extending around a top edge thereof that is adapted to receive and partially support the upper body portion 134. The upper body portion 134 and inner liner 130 are attached to the lower body portion 132 (both front and rear sections 132*a*, 132*b*) at the indented lip 132*c*.

The lower body portion also has an inwardly extending lip 132*d* that rests on a lip 126*d* that extends outwardly from the floor panel 126 The lips 132*d*, 126*d* are bonded to one another, thereby securing the lower body portion 132 on top of the floor panel 126.

Figure 36:
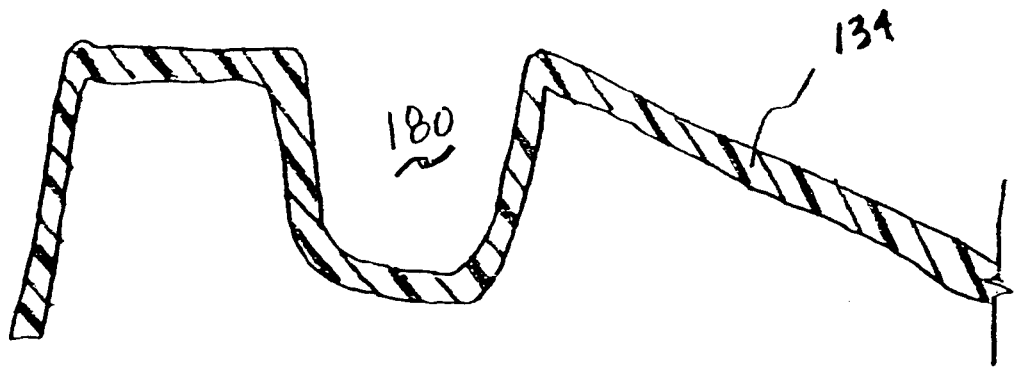
FIG. 36 is a cross-sectional rear elevational view of a section of the upper body portion showing the water diversion trough.
Figure 34:
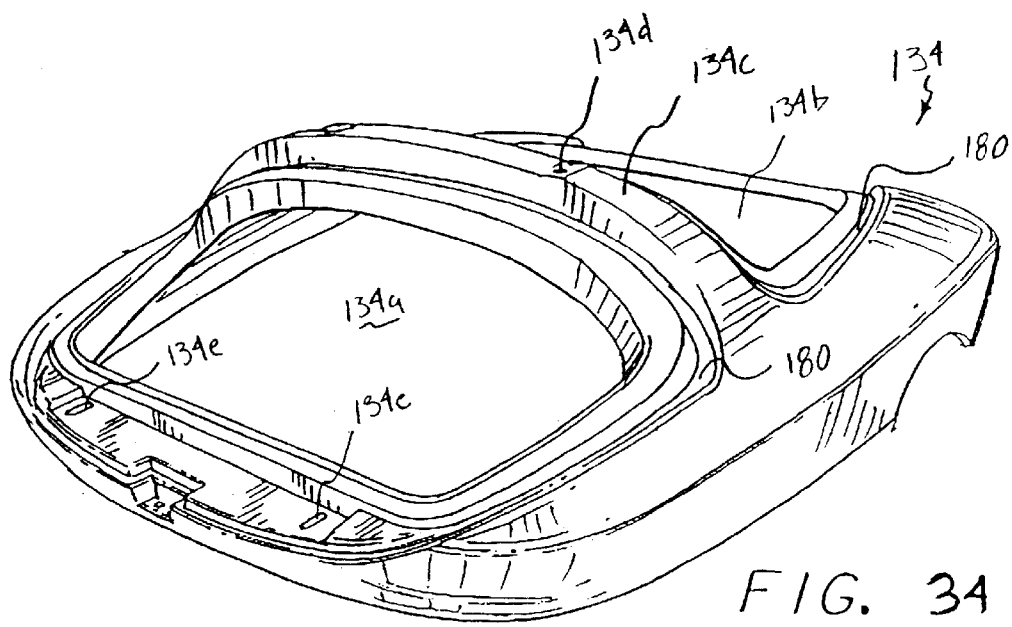
FIG. 34 is a front angle perspective view of the upper body portion in accordance with a preferred embodiment of the present invention.
Figure 35:
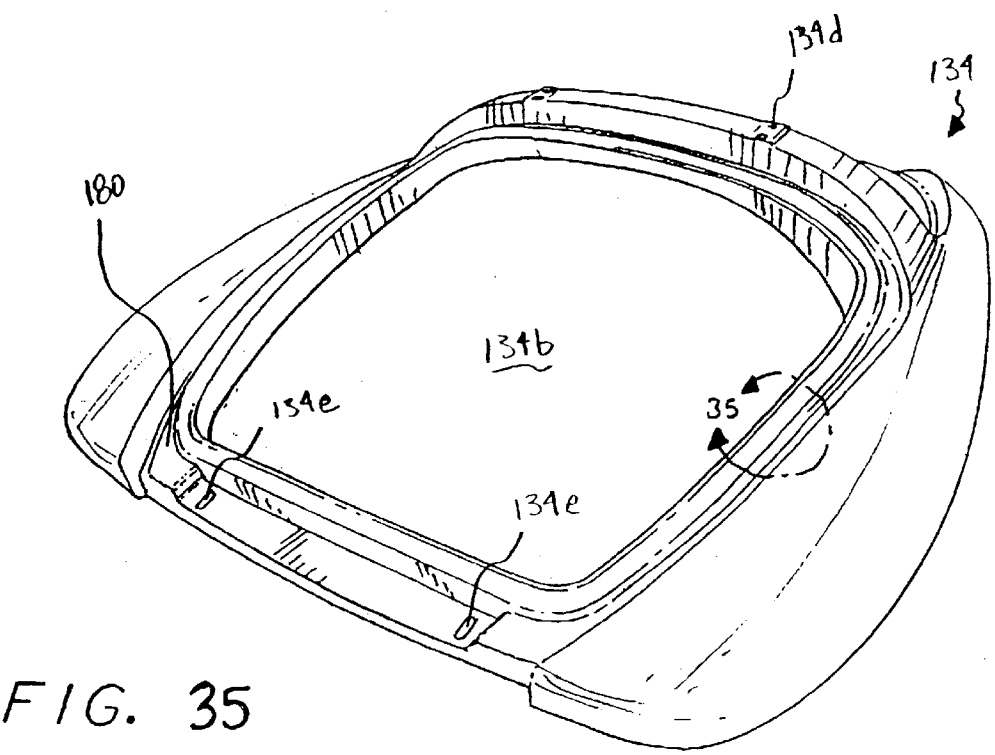
FIG. 35 is a rear angle perspective view of the upper body portion in accordance with a preferred embodiment of the present invention.

Referring to FIGS. 29 and 34–38, the upper body portion 134, which is preferably made of plastic, is formed such that there are two large openings 134*a*, 134*b* therein that correspond to the front and rear covers 110, 111. It will be understood that the covers may also be side to side instead of front and back, or the trailer 100 may include more than two covers. The upper body portion 134 fits onto the lower body portion 132 and is received on the indented lip 132*c* thereof, thereby cooperating to form the overall outer body shape of the trailer 100. As shown in FIGS. 34–36, and best in FIG. 36, extending around each of the large openings 134*a*, 134*b* is a water diversion trough 180. The trough 180 catches and drains any liquids that may get through the space between the closed front or rear cover 110, 111 and the upper body portion 134. Seal 108 prevents the liquid caught in the trough 180 from entering the compartment 118.

An arch portion 134*c* spans the top of the upper body portion 134 and extends between and partially defines the large openings 134*a*, 134*b* of the front and rear covers 110, 111. As shown in FIG. 38, the arch portion 134*c* rests on the mounting surfaces 169 or brackets on the middle support member 138*b* and other portions of the upper body portion 134 rest on the support portions 147 of the front and rear support members 138*a*, 138*b*. It will be understood that because of the mechanical connection between the support members 138 (or upper frame portion) and the lower frame portion 136 (via the frame horns 140), a substantial portion of the weight of the upper body portion 134 is ultimately supported by the lower frame portion 136, thereby keeping a substantial portion of the weight off of the lower body portion 132 and/or inner liner 130.

In a preferred embodiment, the plastic components of the main body portion 114 (such as the inner liner 130 and the upper and lower body portions 134, 132) are secured to one another using an adhesive tape 182, such as VHB#4941, which is produced by the 3M Company. This tape 182 produces a strong bond between the various components and aids in weatherproofing the interior of the trailer 100.

Referring to FIGS. 39–42, the rear cover 111 is comprised of an outer skin 186, an inner skin 188 and a bar assembly 190 sandwiched or disposed therebetween. The front cover 110, which, in a preferred embodiment, is not as big as the rear cover 111, is also comprised of an outer skin 186, an inner skin 188 and a bar assembly 190 sandwiched therebetween. The front and rear covers 110, 111 are secured to the upper body portion 134 by a pair of hinges 184 (described more fully below).

Figure 40:
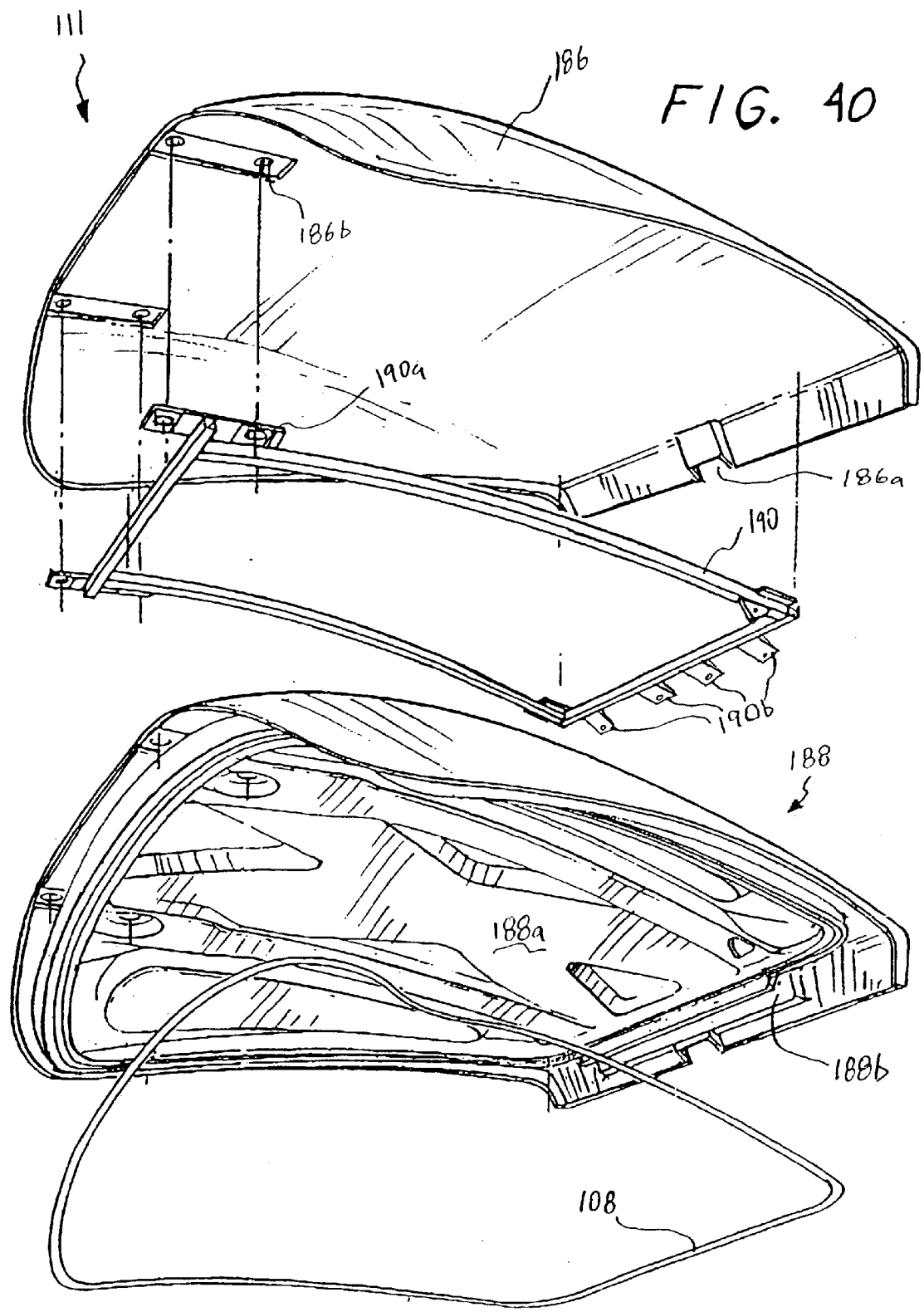
FIG. 40 is an exploded perspective view of the rear cover showing the inner and outer skins, bar assembly and seal.
Figure 41:
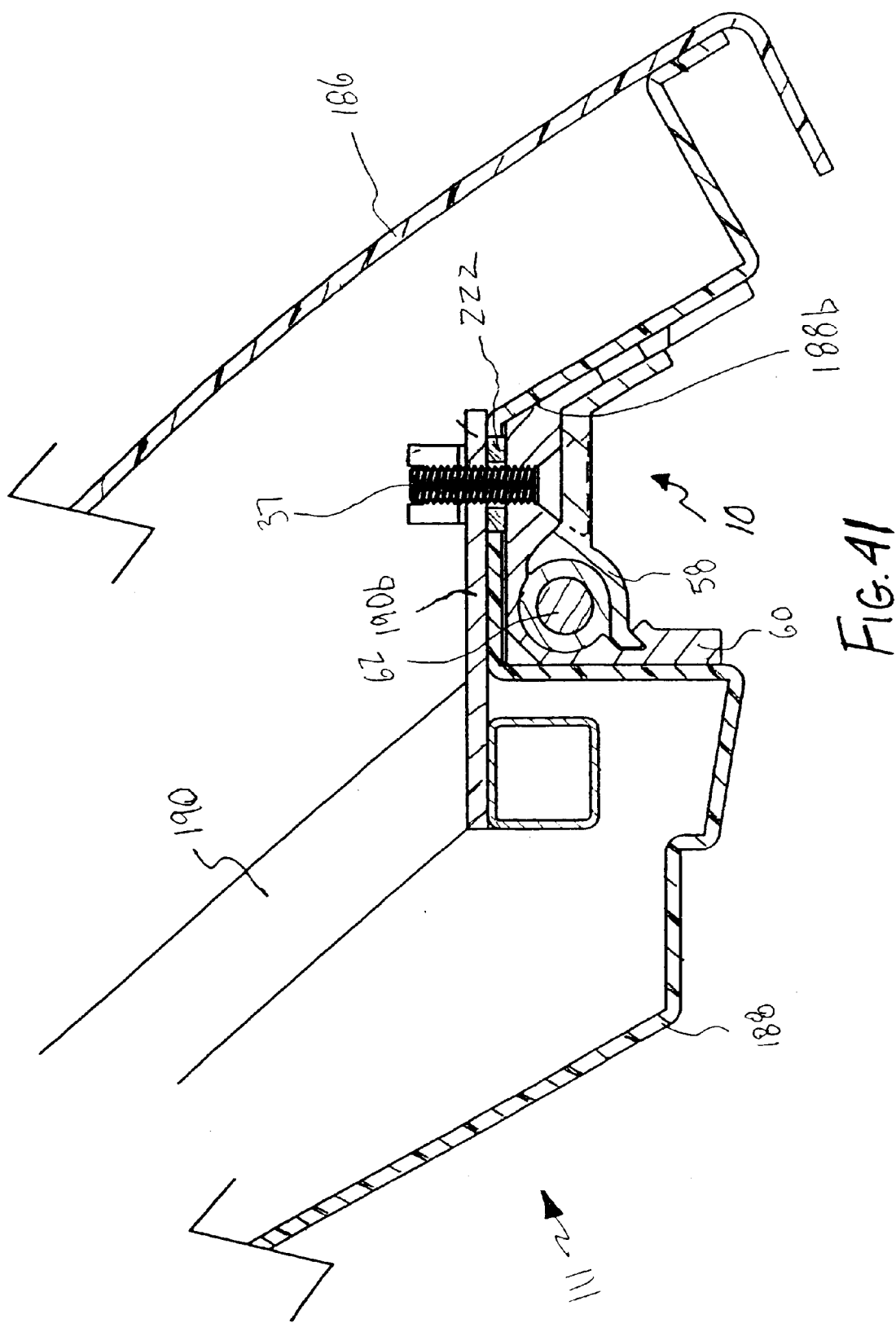
FIG. 41 is a partial sectional side elevation of the rear cover 111 showing the latching system mechanically connected to a tab of the rear bar assembly.
Figure 42:
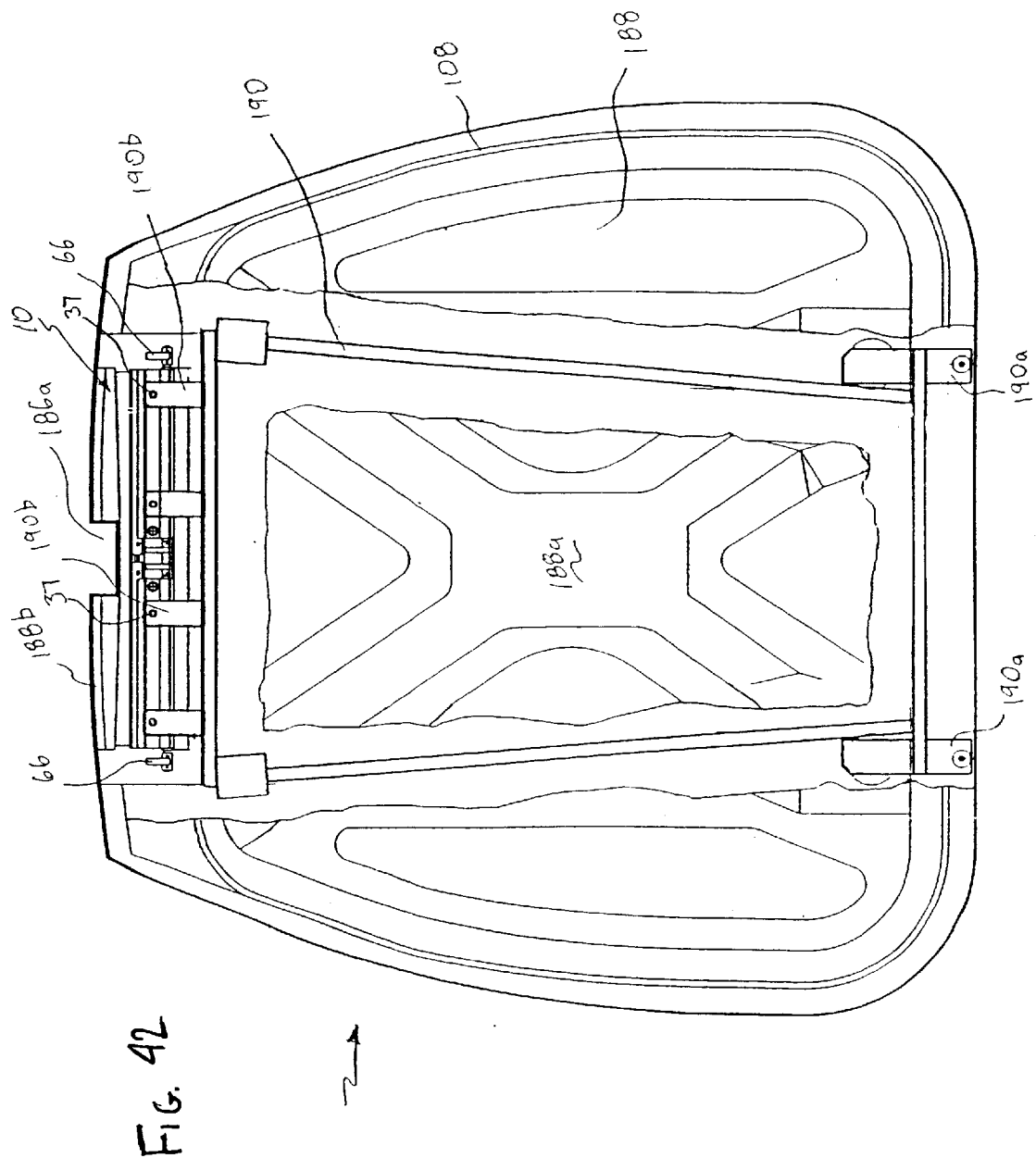
FIG. 42 is a bottom plan view of the rear cover with a portion of the inner skin cut away to show the bar assembly.

In the rear cover 111, the inner skin 188 is formed such that there are a plurality of raised portions 188a therein. The raised portions 188a are preferably formed in the inner skin 188 (such as by vaccu-forming or the like); however the raised portions 188a can also be a material or object that is adhered to the inner skin 188. Some of the raised portions 188a are formed such that the bar assembly 190 can be received therein, as is shown in FIG. 40. The bar assembly 190 can have any cross-sectional shape, for example, square, round, elliptical, etc. The bar assembly 190 includes mounting brackets 190a affixed thereto, which include holes 190c therein and are used to secure the rear hinge portion of the hinges 184 (described below) to the rear cover 111 of the trailer 100. The outer skin 186 is bonded to the inner skin 188 via glue or the like on the raised portions 188a of the inner skin 188. This sandwiches the bar assembly 190 between the inner skin 188 and the outer skin 186. The bar assembly 190 is secured therein preferably with glue and threaded or another attachment method can also be used. The bar assembly 190 also includes tabs 190b that extend from the bar assembly 190 toward the latching system 10, as shown in FIGS. 41 and 42. The tabs 190b each include at least one opening 190c defined therein, through which a threaded fastener 37 is extended, thereby mechanically securing the latching system 10 (more particularly, the outer shield member 60) and the bar assembly 190 together. It will be understood that the raised portions 188a of the-inner skin 188 also add stability and strength to the cover. The inner skin 188 also includes a latch depression 188b, which is adapted to receive the shaft assembly 14 of the latching system 10, and in particular, the outer shield member 60 of the shaft assembly 14. The shaft assembly 14 is preferably mounted in the latch depression 188b using a glue, such as a silicone adhesive or methacrylate glue. The shaft assembly 14 can also be secured in the latch depression 188b using threaded fasteners or the like.

Figure 43:
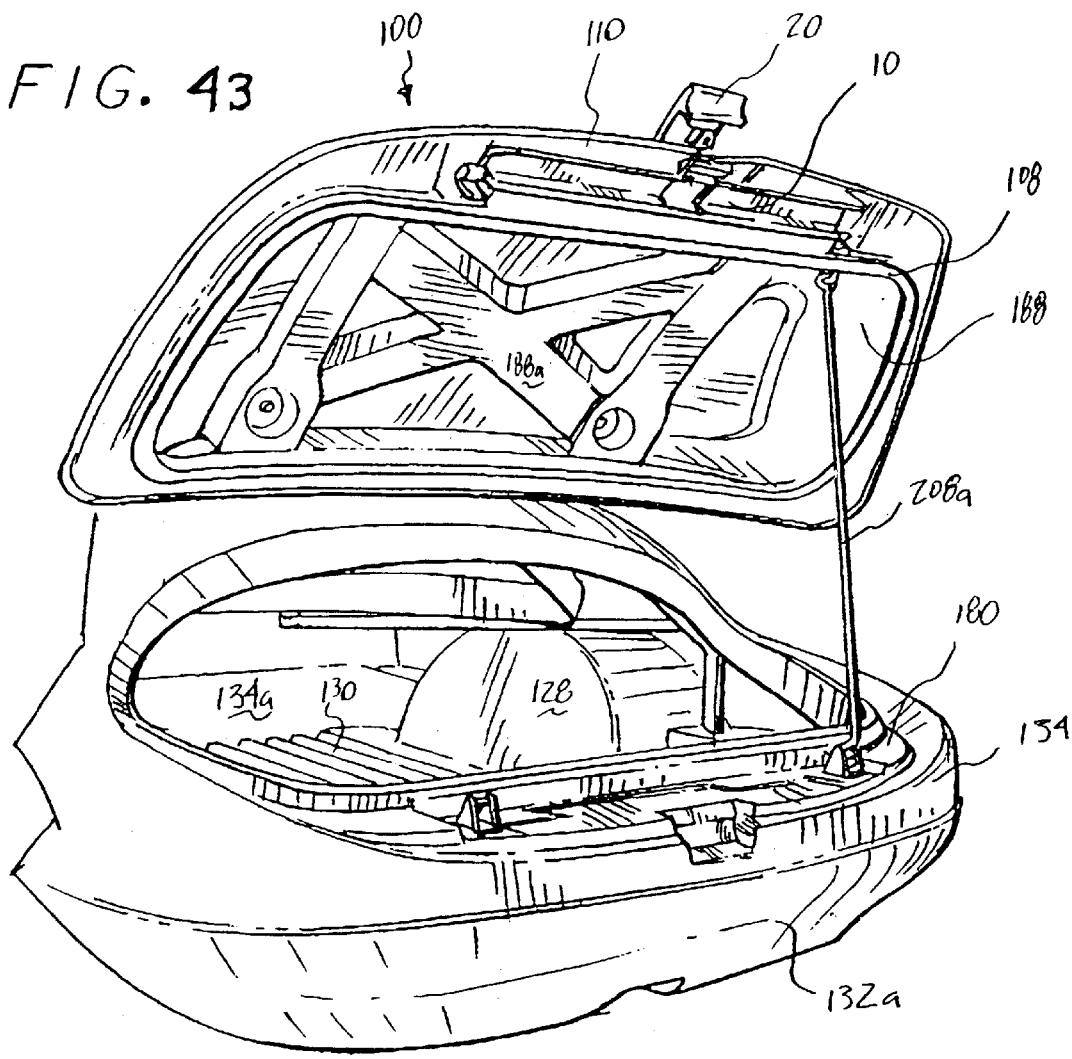
FIG. 43 is a front angle perspective view of the trailer of FIG. 1 with the front cover propped open.
Figure 44:
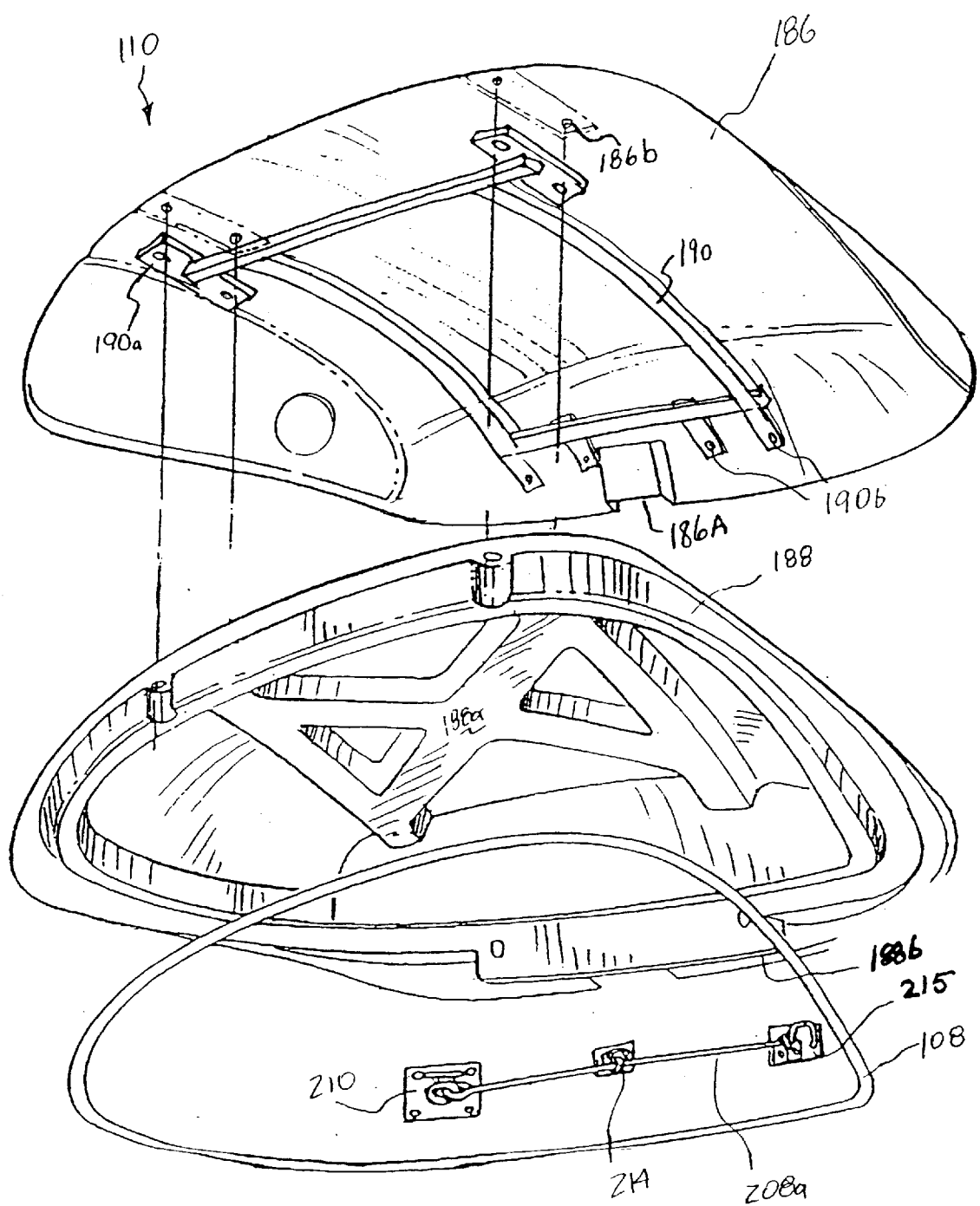
FIG. 44 is an exploded perspective of the front cover showing the inner and outer skins, bar assembly and seal.
Figure 45:
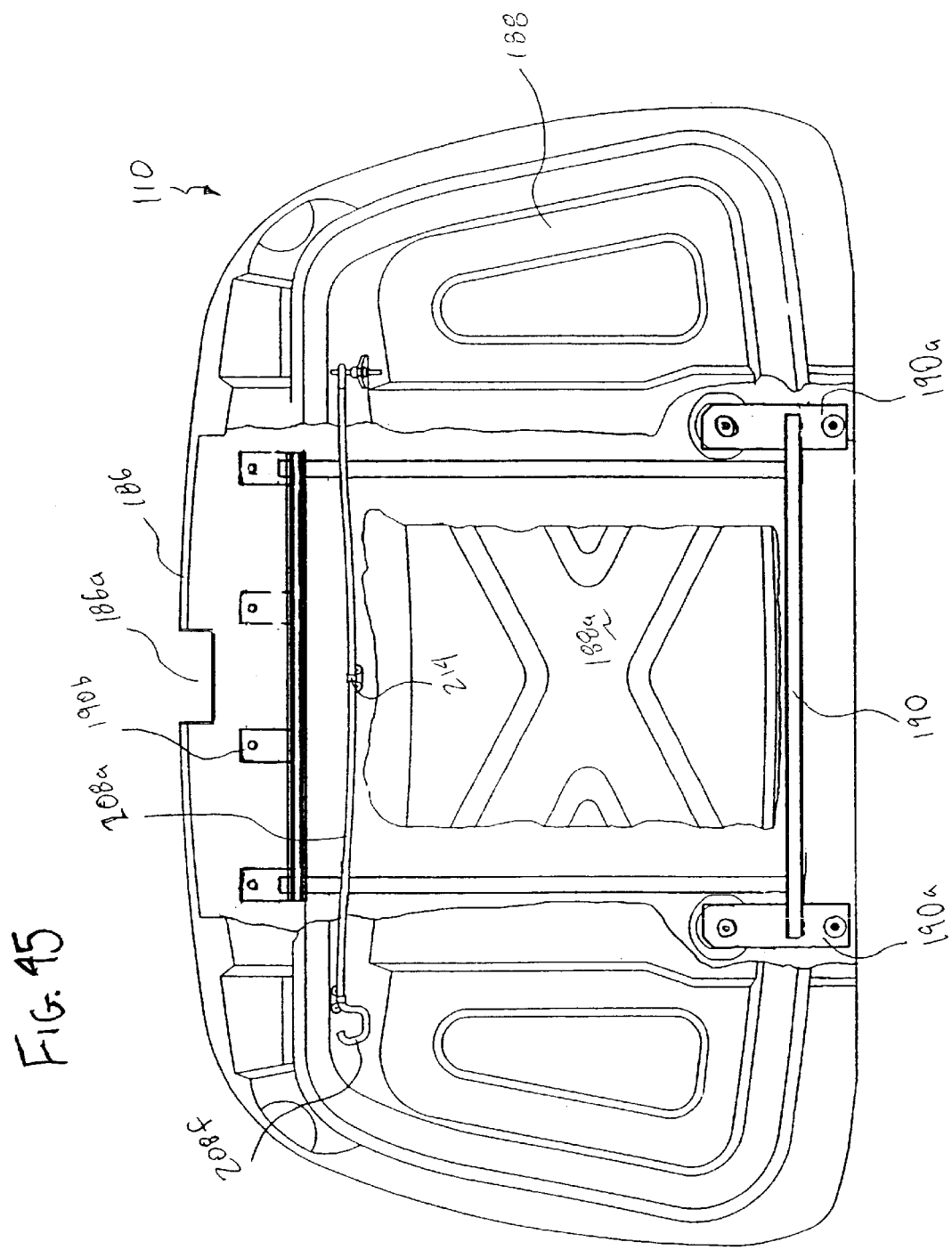
FIG. 45 is a bottom plan view of the front cover with a portion of the inner skin cut away to show the bar assembly.
Figure 46:
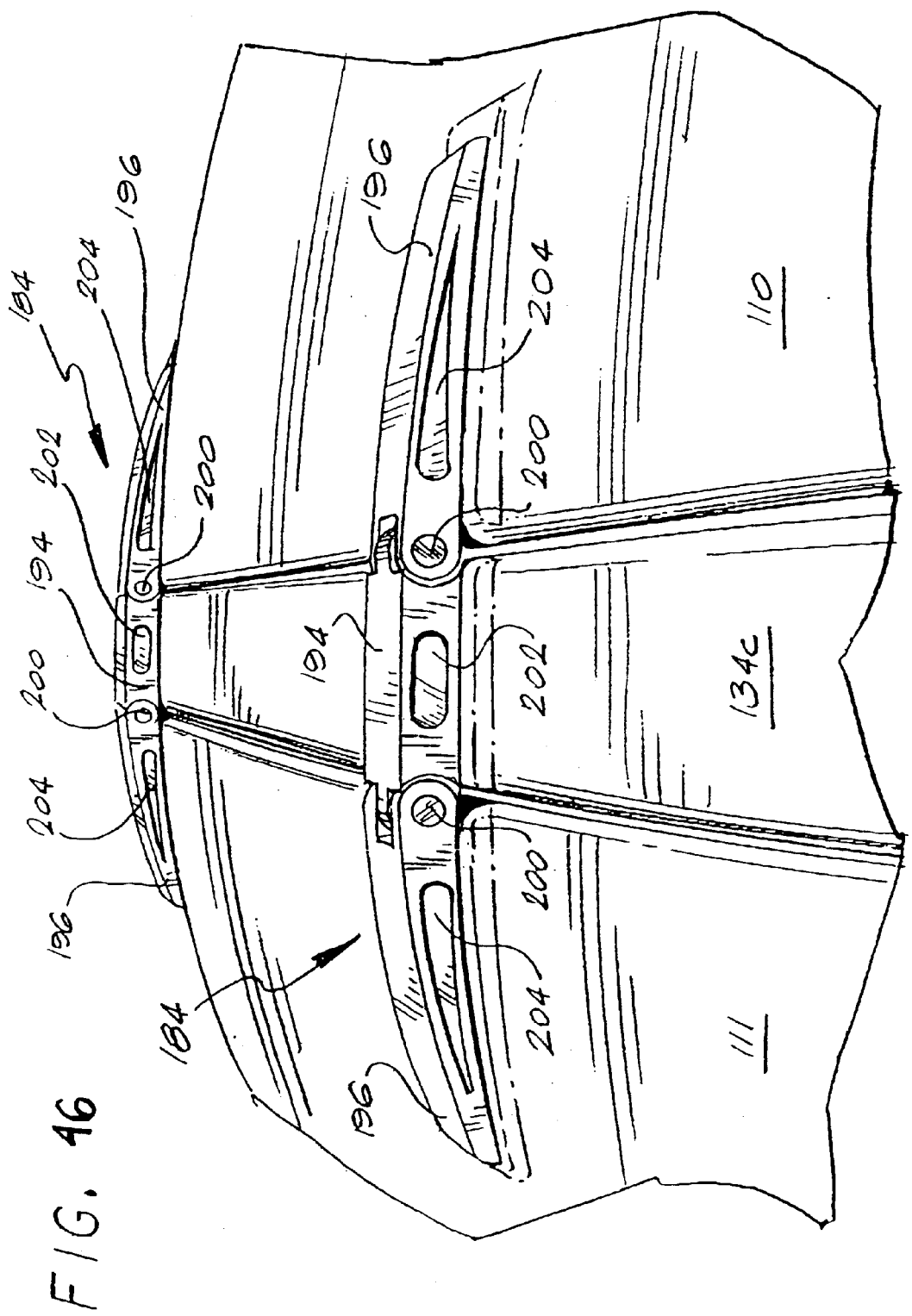
FIG. 46 is a perspective view of the top of the trailer of FIG. 1 showing the hinges hingedly connecting the front and rear covers to the arch portion.
Figure 47:
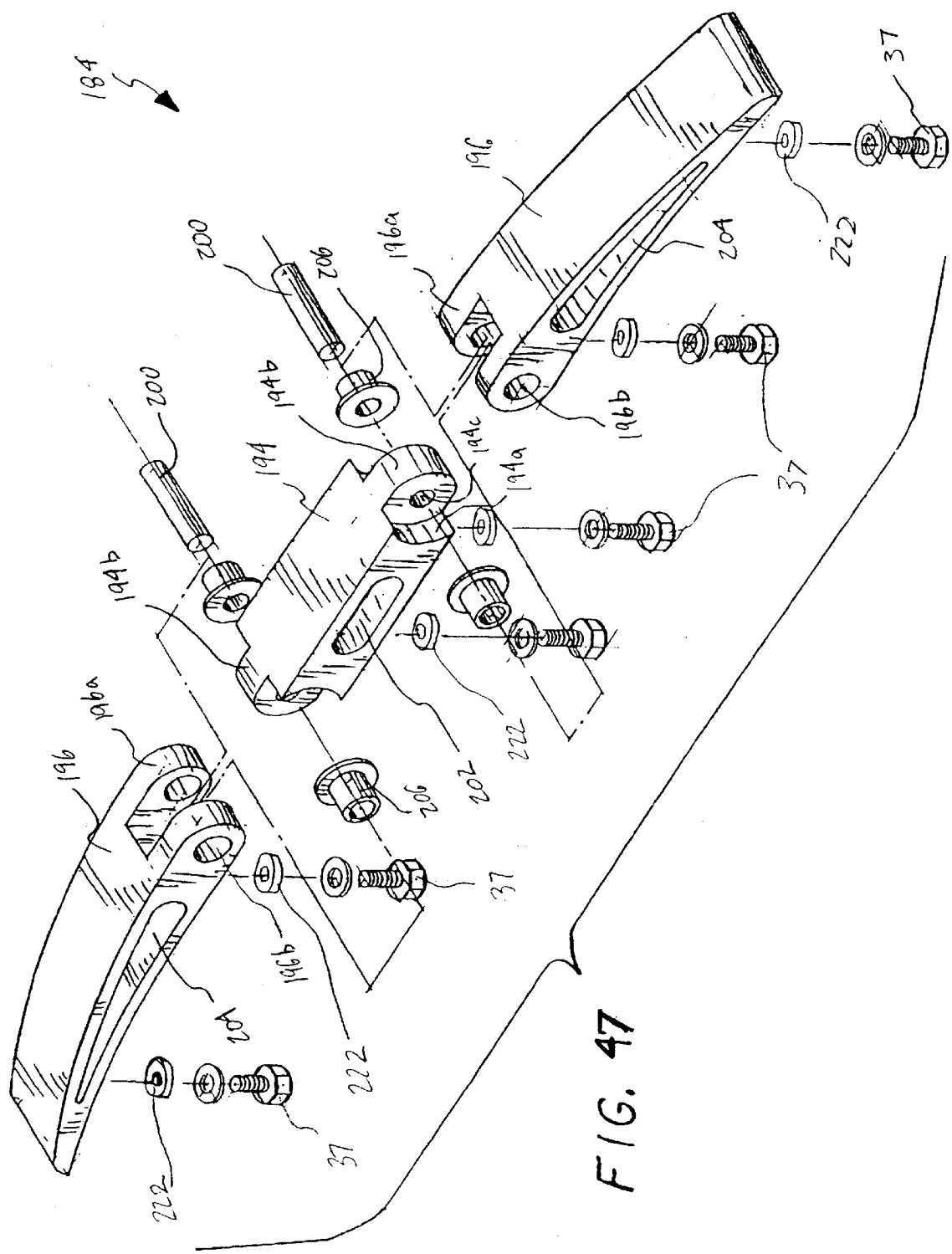
FIG. 47 is an exploded perspective view of a hinge showing the middle portion and front and rear hinge portions.

Referring to FIGS. 43–45, the construction of the front cover 110 is similar to the rear cover 110. The inner skin 188 of the front cover 110 also has a plurality of raised portions 188a formed therein. One of the raised portions 188a is sized to receive the bar assembly 190. As shown in FIG. 44, the bar assembly 190 is not as large as the bar assembly 190 of the rear cover 111, but still preferably includes mounting brackets 190a therein for mounting the front hinge portion of the hinges 184 and tabs 190b for connection to the latching system 10. The outer skin 186 is bonded to the inner skin 188 in a manner similar to that of the rear cover 111. The inner skin 188 also includes a latch depression 188b similar to that of the rear cover 111.

Preferably both bar assemblies 190 are made of steel or other rigid metal. Both the inner and outer skins 188, 186 are preferably made of plastic and are sized to correspond to the openings 134a, 134b defined in the upper body portion 134. The outer skin 186 of both the front and rear covers 110, 111 has a cavity 186a formed at the rear edge thereof for receiving the handle 20 of the latching system 10. The bar assemblies 190 are sealed within the inner and outer skins 188, 186 by a silicone adhesive that is placed on the mounting brackets 190a (flat plates) and a small amount on the square tubular portions.

Referring again to FIGS. 38 and 33a–33c, the upper body portion 134, lower body portion 132 and inner liner 130 are formed such that they are bonded together to form a reinforcing line around the perimeter of.the trailer 100. The outer wall 130d of the inner liner 130 extends.upwardly at an.angle, terminating in the lip 130c that runs around the perimeter of the upper edge. In an exemplary embodiment, the outer wall 130d of the inner liner 130 extends upwardly at the front and rear at an angle of 66° (denoted in FIG. 42a as θ) and at the sides at an angle of 840° (denoted in FIG. 42a as φ). It will be understood that angles θ and φ can range between about 20° and 90°. The lip 130c of the inner liner is bonded to the indented lip 132c of the lower body portion 132. The upper and lower body portions 134, 132 each have generally curvilinear shapes and meet in a manner such that they are perpendicular to the ground on which the trailer 100 travels, thereby forming a bumper area 192. The lip 130c of the inner liner 130 is bonded to the lower body portion 132 in this bumper area 192. Because the upper and lower body portion 134, 132 and the inner liner 130 are made of plastic, upon impact of this area, the components will tend to "give" slightly. The angled outer wall 130d of the inner liner 130 advantageously allows give as well.

When the trailer 100 is backed up, and a jackknife occurs, the bumper portion 192 of the trailer will typically contact the bumper portion of the towing vehicle. Due to the advantageous construction of the trailer .100.and particularly the bumper portion 192, the trailer 100 will typically skid along the ground (the friction between the ground and the tires 152 will be overcome) before the trailer 100 or tongue 102 are damaged.

Figure 48A:
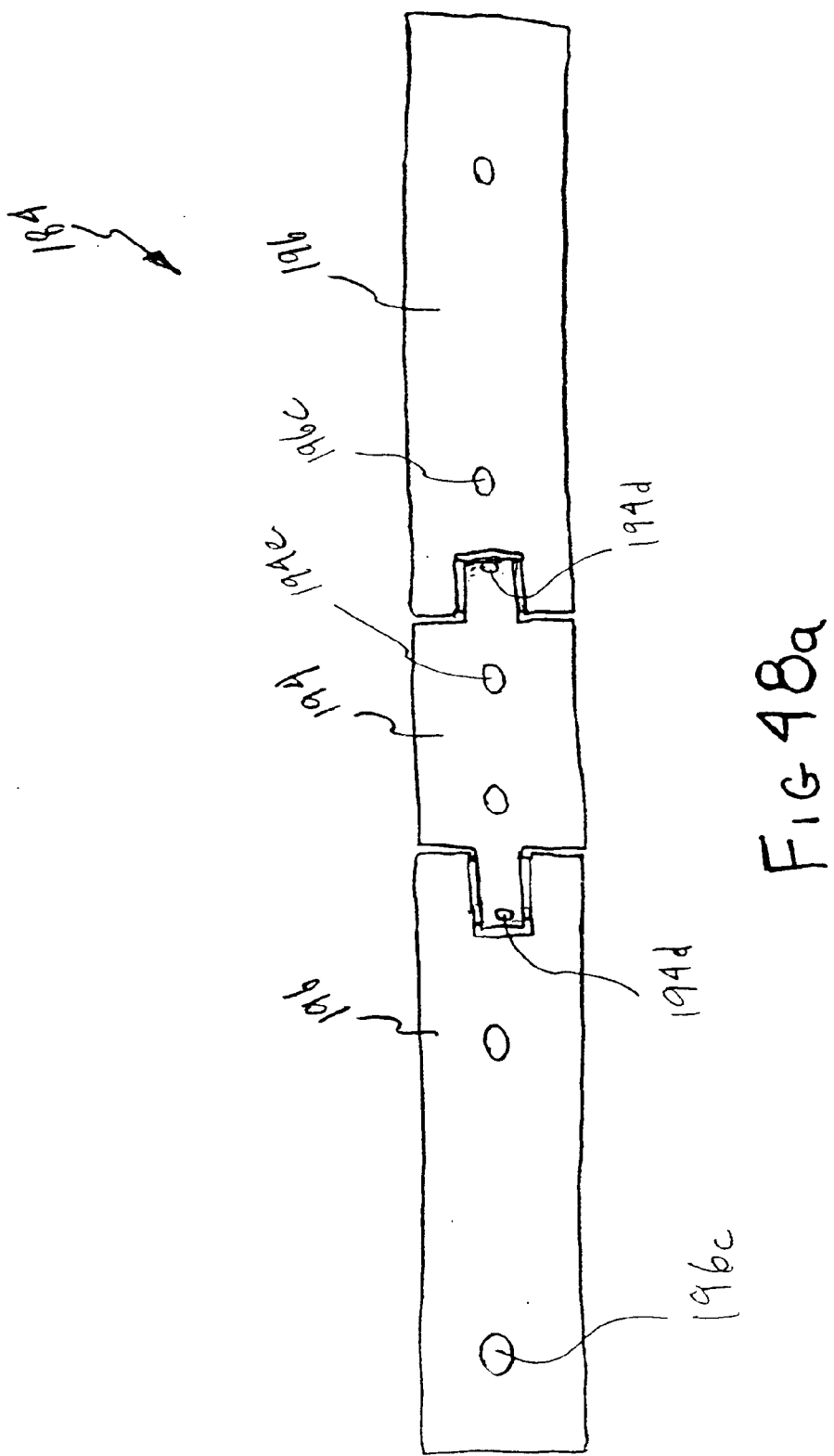
FIG. 48a is a bottom plan view of a hinge in accordance with a preferred embodiment of the present invention.
Figure 48B:
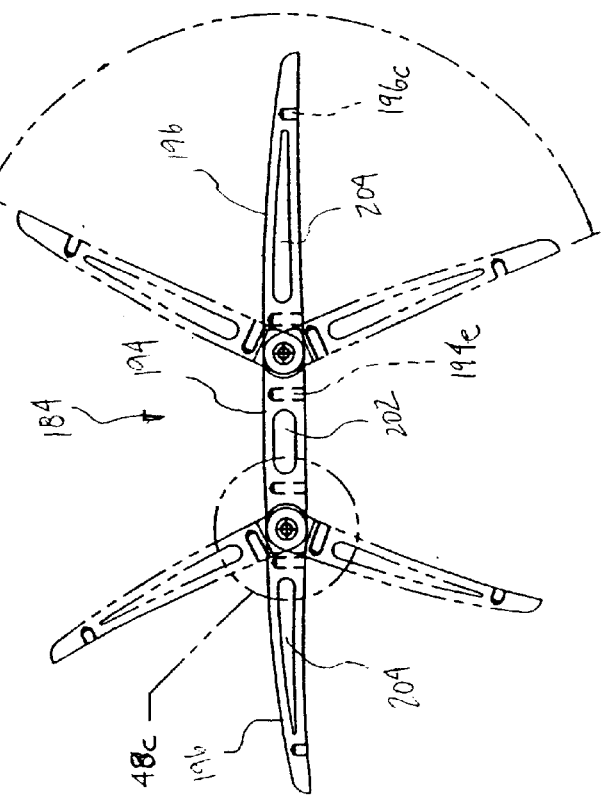
FIG. 48b is a side elevational view of the hinge of FIG. 48a including phantom depictions of the front and rear hinge portions that show the preferred angle that they can hinge.
Figure 48C:
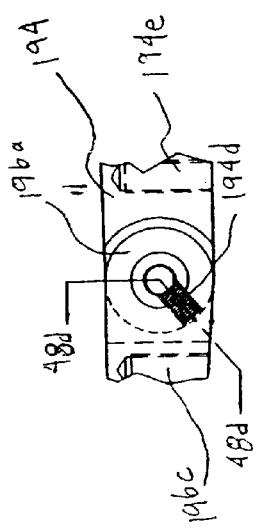
FIG. 48c is a detailed view of the portion of the hinge where the middle portion connects to the front hinge portion showing the set screw.
Figure 48D:
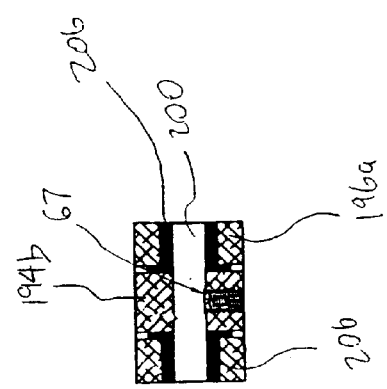
FIG. 48d is a cross-sectional view of the set screw and bushings of the hinge of FIG. 48a taken along line 48d—48d of FIG. 48c.

Referring to FIGS. 46–48c, the hinges 184 are comprised of a middle portion 194, and front and rear hinge portions 196. The middle portion 194 preferably has concave ends 194a for receiving the convex end members 196a of the front and rear hinge portions 196. The middle portion 194 also includes convex end members 194b that extend from the opposite ends thereof. The end members 194b each have an opening 194c defined therethrough in a lateral direction for receiving a hinge pin 200. As shown in FIGS. 48a and 48c, the middle portions 194 include an opening 194d defined therein for receiving a set screw 67 or roll pin and securing the hinge pin 200 in place. The middle portion 194 also has a large opening 202 defined therethrough for accommodating racks or ropes for tie-downs and the like. Threaded holes 194e are defined in the bottom of the middle portion 194 for receiving threaded fasteners 37 and thereby securing the middle portion 194 to the hinge mounting flats 134d on arch portion 134c. The threaded fasteners 37 are received in openings 169a in the mounting surface 169 and the arch portion 134c and the middle portion 194 of the hinge 184.

The front and rear hinge portions 196 are preferably formed in the shape of a wedge having a curved upper surface and have a large opening 204 defined therethrough for accommodating racks or tie-downs and the like. At the end adjacent the middle portion 194, the front and rear hinge portions 196 have opposed convex members 196a extending therefrom that are adapted to cooperate with the end member 194b of the middle portion 194. The opposed convex members 196a have openings 196b defined therethrough for receiving the hinge pin 200. The end members 194b of the middle portion 194 are received between the opposed convex members 196a of the front and rear hinge portions 196, and the openings 194c and 196b in each are aligned and the hinge pins 200 are received therein to form a pivotable hinge. It will be understood that the concave - convex relationship of the ends of the middle portion and the front and rear hinge portions 196 can be reversed. In a preferred embodiment, bushings 206 are press fit into the openings 196b of the front and rear hinge portions 196, and are adapted to receive the hinge pins 200. The bushings 206 can also be secured in the openings 196b using a glue or other adhesive. Threaded holes 196c are defined in the bottom of the front and rear hinge portions 196 for receiving threaded fasteners and thereby securing the front and rear hinge portions 196 to the front and rear covers 110, 111, respectively. The threaded fasteners 37 that secure the front or rear hinge portions 196 in place are received in openings in the brackets 190a on the bar assemblies 190 of the front and rear covers 110, 111, and openings 186b in the outer skin 186 of the front and rear cover 110, 111 and the front or rear hinge portion 196.

In a preferred embodiment, the middle portion 194 and front and rear hinge portions 196 of the hinge 184 are made using an extrusion process. However, this is not a limitation on the present invention.

As discussed above, a number of the components of the trailer 100 are preferably made of plastic and a number of the components are preferably made of steel or other metal. Metals, such as steel, and plastic have very different thermal coefficients of expansion. Therefore, in a preferred embodiment, the trailer is designed to allow the plastic components to expand and contract while the steel frame remains substantially rigid. More generally, the trailer is designed such that the inner frame and the outer shell have different thermal coefficients of expansion, wherein the components of the outer shell expand and contract while the inner frame remains substantially rigid. Typically, the inner frame has a lower thermal coefficient of expansion.that the outer shell.

Figure 49:
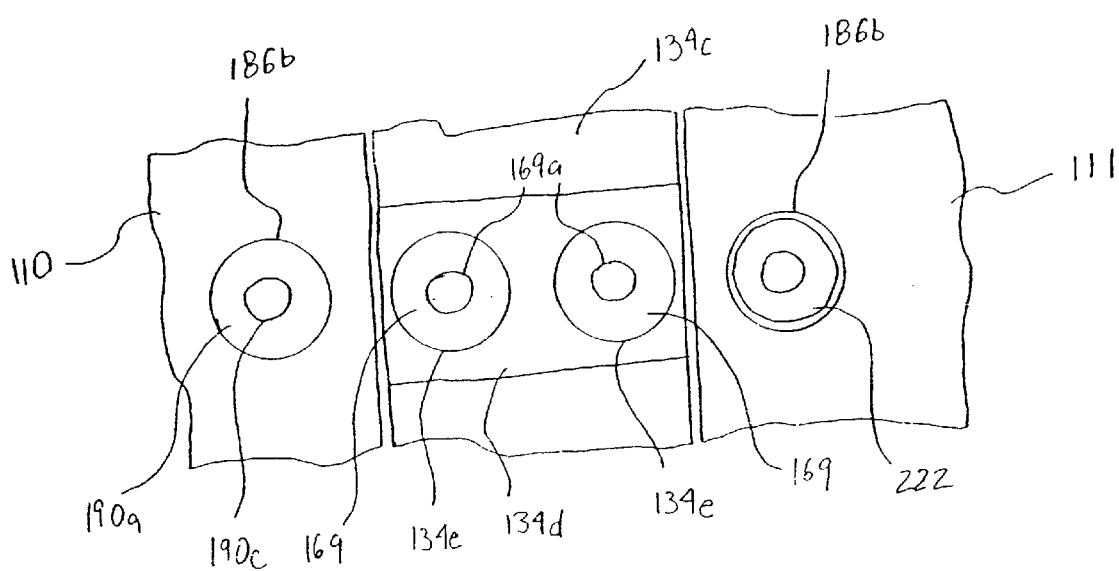
FIG. 49 is a cutaway top plan view of a portion of the arch portion and front and rear covers with the hinge removed to show the openings and a spacer thereunder.

To allow the elements of the outer shell to expand, while maintaining the rigidity of the inner frame, the main body portion 114 of the trailer includes spacers 222 located at those points where plastic is sandwiched between two metal components that are secured by a threaded fastener. Preferably the spacers 222 are made of metal. To accommodate the spacers 222, the holes or openings for the threaded fasteners made in the plastic components are oversized compared to the holes or openings made in the metal components. The spacer 222 is sized to fit in the hole in the plastic component, rests on the metal component, and has an opening therein that corresponds in size to the opening in the metal component. FIG. 49 demonstrates this concept. FIG. 49 is a top plan view of where the front and rear covers 110, 111 are hinged to the arch portion 134c with the hinge 184 omitted. As shown, the openings 134e in the arch portion 134c and the openings 186b in the front and rear cover portions 110, 111 are larger than the corresponding openings 169a in the mounting brackets 169 and 190a. A spacer 222 is shown in the opening 186b in the outer skin 186 of the rear cover 111. The spacer 222 spaces the mounting bracket 190a from the rear hinge portion 196 of the hinge 184. This keeps the hinge 184 from clamping onto the plastic of the outer shell 186, thereby allowing the plastic to expand and contract as necessary. As shown in FIG. 49, the opening 186b (and similar openings in the other plastic components) is bigger than the spacer 222. This also allows the plastic to expand and contract as necessary. Generally, frame 122 and its members and other parts of the external hardware are held in rigid assembly by threaded fasteners 37 or 41. The spacers 222, which are preferably made of metal, are used to allow movement of the plastic parts as they react to thermal expansion and contraction while sandwiched between assembled metal parts. It will be appreciated by those skilled in the art that the thermal change in the plastic parts most significantly affects length and width dimensions of plastic parts. Therefore, as described above, the holes or openings in plastic parts are typically oversized to further allow for thermal movement. Spacers 222 may be used, for example, in cavity 186a, where the latching system 10 is secured to the front and rear covers 110, 111, and in latch depression 188b between the outer shield portion 60 and the tab 190b with the inner shell 188 sandwiched therebetween (as shown in FIG. 41) and, between the attachment plates 142 and the lower frame member 136 with the floor panel 126 sandwiched therebetween (as shown in FIGS. 33b–33c), and between the keeper 16 and the support portion 147 or the support members 138, with the upper body portion 134 sandwiched therebetween (as shown in FIG. 33c).

Referring to FIGS. 50–61, the front and rear covers 110, 111 each have a prop rod 208 associated therewith. It will be understood that the prop rods are referred to generically as 208, the front prop rod is referred to as 208a and the rear prop rod is referred to as 208b. The prop rods 208 are used to hold the front and rear covers 110, 111 in their respective open positions. The prop rods 208 are stowed on the under surface of the front and rear covers 110, 111. The front prop rod 208a is stowed in a position substantially parallel to the elongated shaft 62 of the latching system 10 and the rear prop rod 208b is stowed diagonally across the rear cover 111. However, these are not limitations on the present invention.

Figure 60:
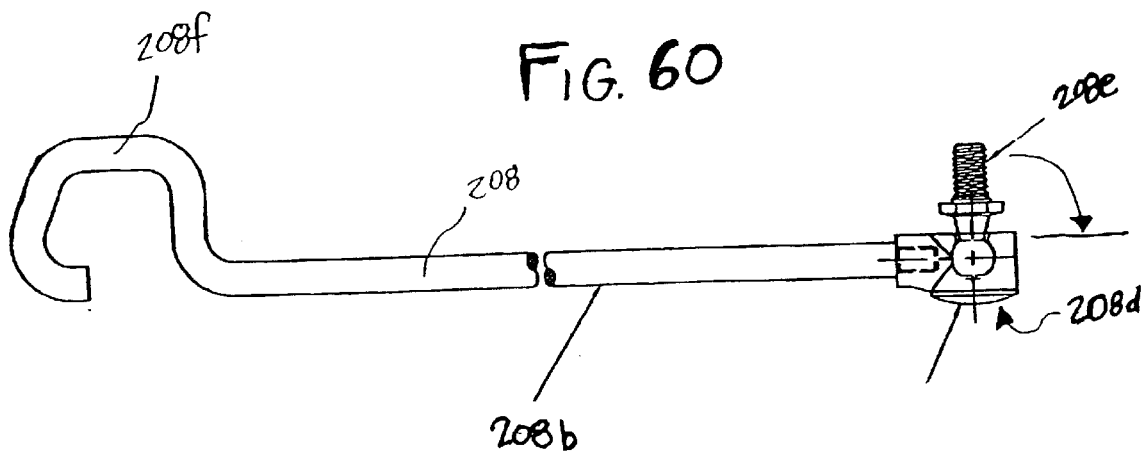
FIG. 60 is a side elevational view of a prop rod having a ball joint at an end thereof in accordance with a preferred embodiment of the present invention.

The prop rods 208 preferably comprise an elongated rod 208c having a ball joint 208d with a threaded stud 208e at one end and a hook 208f at the opposite end (as best shown in FIG. 60. In another preferred embodiment, instead of a ball joint, the prop rod 208 may include a loop that can be secured to an eye bolt, thereby allowing pivotal motion, as shown in FIG. 58. The hook 208f is adapted to engage one of the keepers 16 that is affixed to the sill 112 of the upper body portion 134. In a preferred embodiment, the inside surface of the hook has notches 208g that cooperate with the tubular portion 81 of keeper 16.

Figure 50:
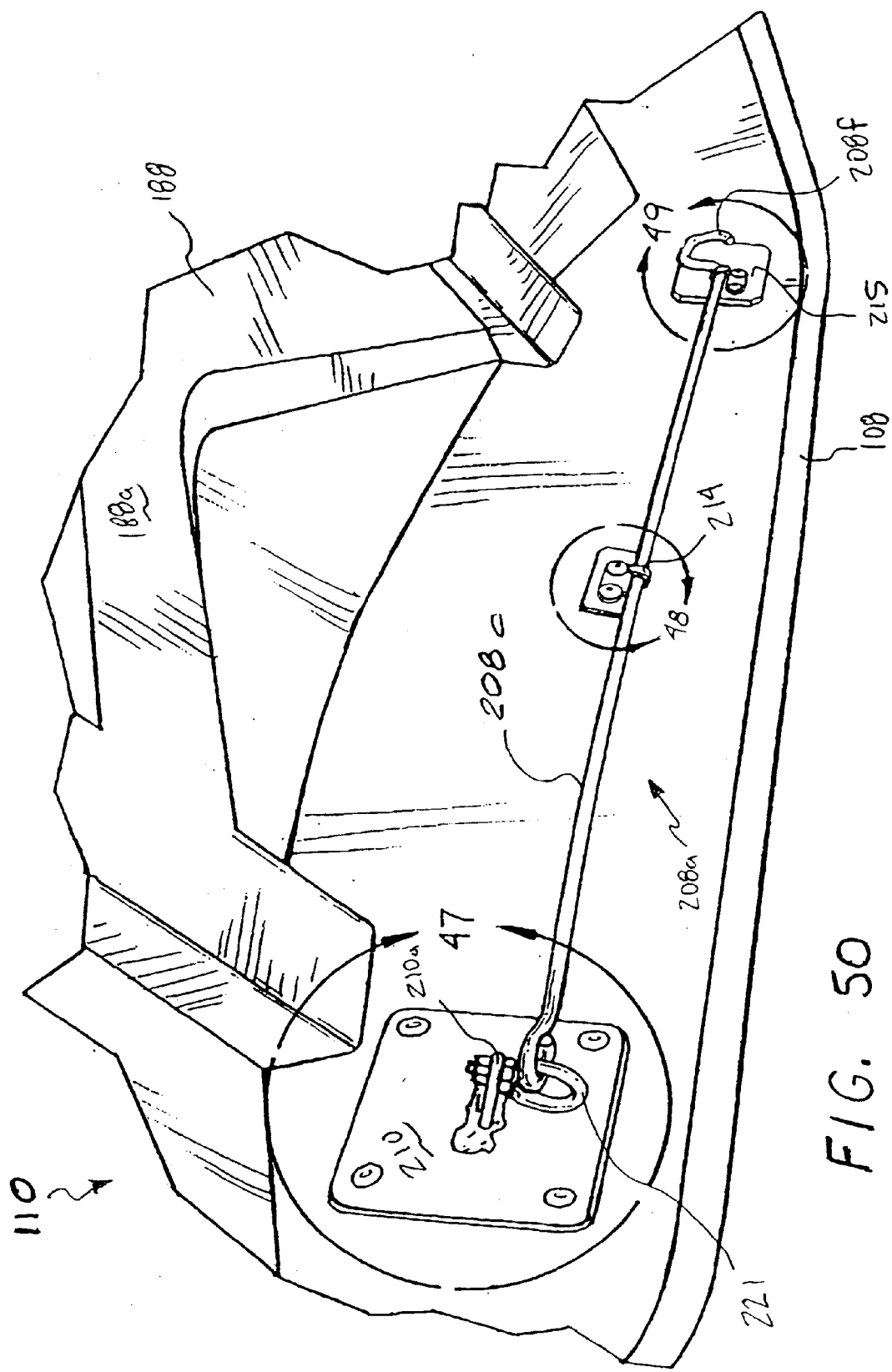
FIG. 50 is a cut away perspective view of the underside of the front cover showing the prop rod secured thereto.
Figure 51:
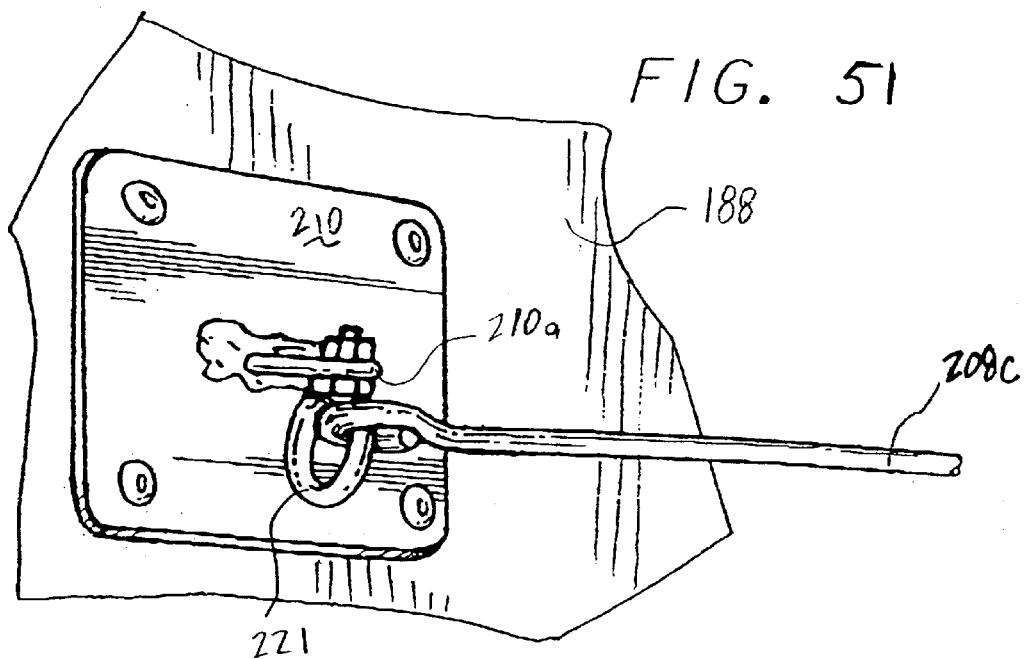
FIG. 51 is a detailed perspective view of the ball joint of the front prop rod pivotally connected to an attachment plate on the underside of the front cover.

As shown in FIGS. 50–51, to secure the front prop rod 208a to the front cover 110, an attachment plate 210 is secured (by threaded fasteners or rivets) to the inside surface of the inner skin 188. The attachment/wear plate 210 includes a mounting bracket 210a for receiving the eye bolt 221 associated with prop rod 208a.

Figure 55:
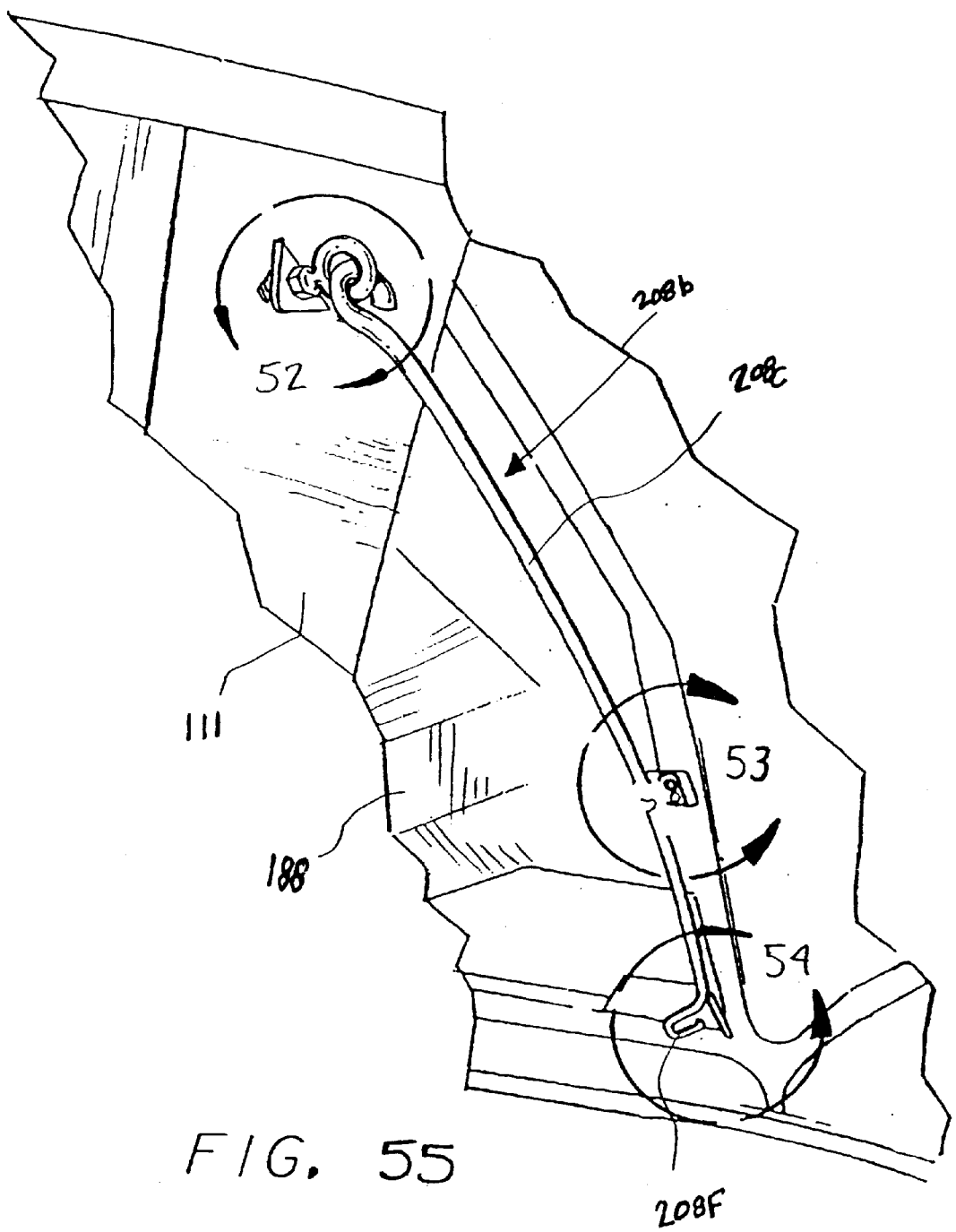
FIG. 55 is a cut away perspective view of the underside of the rear cover showing the prop rod secured thereto.
Figure 61:
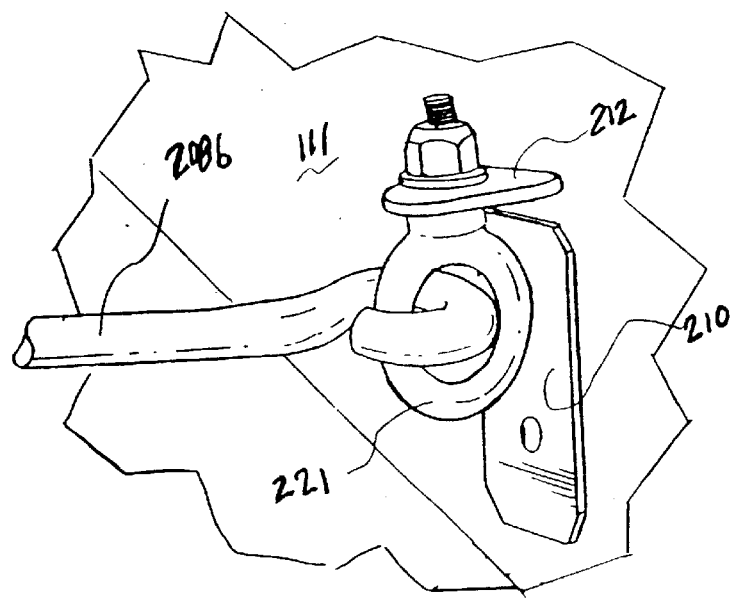
FIG. 61 is a detailed perspective view of and end of the front prop rod pivotally secured to an eye hook that is connected to an attachment plate on the underside of the front cover in accordance with another preferred embodiment of the present invention.
Figure 62:
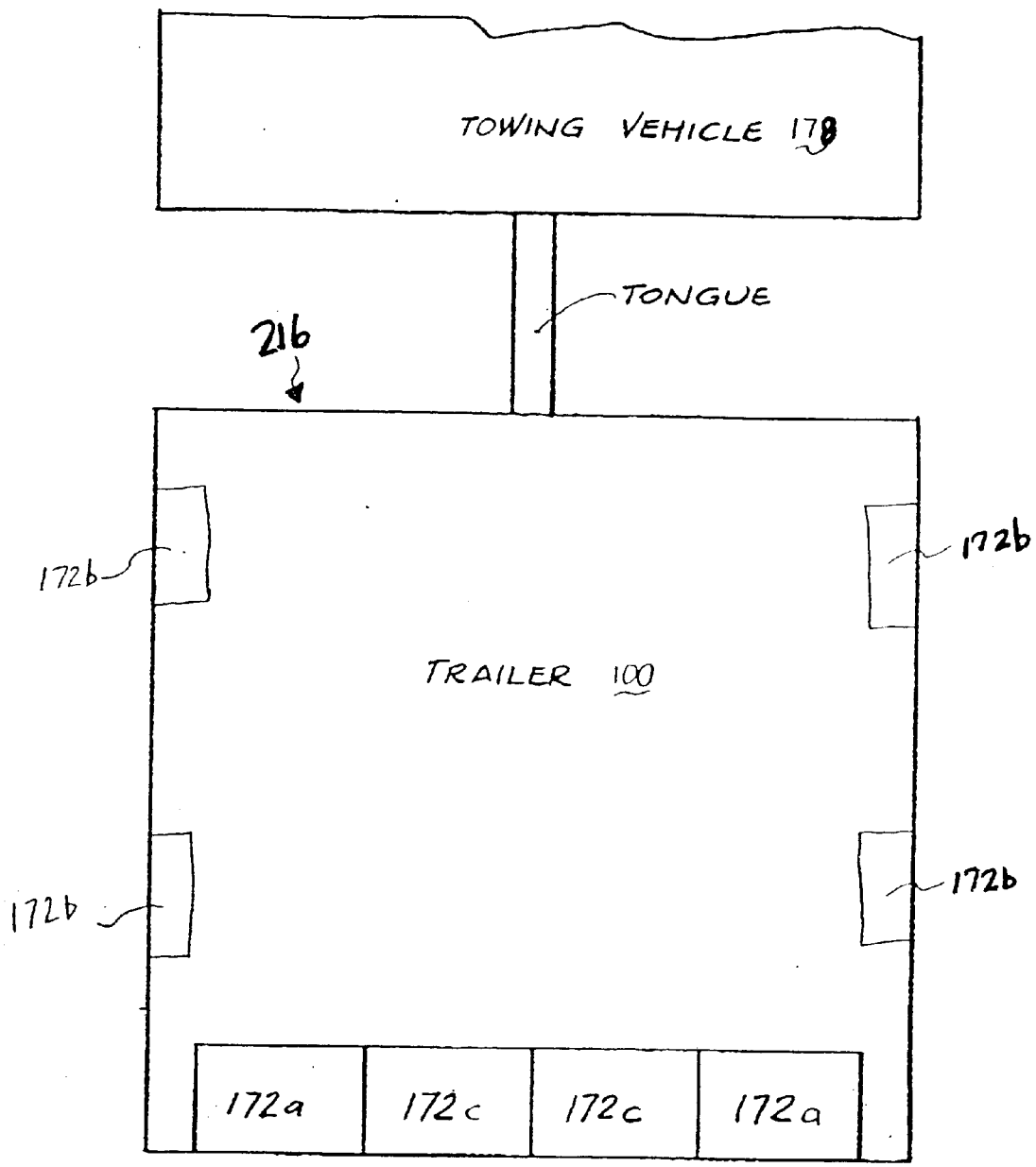
FIG. 62 is a block diagram of a towing vehicle in combination with a trailer having a low current tow vehicle-powered supplemental lighting system in accordance with a preferred embodiment of the present invention.

As shown in FIGS. 55, 56 and 61, to secure the rear prop rod 208b to the rear cover 111, a mounting bracket 212 that is unitary with the bar assembly 190 (and which protrudes through the inner skin 188) has an opening for receiving the threaded stud of eye bolt 221. The wear plate 210 (as shown in FIG. 57).protects the plastic from wear that could result from operations or movement of the prop rod 208b.

Figure 52:
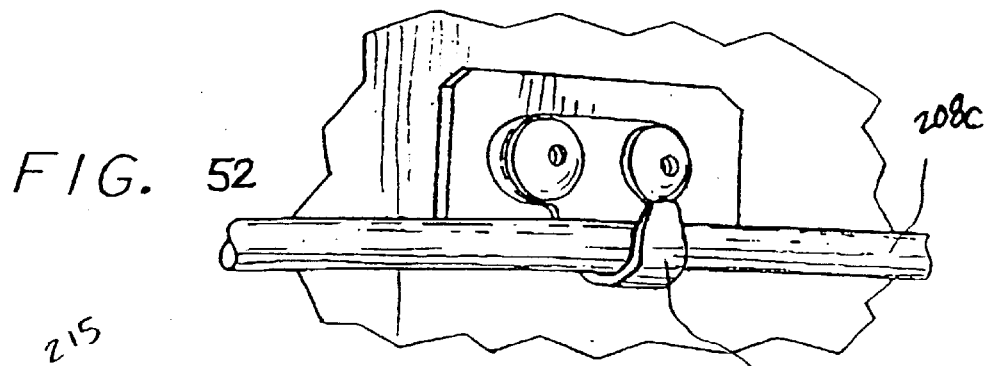
FIG. 52 is a detailed perspective view of a rod securing hook securing the elongated rod of front prop rod to the underside of the rear cover.
Figure 53:
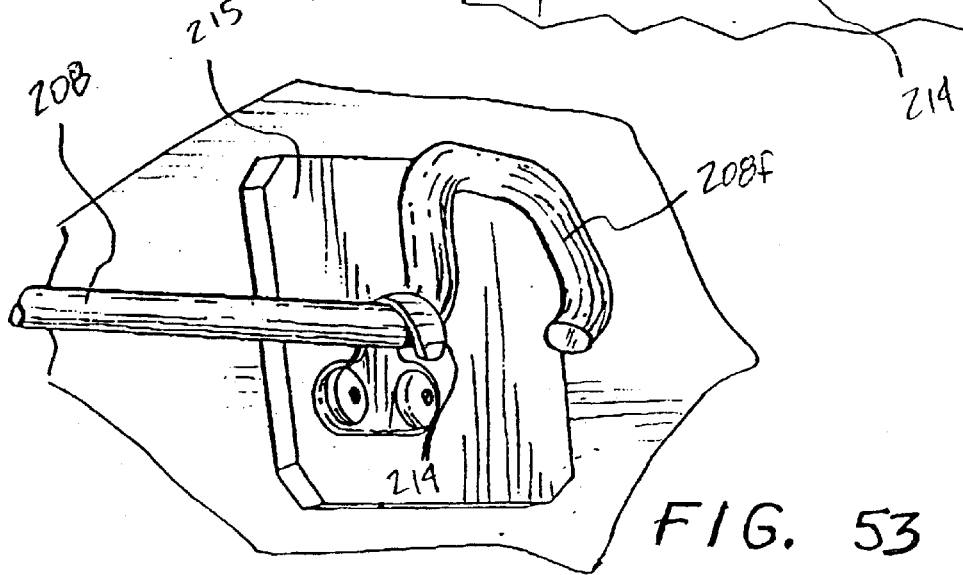
FIG. 53 is a detailed perspective of the hook of the front prop rod secured in place by a rod securing hook.
Figure 54:
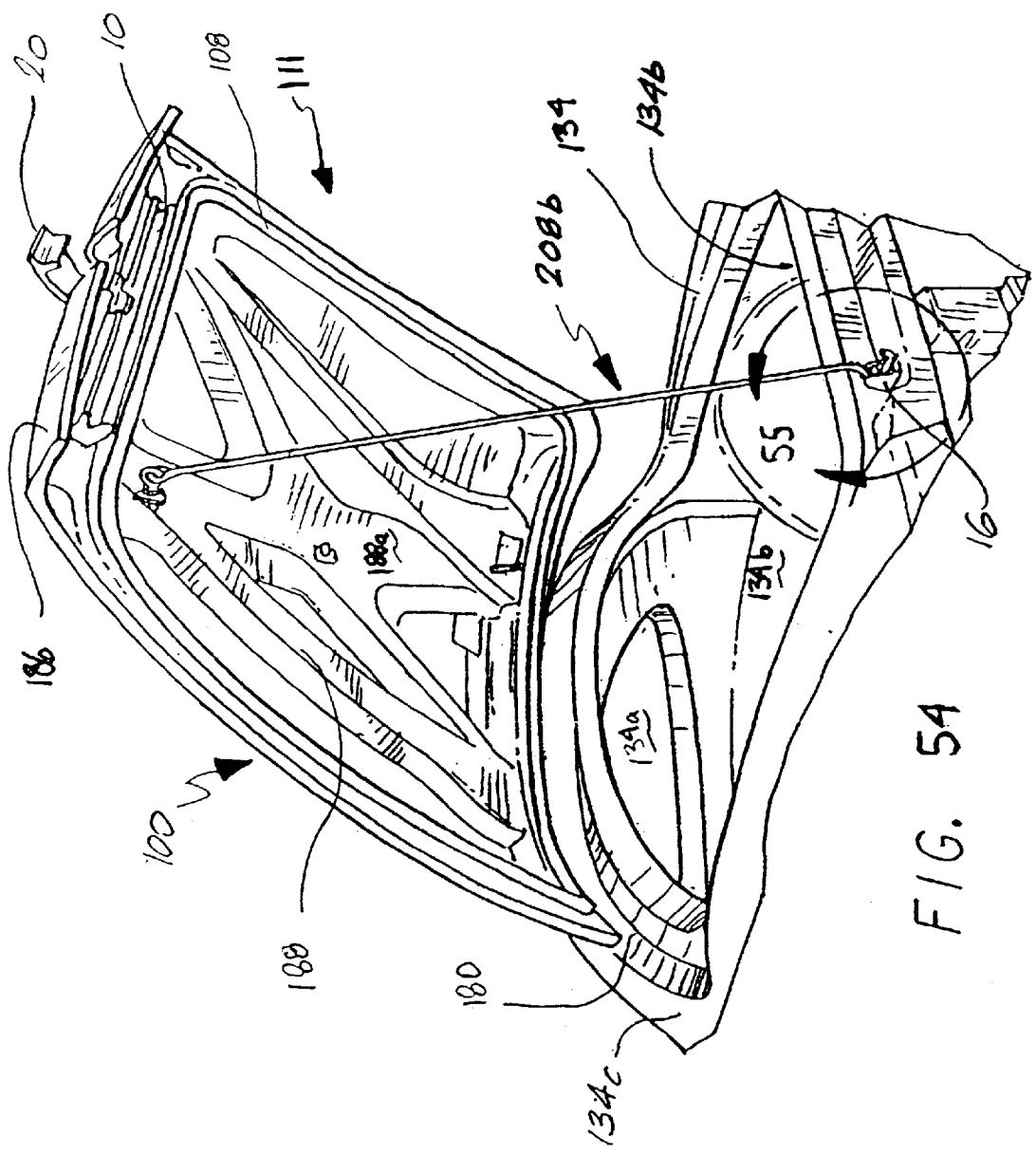
FIG. 54 is a rear angle perspective view of the trailer of FIG. 1 with the rear cover propped open.

As shown in FIGS. 52, 53 and 57, a plurality of rod securing hooks 214 for holding the prop rods 208 in the stowed position are secured to the inner skin 188 of both the front and rear covers 110, 111. In a preferred embodiment, the front cover 110 includes two rod securing hooks 214, one adjacent the hook 208f of the prop rod 208, and a second near the center of the elongated rod 208c. The rear cover 111 preferably includes one rod securing hook 214 and a skid plate 215 Preferably, the mounting brackets 210a/212, rod securing hooks 214 and skid plate 215 are arranged such that the prop rod 208 is held in tension when it is in the stowed position, as shown in FIGS. 50 and 55. This helps prevent the rod 208 from falling out during travel, etc.

In use (the front or rear cover must be open), the prop rod 208 is detached from the rod securing hooks 214, pivoted downwardly and engaged with the associated keeper 16. Because the prop rod 208 is pivoted downwardly and the hook 208f engaged within a keeper 16 below the cover (typically a prop rod is pivoted upwardly), disengagement by wind force raising the open cover is resisted. The hook 208f has an end that is turned up. This further prevents disengagement by wind force.

It will be understood that the majority of the components of the main body portion 114 of the trailer 100 are comprised of plastic to make the trailer 100 lightweight and durable. However, constructing the trailer 100 components of plastic is not a limitation on the present invention. Any sufficiently rigid material can be used.

Referring to FIGS. 62–64e, in a preferred embodiment, the trailer 100 includes a low current, tow vehicle-powered supplemental lighting system 216. In this embodiment, each "light" 172 (meaning brake light, turn signal light, running light, etc.) is comprised of a plurality of closely positioned light emitting diodes (LEDs) 218. LEDs 218 reduce the current draw from the towing vehicle 178. For example, the LED "lights" can reduce current draw by as much as 76%. This may circumvent the need for adapters as described above in the Background of the Invention section. This lighting system 216 offers benefits applicable to trailers, hitch-mounted utility carriers and any other type of equipment that includes supplemental lighting powered by a host vehicle. In a preferred embodiment, the tail/stop/turn lights 172a, side marker lights 221 and license lights 172c can be incandescent lights as is known in the art.

Figure 63A:
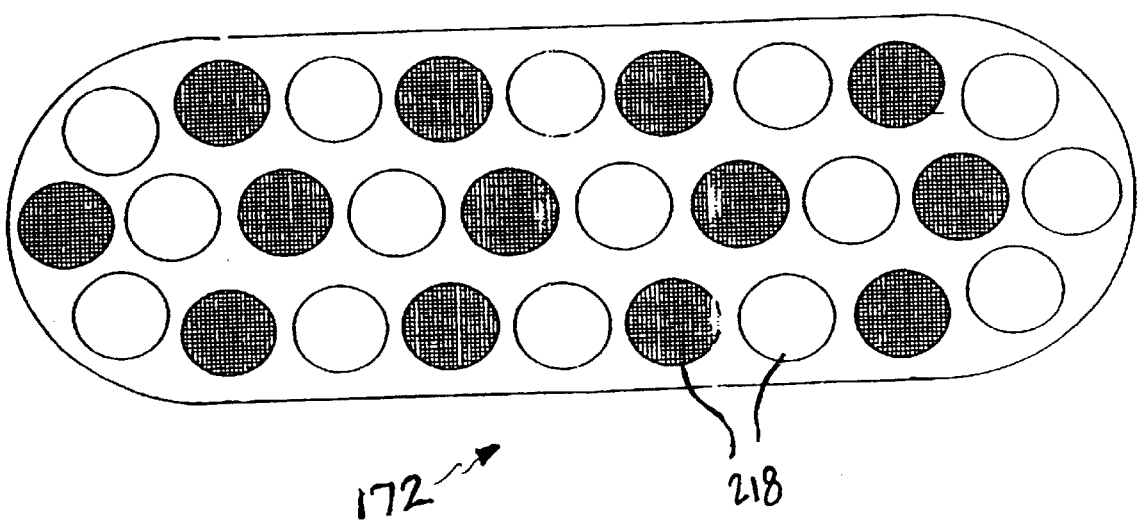
FIG. 63a is a schematic of a light comprised of a plurality of light emitting diodes, showing a portion of them lit to indicate running.
Figure 63B:
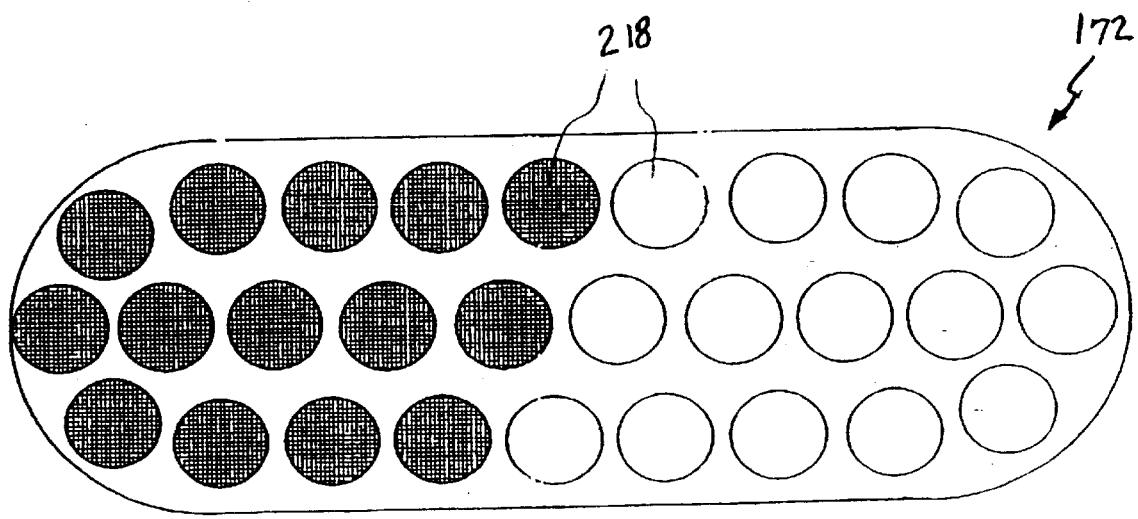
FIG. 63b is a schematic of a light comprised of a plurality of light emitting diodes, showing a portion of them lit to indicate turning.
Figure 34:
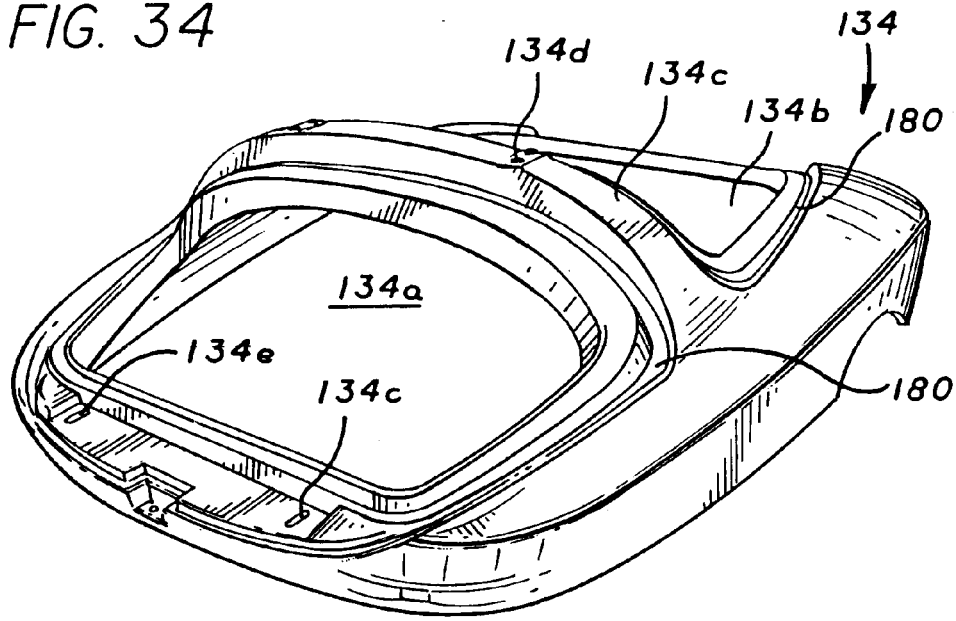
Figure 35:
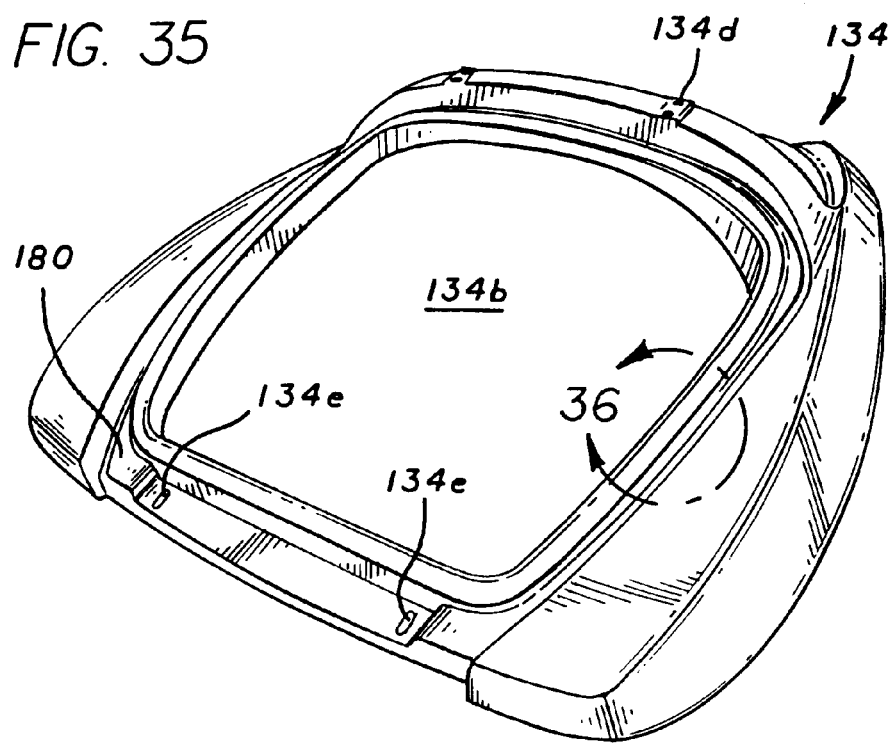
Figure 55:
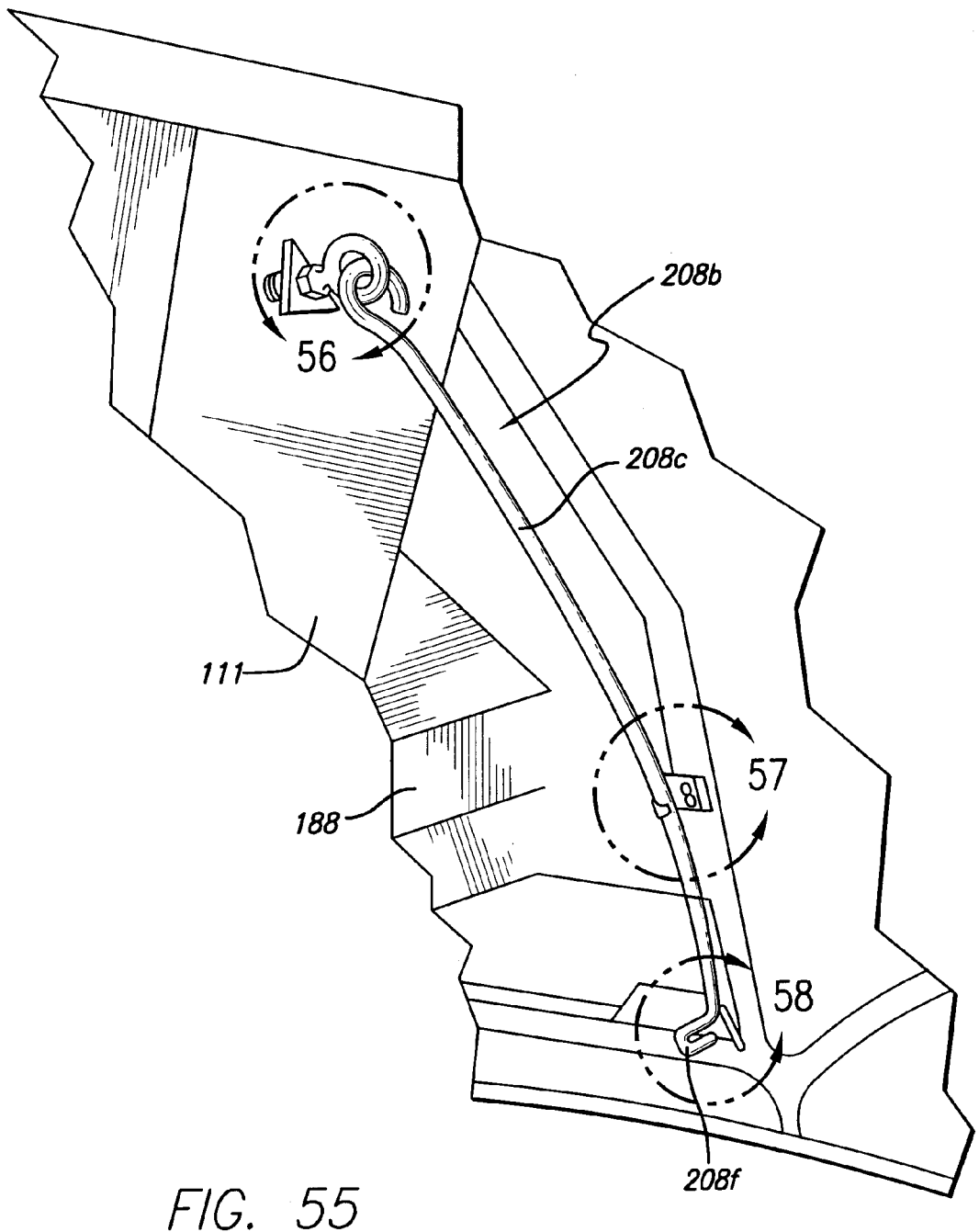

In another embodiment, a brake light, turn signal and taillight may be incorporated in one LED light assembly. In this embodiment, different arrangements of the separate LEDs 218 within a field of LEDs will light up to indicate braking, turning or lights running (taillight function). An example is shown in FIGS. 63a and 63b. In this example, would function as taillights. Turn indication could be all of the LEDs may light up to indicate braking, while only half may light up to indicate that the lights are running.

The embodiments of the present invention recited herein are intended to be merely exemplary and those skilled in the art will be able to make numerous modifications to them without departing from the spirit of the present invention. For example, the trailer could be redesigned to include a single wheel for towing behind a motorcycle; the trailer interior compartment 118 can be divided up into multiple compartments; the hinges can be one sided (i.e., either the front or rear hinge portion 196 can be omitted), For the latching system, a single hook and keeper can be used; the hook or hooks may not be disposed at the ends of the elongated shaft; the beak member 24 and torsion spring 39 may be omitted; the keepers can be an opening defined in the vehicle base; the shield 60 may be omitted and the latch plate assembly and elongated shaft may be affixed directly to the vehicle cover; the rotator clevis may be a tube or a pair of tubes that are engaged by the latch lever. All such modifications are intended to be within the scope of the present invention as defined by the claims appended hereto.

What is claimed is:

1. A trailer comprising:

a) a lower frame portion, b) a tub-shaped inner liner supported on said lower frame portion, wherein said inner liner has a lip running around a top edge thereof, c) a lower body portion at least partially surrounding said inner liner and supported on said lower frame portion, and d) an upper body portion secured to said lower body portion, wherein said lip of said inner liner is secured to an inside surface of said lower body portion to form a bumper portion.

2. The trailer of claim 1 wherein said tub-shaped inner liner comprises a bottom and an outer wall extending upwardly from said bottom at an angle, wherein said lip extends from a top edge of said outer wall.

3. The trailer of claim 2 further comprising a floor panel disposed between said lower frame portion and said inner liner, wherein said floor panel has a lip defined around an outer edge thereof, wherein said lower body portion includes a lip extending inwardly around a bottom edge thereof, and wherein said lip of said lower body portion is secured on said lip of said floor panel.

4. The trailer of claim 3 wherein a deck is disposed between said floor panel and said lower frame portion.

5. The trailer of claim 4 wherein said inner liner, said deck, said floor panel and said lower frame portion each have a plurality of aligned perimeter holes defined therein, and wherein a plurality of threaded fasteners extend through each of said aligned perimeter holes to secure said inner liner, said deck, said floor panel and said lower frame portion together.

6. The trailer of claim 5 wherein at least one of said plurality of threaded fasteners includes a loop thereon that extends above said bottom of said inner liner.

7. A trailer comprising:

a) a lower frame portion, b) a tub-shaped inner liner supported on said lower frame portion, wherein said inner liner has a lip running around a top edge thereof, c) a lower body portion at least partially surrounding said inner liner and supported on said lower frame portion, d) an upper body portion secured to said lower body portion, wherein said lip of said inner liner is secured to an inside surface of said lower body portion to form a bumper portion, e) a floor panel disposed between said lower frame portion and said inner liner, f) a deck disposed between said floor panel and said lower frame portion, and g) wherein said inner liner, said deck, said floor panel and said lower frame portion each have a plurality of aligned perimeter holes defined therein, and wherein a plurality of threaded fasteners extend through each of said aligned perimeter holes to secure said inner liner, said deck, said floor panel and said lower frame portion together.

\* \* \* \* \*

UNITED STATES PATENT AND TRADEMARK OFFICE
CERTIFICATE OF CORRECTION

PATENT NO. : 6,601,908 B2
DATED : August 5, 2003
INVENTOR(S) : Votruba et al.

It is certified that error appears in the above-identified patent and that said Letters Patent is hereby corrected as shown below:

Drawings,
Delete drawing sheets 30 and 48 and substitute therefore the drawing sheets consisting of Fig(s) 34-55 as shown on the attached pages.

Signed and Sealed this

Fifth Day of October, 2004

JON W. DUDAS
*Director of the United States Patent and Trademark Office*